April 26, 1966 J. O. CAMPEAU 3,248,528

SIMPLE GENERAL PURPOSE DIGITAL COMPUTER

Filed July 25, 1958 33 Sheets-Sheet 1

INVENTOR.
JOSEPH O. CAMPEAU
BY Marvin H. Kleinberg
ATTORNEY

INVENTOR.
JOSEPH O. CAMPEAU
BY Marvin H. Kleinberg
ATTORNEY

INVENTOR.
JOSEPH O. CAMPEAU
BY Marvin H. Kleinberg
ATTORNEY

INVENTOR.
JOSEPH O. CAMPEAU
BY [signature]
ATTORNEY

INVENTOR.
JOSEPH O. CAMPEAU
BY [signature]
ATTORNEY

INVENTOR.
JOSEPH O. CAMPEAU
BY Marvin H. Kleinberg
ATTORNEY

April 26, 1966 J. O. CAMPEAU 3,248,528

SIMPLE GENERAL PURPOSE DIGITAL COMPUTER

Filed July 25, 1958 33 Sheets-Sheet 7

INVENTOR.
JOSEPH O. CAMPEAU

BY [signature]

ATTORNEY

INVENTOR.
JOSEPH O. CAMPEAU

BY [signature]

ATTORNEY

INVENTOR.
JOSEPH O. CAMPEAU
BY [signature]
ATTORNEY

April 26, 1966 J. O. CAMPEAU 3,248,528

SIMPLE GENERAL PURPOSE DIGITAL COMPUTER

Filed July 25, 1958 33 Sheets-Sheet 10

INVENTOR.
JOSEPH O. CAMPEAU
BY [signature]
ATTORNEY

JOSEPH O. CAMPEAU
INVENTOR.

April 26, 1966 J. O. CAMPEAU 3,248,528

SIMPLE GENERAL PURPOSE DIGITAL COMPUTER

Filed July 25, 1958 33 Sheets-Sheet 12

S REGISTER CYCLES

INVENTOR.
JOSEPH O. CAMPEAU

INVENTOR.
JOSEPH O. CAMPEAU

INVENTOR.
JOSEPH O. CAMPEAU

April 26, 1966 J. O. CAMPEAU 3,248,528

SIMPLE GENERAL PURPOSE DIGITAL COMPUTER

Filed July 25, 1958 33 Sheets-Sheet 15

INVENTOR.
JOSEPH O. CAMPEAU

INVENTOR.
JOSEPH O. CAMPEAU

INVENTOR.
JOSEPH O. CAMPEAU

INVENTOR.
JOSEPH O. CAMPEAU

April 26, 1966 J. O. CAMPEAU 3,248,528

SIMPLE GENERAL PURPOSE DIGITAL COMPUTER

Filed July 25, 1958 33 Sheets-Sheet 19

JOSEPH O. CAMPEAU
INVENTOR

INVENTOR.
JOSEPH O. CAMPEAU

JOSEPH O. CAMPEAU
INVENTOR

INVENTOR.
JOSEPH O. CAMPEAU

April 26, 1966 J. O. CAMPEAU 3,248,528

SIMPLE GENERAL PURPOSE DIGITAL COMPUTER

Filed July 25, 1958 33 Sheets-Sheet 23

INVENTOR.
JOSEPH O. CAMPEAU

INVENTOR.
JOSEPH O. CAMPEAU

April 26, 1966 J. O. CAMPEAU 3,248,528

SIMPLE GENERAL PURPOSE DIGITAL COMPUTER

Filed July 25, 1958

33 Sheets-Sheet 25

INVENTOR.
JOSEPH O. CAMPEAU

INVENTOR.
JOSEPH O. CAMPEAU

INVENTOR.
JOSEPH O. CAMPEAU

INVENTOR.
JOSEPH O. CAMPEAU

JOSEPH O. CAMPEAU
INVENTOR

INVENTOR.
JOSEPH O. CAMPEAU

JOSEPH O. CAMPEAU
INVENTOR

S REGISTER CYCLES

INVENTOR.
JOSEPH O. CAMPEAU

April 26, 1966 J. O. CAMPEAU 3,248,528

SIMPLE GENERAL PURPOSE DIGITAL COMPUTER

Filed July 25, 1958 33 Sheets-Sheet 33

INVENTOR.
JOSEPH O. CAMPEAU

United States Patent Office 3,248,528
Patented Apr. 26, 1966

3,248,528

SIMPLE GENERAL PURPOSE DIGITAL COMPUTER

Joseph Ovid Campeau, Los Angeles (Malibu), Calif., assignor to Litton Industries of California, Beverly Hills, Calif.

Filed July 25, 1958, Ser. No. 750,940
17 Claims. (Cl. 235—167)

This invention relates to computers, and more particularly, to a simple digital computer which may be used in place of general purpose computers of much greater size and complexity.

A general purpose digital computer is usually thought of as a very large, complex, combination of electronic "hardware." The vast majority of such machines have been extremely fast, requiring many gates, flip-flops, shifting registers, arithmetic units, as well as large capacity high and low speed storage devices. In such machines, arithmetic computations are carried out at extremely high speeds in several parallel "black boxes" each containing many of the same gates, flip-flops, and other electronic components. Frequently, each "black box" is enabled by a specific signal combination, generated in response to a programmed instruction, to perform group of operations.

General purpose digital computers, working at extremely high speeds, require extensive input-output equipment, large-scale memories, and extensive, well-regulated power supplies, air-conditioning, and a relatively large physical plant in which to house them. Depending upon the complexity of the computer, size and power requirements vary.

A common property of such general purpose digital computers is that there are many "black boxes" for performing specific sets of logical "tasks" when instructed to do so by the computer program. The various "black boxes" may contain many of the same electronic components, such as resistors, diodes, tubes or transistors and other elements, but differ in the wiring connection of the components. Even the larger, elemental modules, such as "and" gates, "or" gates, and flip-flops, may be identical in different "black boxes," but are interconnected in different ways to produce different results upon the receipt of input signals. It is evident, therefore, that such a duplication of the basic electronic components, i.e. resistors, capacitors, diodes and the like, is common in large scale digital computers.

It would appear that the basic advantage in constructing a computer having such a redundance of elements at all levels of complexity, is one of time saving. However, with large numbers of components, reliability becomes a problem and circuits are often duplicated to provide a safety factor, which also increases the numbers of components. Operations performed in parallel fashion save the time required to perform the same operation in a serial fashion. That is to say, if two 10-digit numbers are to be added, a parallel adder may be constructed which, in one time interval, can simultaneously add the ten digits of the one number to the ten digits of the other number and produce a result. A serial adder successively adds the two numbers digit by digit and provides the same result, but in ten time intervals. Frequently, machines are a combination of the serial and parallel types, performing some operations in parallel and others in serial fashion, in an attempt to balance the requirements of speed as opposed to system complexity, and therefore cost.

There are many useful applications of general purpose machines where cost is a most important factor and speed is of minor importance. In these applications, it is desirable to have a general purpose machine of increased reliability using only a very few components which, in serial fashion, can perform all logical operations. It will be understood, that virtually every operation of a general purpose computer can be expressed as a logical equation of Boolean variables, using the basic Boolean operations of "and," "or," and "not." Even the most complex logical equations can be reduced to a form consisting only of individual elements.

By way of example, in the Boolean addition of two binary digits, "A" and "B," a sum digit (S) and a carry digit (C) are produced. Should a first multi-digit binary number be added to a second multi-digit binary number, the carry digit is included in the addition of all digits after the least significant digit. The following Boolean equations express the addition operation:

$$S_i = \text{Sum} = A_i'B_i'C_{i-1} + A_i'B_iC_{i-1}' + A_iB_i'C_{i-1}' + A_iB_iC_{i-1} \quad (1)$$

$$C_i = \text{Carry} = A_iB_i + B_iC_{i-1} + A_iC_{i-1} \quad (2)$$

$A_i$=$i$th digit of the first number.
$B_i$=$i$th digit of the second number.
$C_i$=Carry of the $i$th addition.

In a conventional general purpose digital computer, arithmetic adders are constructed containing enough logical gating elements to mechanize all of the terms of both the sum and carry equations. Equation 1 could be mechanized with one four-input "or" gate and four three-input "and" gates. The application of a single timing pulse to all gates simultaneously, produces, at the end of a single timing interval, a signal on the Sum output, representing the sum of the digits $A_i$ and $B_i$.

It may be seen, on the other hand, that if only one two-input "and" gate and only one, two-input "or" gate were available, the same operation could be performed, but extended over a much longer time interval.

For example, at a first timed interval, the terms $A_i'$ and $B_i'$ are combined to form the term $A_i'B_i'$. In succeeding intervals, the complex term $A_i'B_i'$ is combined with the term $C_{i-1}$ to form the combination $A_i'B_i'C_{i-1}$ which is stored. The term, $A_i'B_iC_{i-1}'$, is built up in similar fashion, and the two complex terms are combined in an "or" operation, the result of which is stored. The remaining terms are built up, stored, and later combined with each other until at a final timed interval, a signal representing, for example $$(A_i'B_i'C_{i-1} + A_i'B_iC_{i-1}' + A_iB_i'C_{i-1}')$$

is combined in an "or" operation with the complex signal representing $A_iB_iC_{i-1}$. The result, a single binary digit, represents the sum of the digits, $A_i$ and $B_i$. The carry digit C may be derived in a similar fashion.

Each and every element of a general purpose digital computer can be represented by a logical equation which defines the behavior of the element in response to combinations of input signals and the computer itself can be expressed in terms of a single complex equation. All logical equations can be built up from the basic individual logical terms, an extremely simple machine, capable of only elemental logical operations, such as "and," "or,"

and "not," can over a period of time, exhibit the same problem solving ability as a more complex machine.

The requirements of such a simple machine are few. The machine must have a memory at least equal to the capacity of the machine whose logical equations it is to generate; the machine should be able to take information which may be located anywhere in its memory, pass this information through an operating circuit, and store the result anywhere in the memory; and, have an operating circuit which can perform logical operations upon many bits of information to produce a resultant bit, be able to complement individual bits, and, accept input and produce output signals for communication with the external world.

In the copending application of Floyd G. Steele, Serial No. 648,321, filed March 25, 1957, entitled "Simplified Method and Apparatus for Digital Computation," which application has been exclusively licensed to the assignee of the present invention, a novel digital computer is described and shown which is used to control a pallet loader. During each cycle of the program register, external signal sources provide bivalued information signals as to the state of the machine. These bivalued signals are used directly to modify the stored information, and computations are performed, the results of which in bivalued signal form, govern the operation of the various components of the pallet loader. The length of the longer program register is an exact multiple of the length of the shorter information loop. During each cycle of the information loop, each cell of the information loop receives the same sequence of program instructions. A logic flip-flop provides interim storage of signals and is used in performing certain Boolean operations on functions of two variables.

According to the present invention, an improved digital computer can be made up of a single static logical storage element, which can be a flip-flop, a memory device having a relatively short information storage loop, a second memory device having a longer recirculating storage loop, and a cyclical program memory, operable in synchronism with the other memories. The combined capacity of the short and the long loops is approximately equal to the length of the program loop. The information storage memories are provided with input and output staticizers and means interconnecting them so that information can either be recirculated without change, modified, or replaced with other information.

An operating circuit is provided for producing output signals which represent the result of logical operations performed under the control of the signals of the program memory. The operating circuits receive the output of the program memory staticizers, information memory staticizers, and the logic flip-flop, and, provide resultant output signals to the logic flip-flop and to the information memory input staticizers.

In one embodiment, a keyboard and display device is connected to the operating circuit. A plurality of entry keys are interconnected to apply binary coded decimal digit signals as well as certain control signals to the computer. The display apparatus receives counting and reset signals from the operating circuit and, in response thereto, and represents quantities stored within the computer, as decimal digits.

The program memory is preferably a combination of three circulating registers operating in parallel, each providing a bivalued, or binary, digital signal. The simultaneous combination of three binary digits provides eight signal combinations, each representing a different program instruction. The input and output staticizers of the information memories may also be considered as a source of control signals during certain operations. That is, a particular program instruction may be performed in one of two ways, depending upon the state of a particular staticizer.

Various program combinations provide signals to the operating circuits which function to combine a signal of one of the information memories, representing one binary digit, with a signal, either in the logical flip-flop or other information memory, also representing a binary digit, to form a signal representing the logical combination of the two binary digits which corresponds to the applied program signal combination. The resultant output signal is applied to either the logical flip-flop or the information input staticizers. Complex Boolean functions of variables can be built up using three of the functions of two variables: the logical difference or "exclusive or,"

$$f=A\oplus B$$

the logical product or "and," $f=AB$; and $f=1$, which when combined in an "exclusive or" operation with a variable, complements the variable and when combined in an "and" operation copies the variable. Other systems could be built up using only "and" and the complement, or "or" and the complement, i.e. the Pierce function, A'B', and the Sheffer function $A'+B'$, respectively. Still other program signal combinations transfer binary signals among the logic flip-flop and the short and long information loops.

The lengths of the information loops and the program registers can be chosen to "precess" individual information cells relative to the cells of the program registers. If the program is "$p$" bits in length, the short loop contains "$s$" bits, and "$t$" is the number of integral cycles of the short loop in a cycle of the program, then $$\frac{p}{s}=t+\frac{\pi}{s}\epsilon \qquad (3)$$

where $\epsilon$ is the number of bits precessed. Similarly, an information signal in the long loop precesses with respect to the program and relative to the short loop both by "$x$" cells and also "$y$" entire short loop cycles:

$$l+ys+x=p \qquad (4)$$

where $l$=cells in long loop, and $x$=the precession of the long with respect to the short loop.

According to one arrangement, $y=x=1$, and a particular signal, placed in the long loop and held for a long loop cycle, reappears coincident with a cell of the program that corresponds to a short loop cell that is earlier by one short loop cycle and one cell. Therefore, a signal that is held in the long loop for "$n$" cycles precesses backward in the program by "$n$" short loop cycles and by "$n$" bits relative to the short loop. If that bit is then transferred to the short loop for "$n—m$" short loop cycles where $m<n$, put in the logic flip-flop for "$n$" bit times and transferred to the short loop for "$m$" short loop cycles, the bit can be reinserted into the long loop to repeat the process. Such a program sequence results in a circulating register of "$n$" bit capacity. In each cycle of the program register, "$n$" individual bits comprising a word or a number can be found scattered throughout long loop, the short loop, and the logic flip-flop. In other embodiments, $y=1$, $x=2$ and bits in the long loop are precessed by two bit positions and one short loop cycle during each circulation of the program register. Generally, $y$ determines the number of short loop cycles and $x$ determines the number of bits in the short loop by which a signal in the long loop is precessed each program cycle.

Standard computer elements, such as flip-flops, delay lines, shifting registers, ring counters, binary counters, and the like, are all describable in terms of successive Boolean operations on a signal. Through the use of programming techniques, to be explained below, an information circulation path can be set up within the loops and the logic flip-flop which, for all purposes, behaves either as a shift register, or as a circulating register, a bistable circuit, or, for that matter, any other computer element.

Additional programming techniques combine the equations representing the different computer elements into more complex equations representing a complete computer. Such a computer may be programmed from a digital key input, to perform the additional operations of Add, Subtract, Put, Take, Test, Copy, Pass, Transfer, and Stop. Instruction signals, held in the long loop, control the operations performed by the machine, and new instructions can be inserted into the long loop at any time to change the operation of the machine.

Accordingly, it is an object of the present invention to provide a novel, compact, general purpose digital computer;

It is a further object of invention to provide a computer that is programmed by entering individual bivalued signals into an internal memory;

It is still a further object of the invention to provide a novel general purpose digital computer whose main memory contains instruction and information signals, the instruction signals controlling computer operations upon the information signals;

It is another object of the invention to provide a general purpose digital computer whose instructions can be modified at will merely by entering digital signals into the memory;

It is an additional object of invention to provide a novel computer including a program loop, a long memory loop, and a short memory loop all operating in synchronism with each other, the lengths of which have no single integral common denominator;

It is still a further object of invention to provide a novel digital computer including a circulating program loop, a circulating long loop and a circulating short loop operating synchronously with each other in conjunction with a static storage element which in combination can be used to generate complex functions of Boolean variables.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention. In the drawings.

Figure 2:
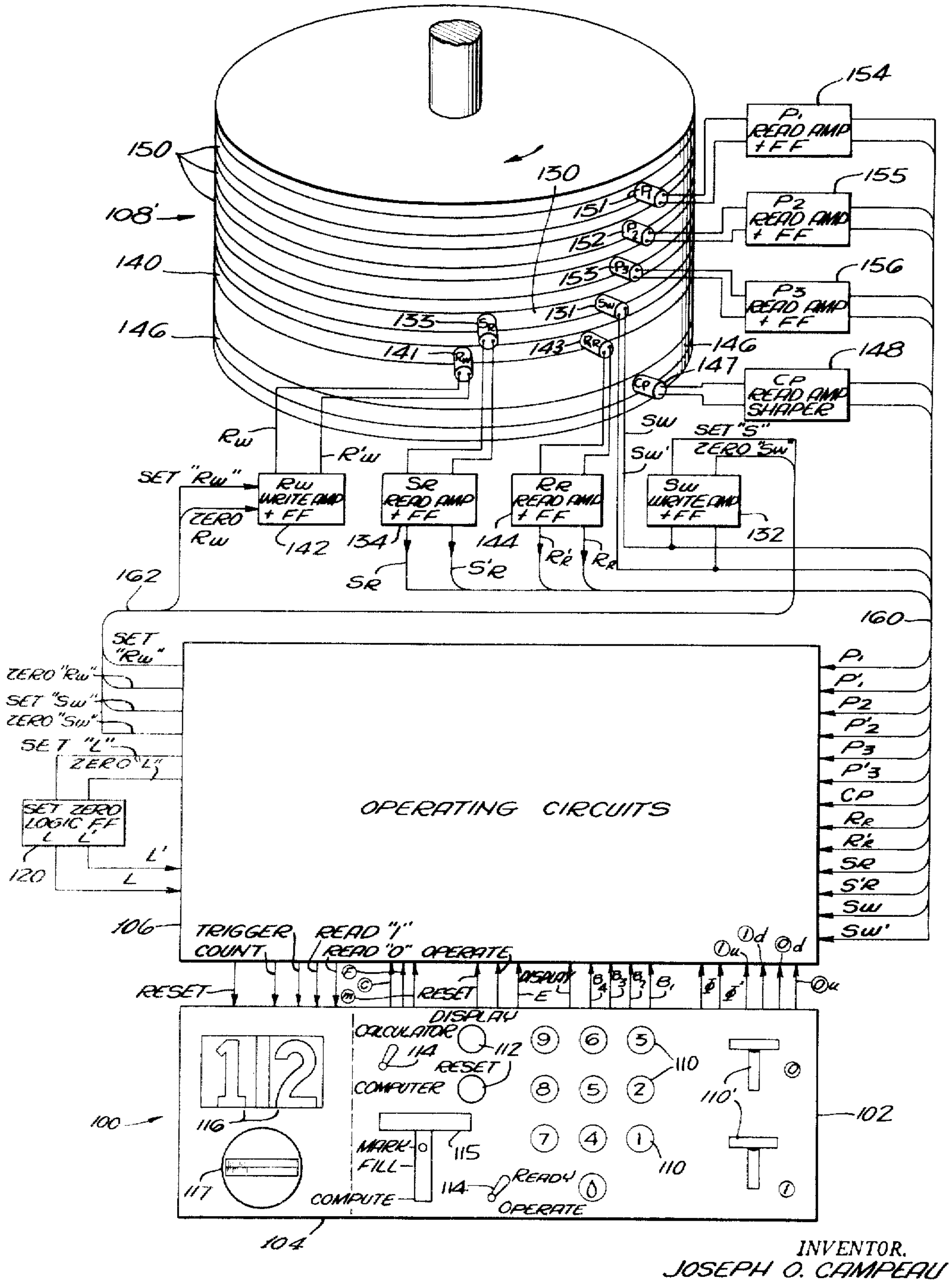
FIGURE 2 is a diagram, partly isometric and partly in block form of one embodiment of the present invention in which recirculating memory loops are recorded on a portion of the surface of a magnetic drum.
Figure 14:
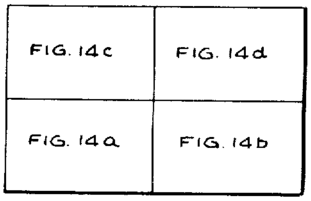
Figure 15:
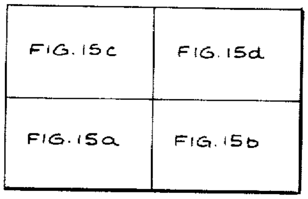
Figure 16:
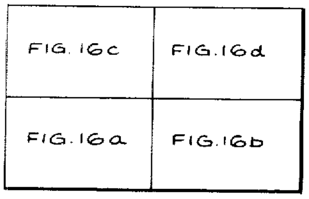
Figure 17:
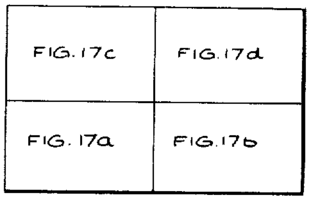
Figure 18:
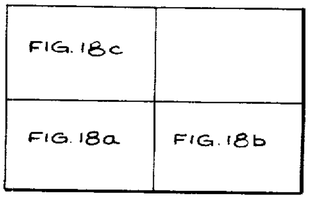
Figure 13A:
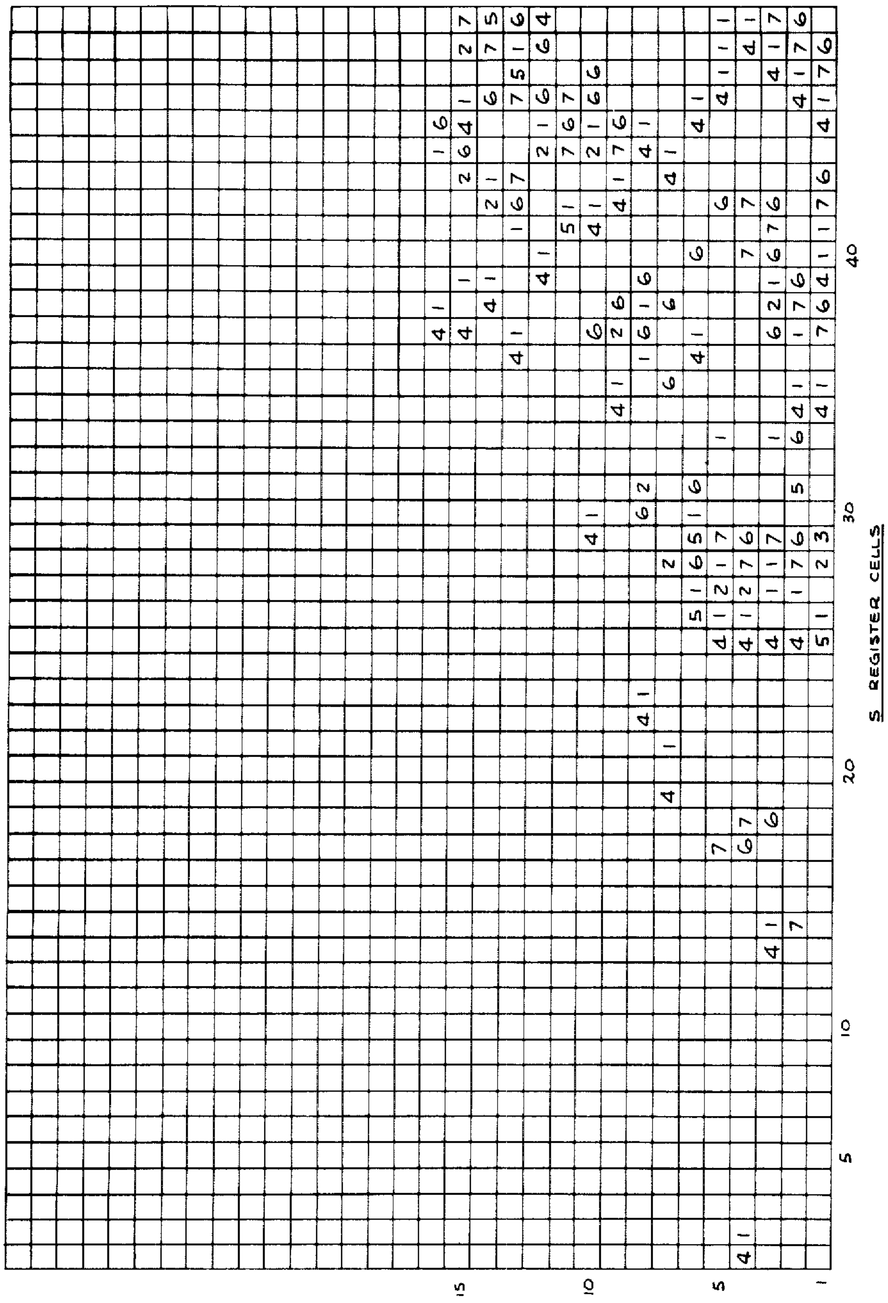
Figure 13B:
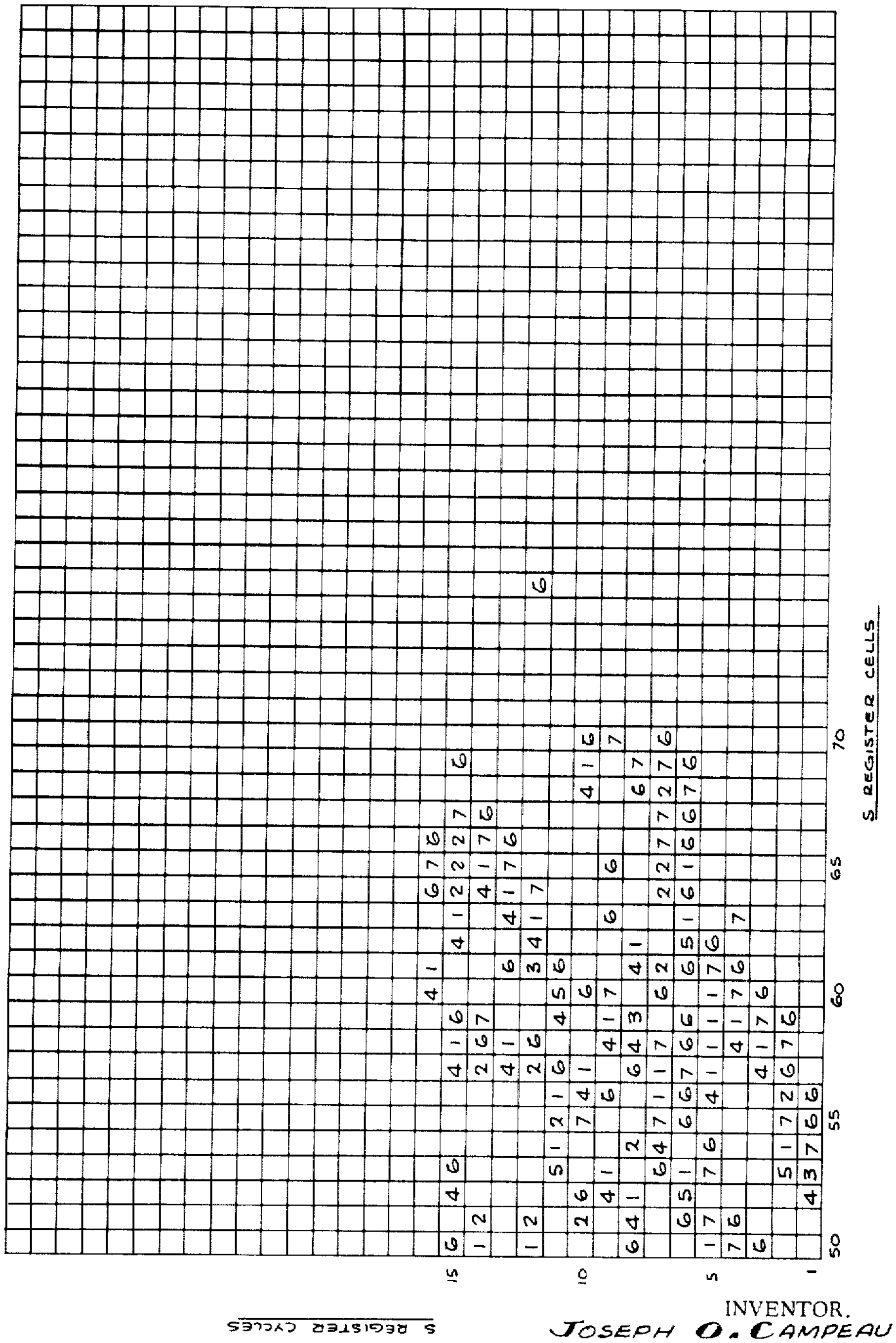
Figure 14A:
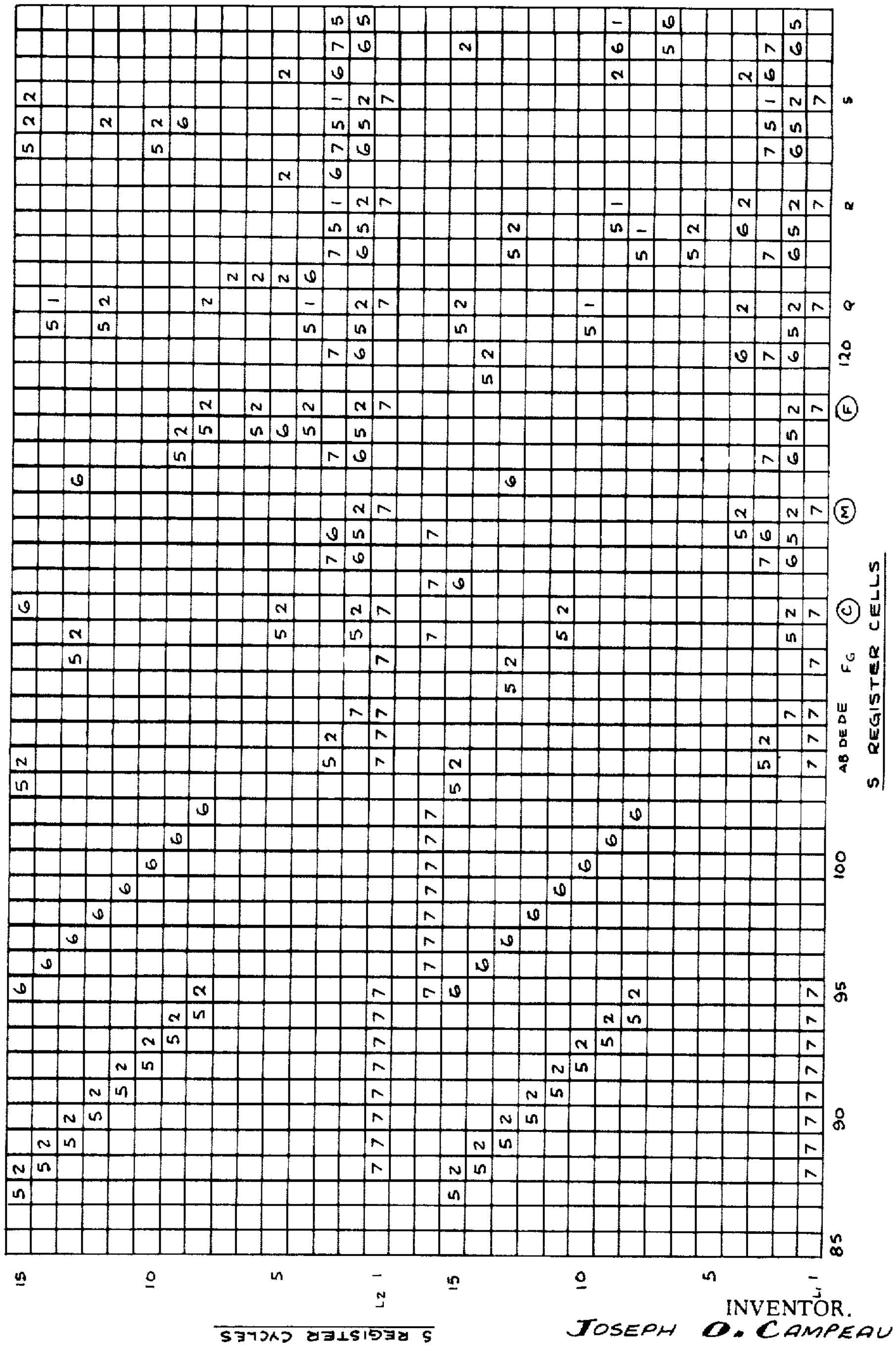
Figure 14B:
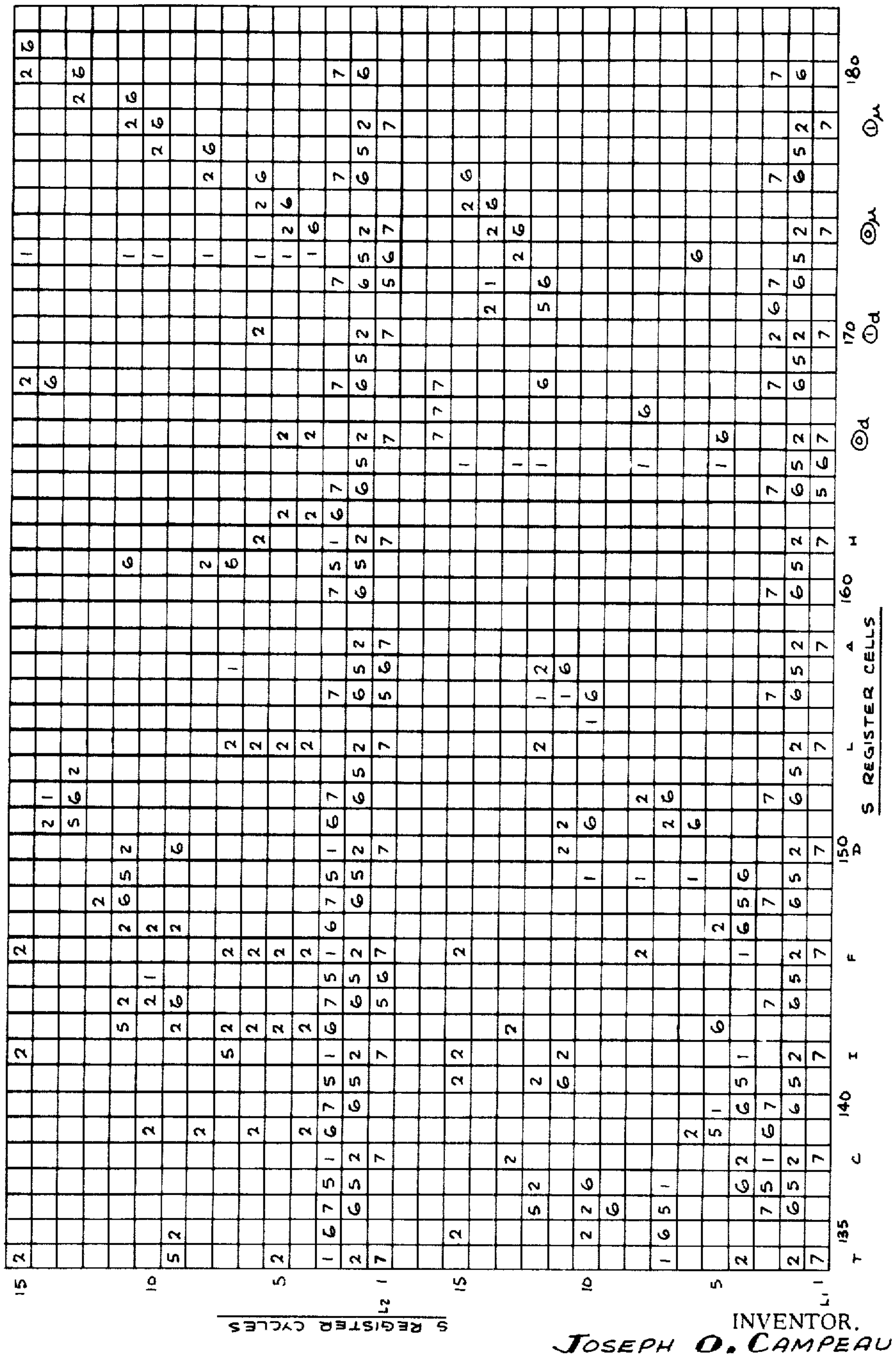
Figure 14C:
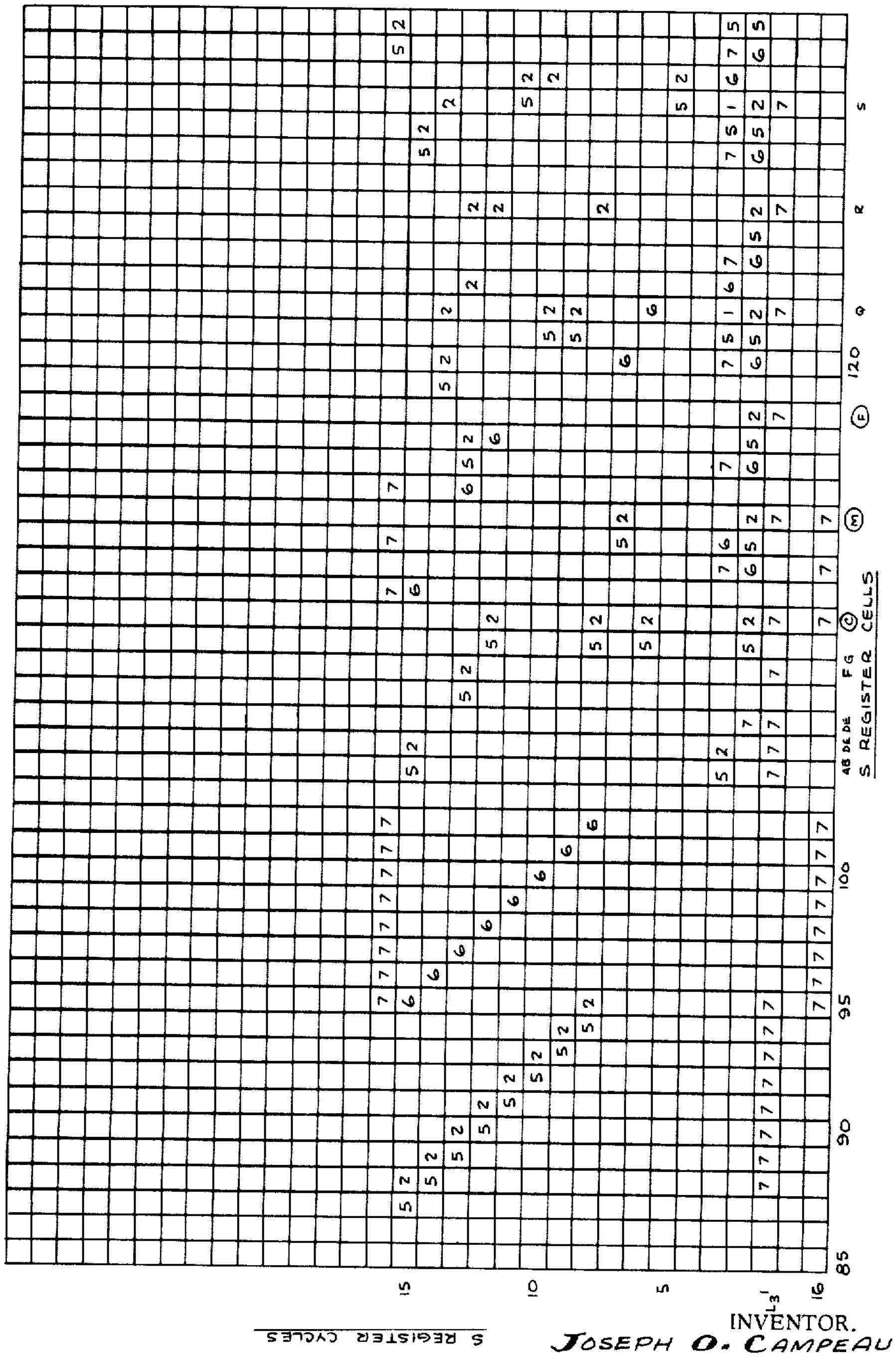
Figure 17:
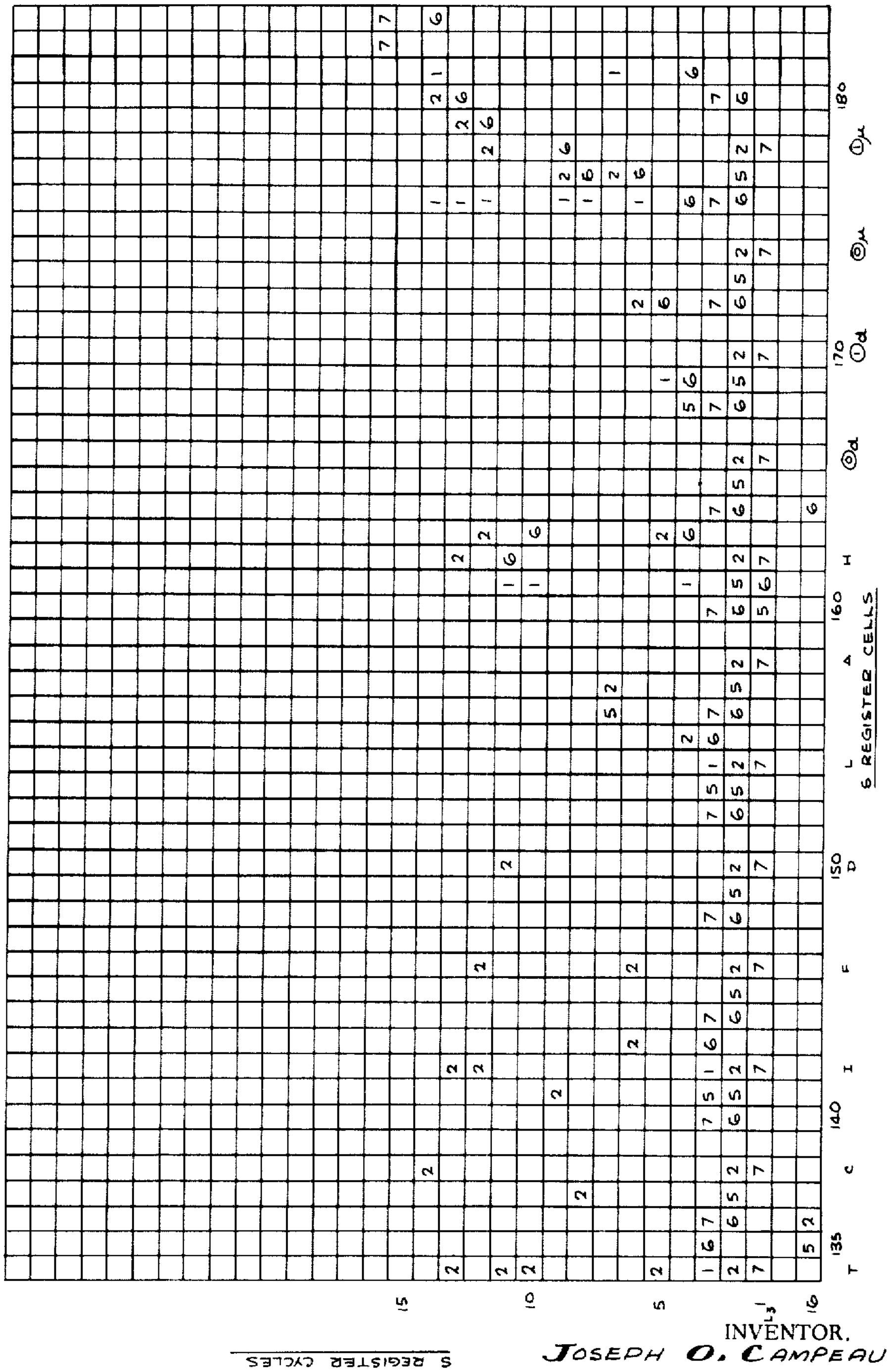
Figure 15A:
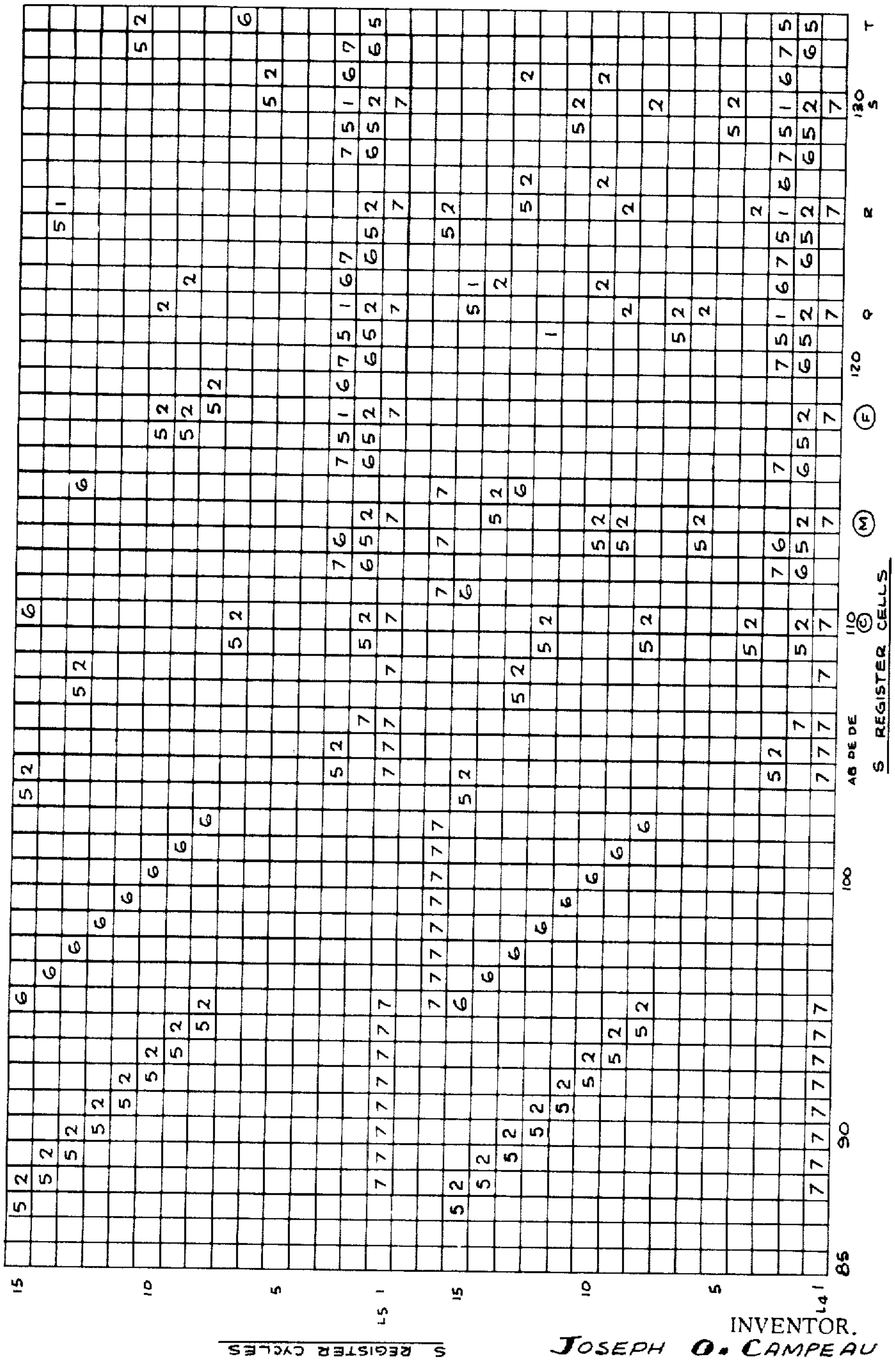
Figure 15B:
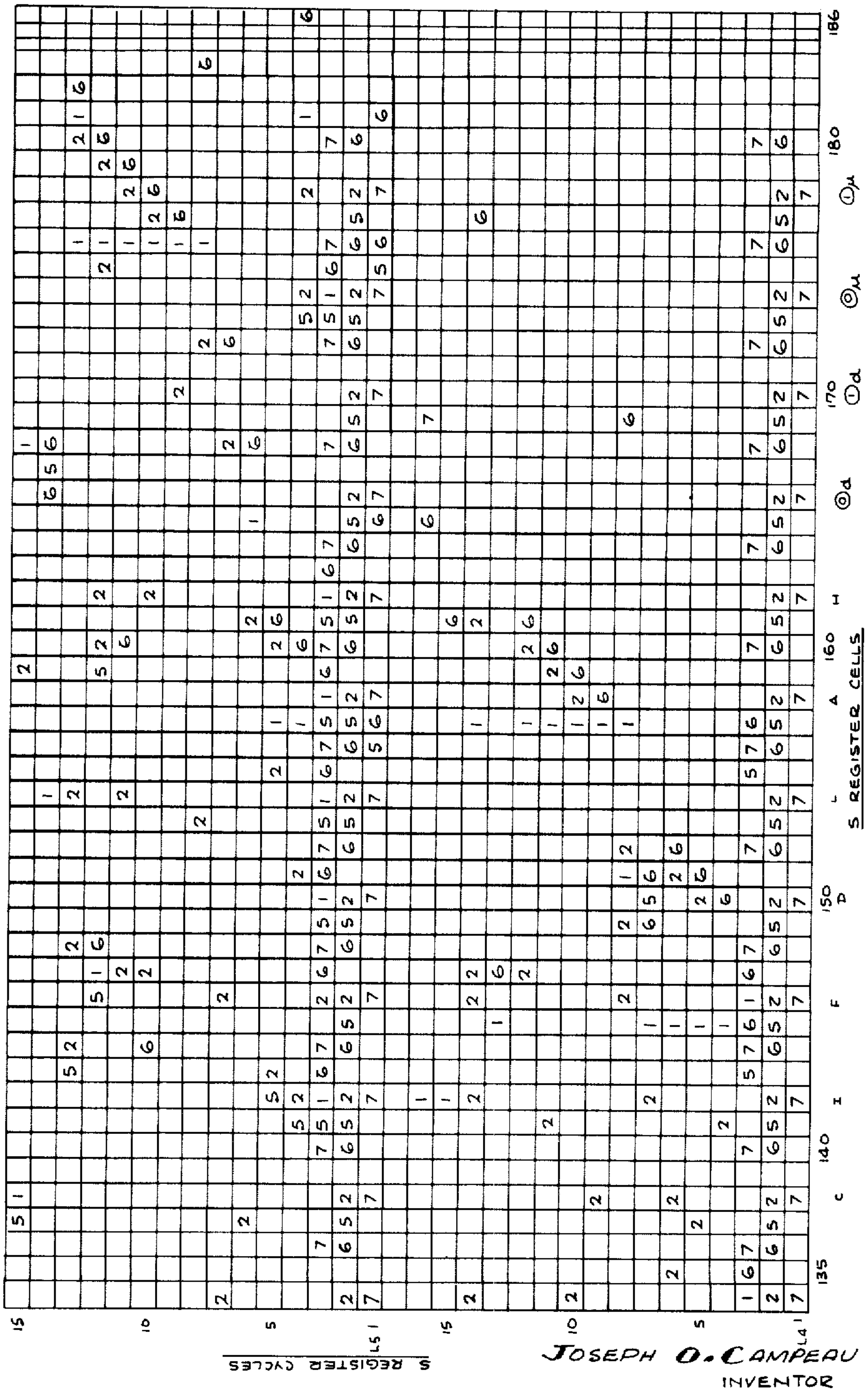
Figure 15C:
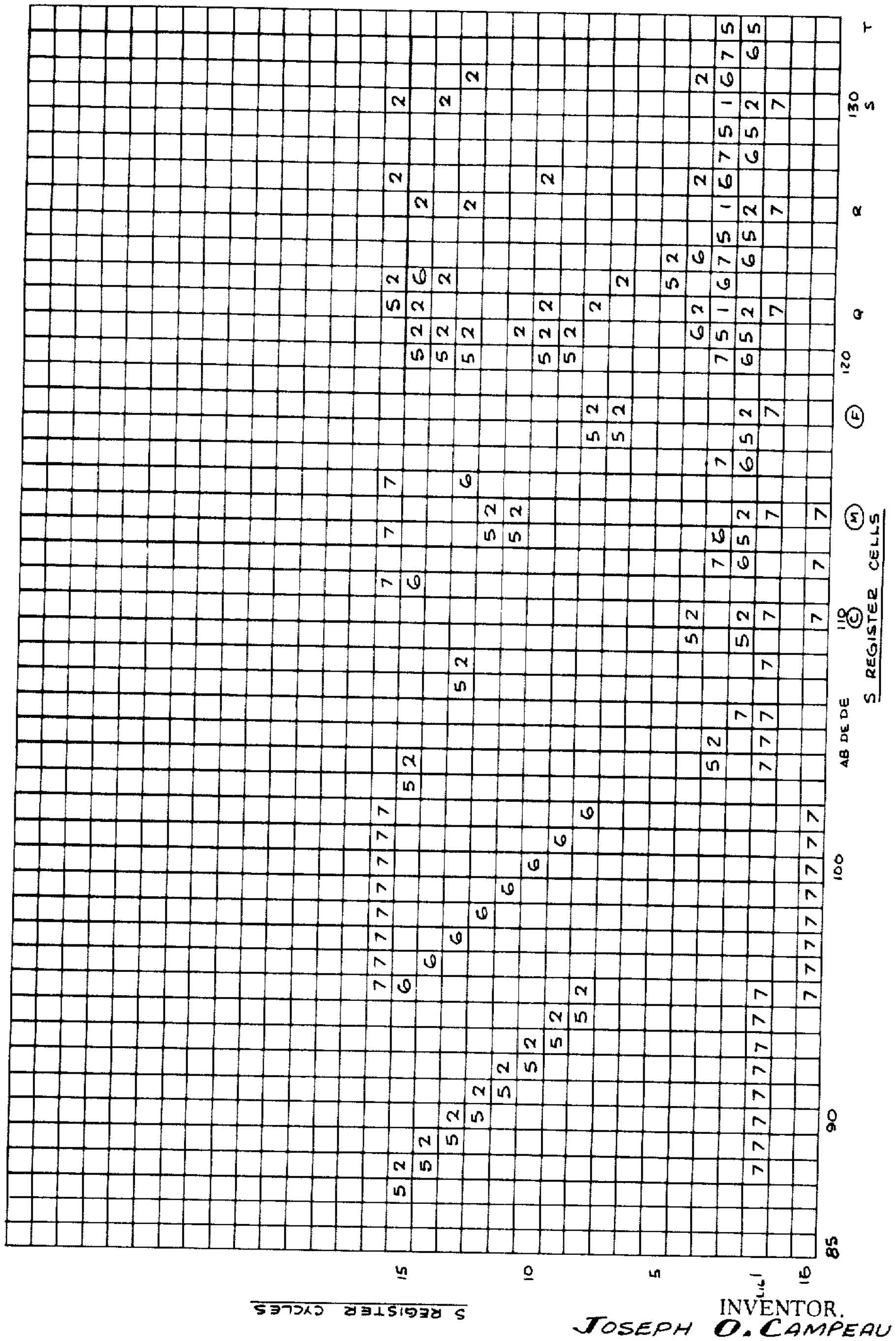
Figure 15D:
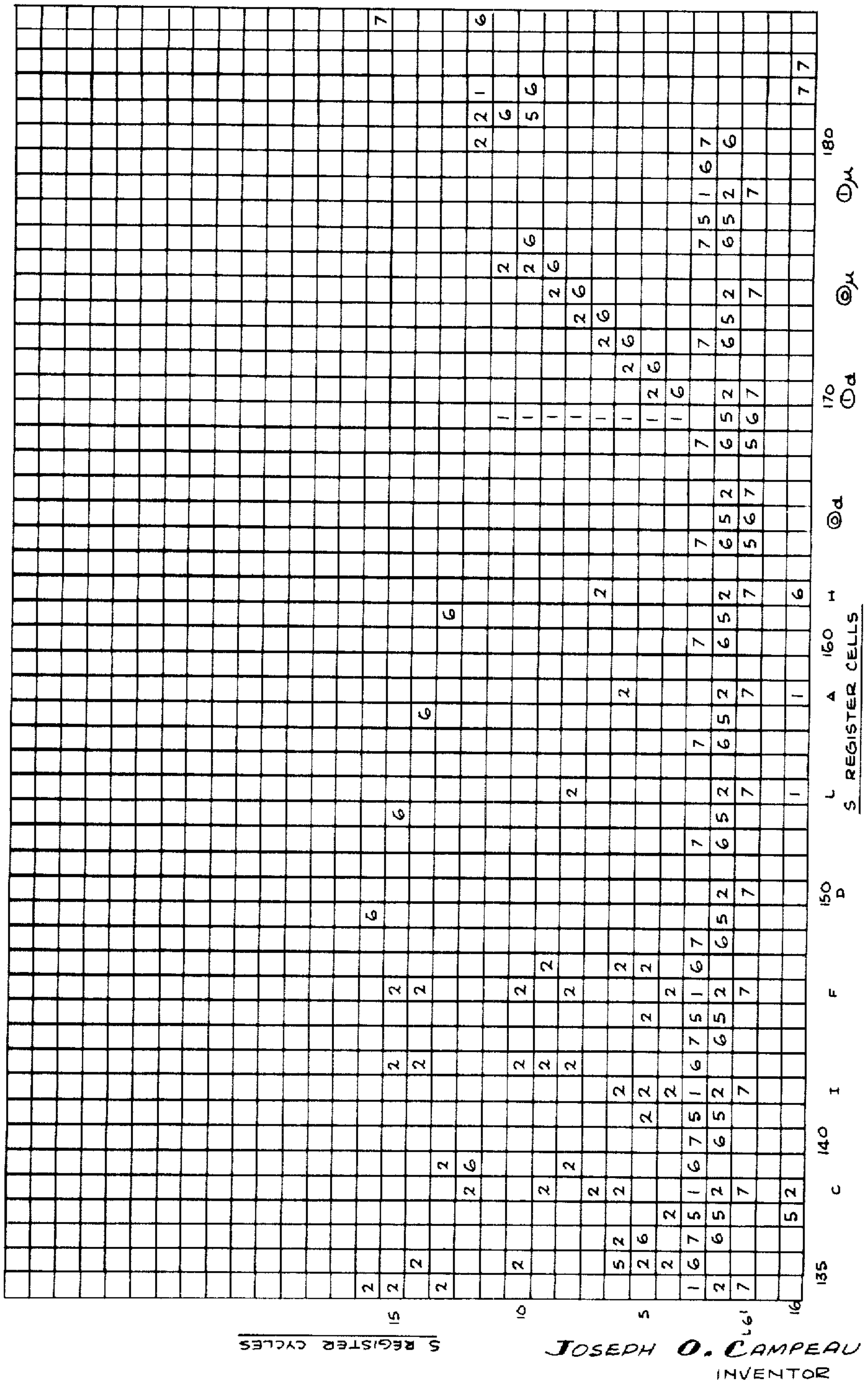
Figure 16A:
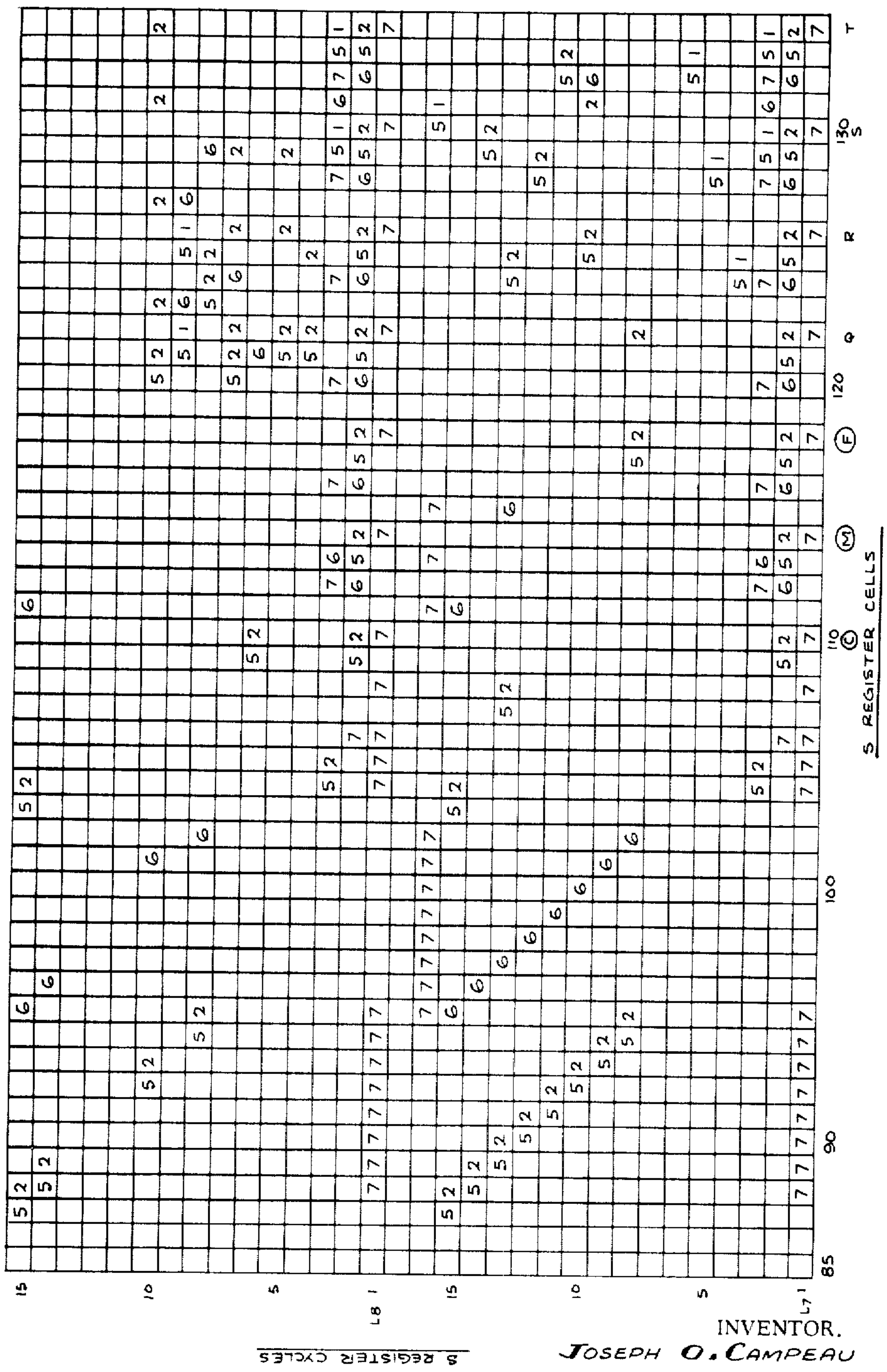
Figure 16B:
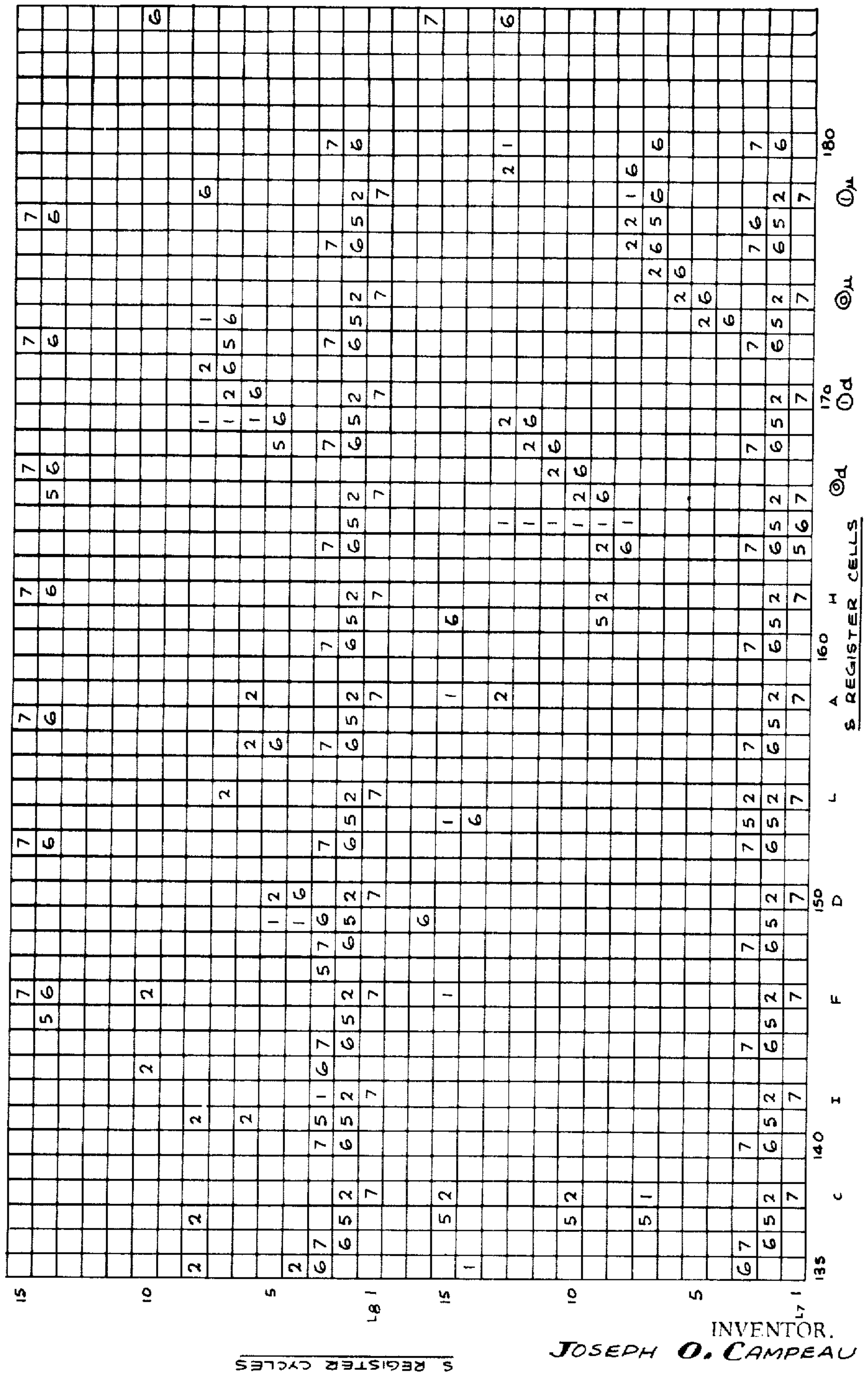
Figure 16C:
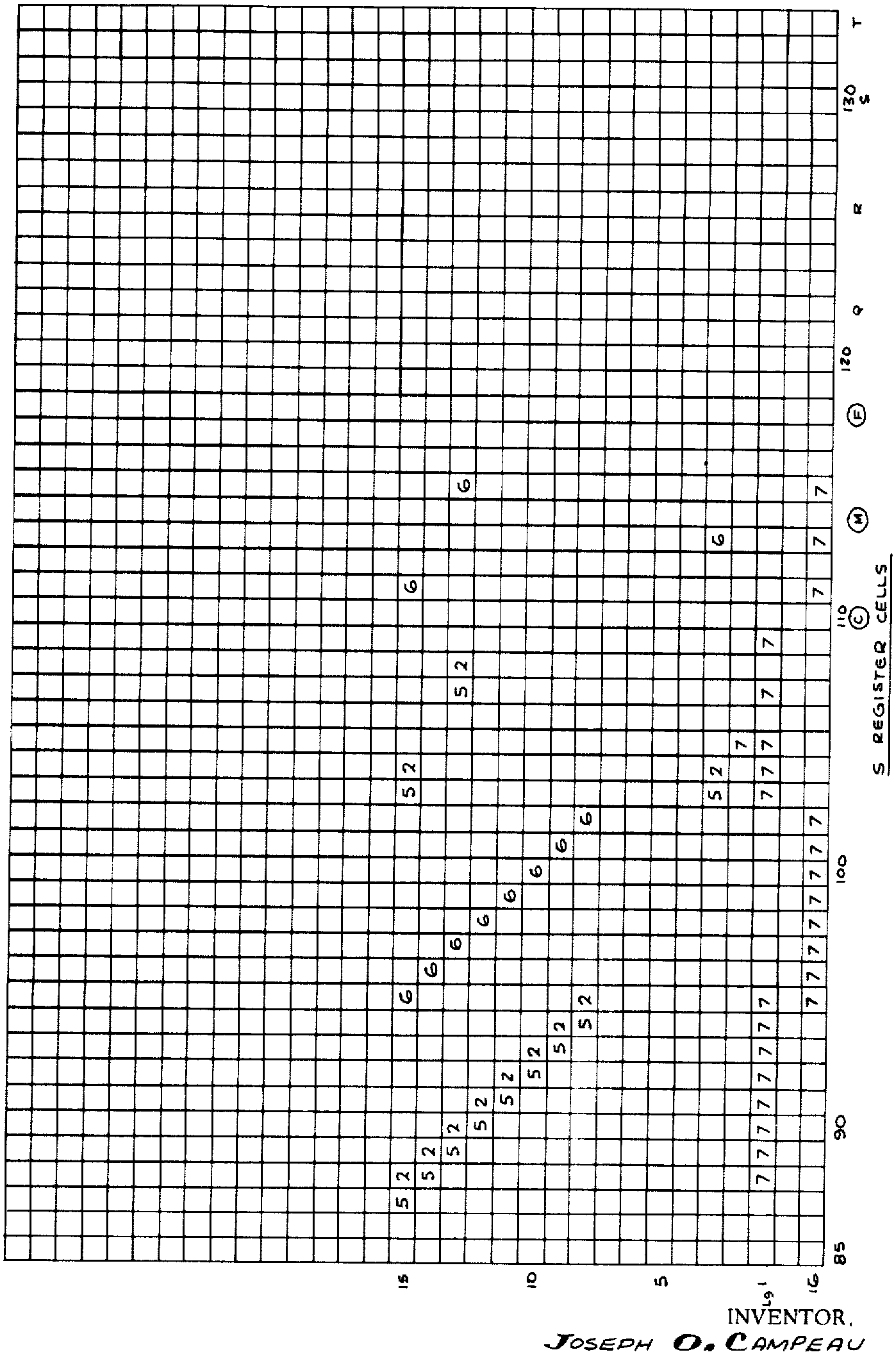
Figure 16D:
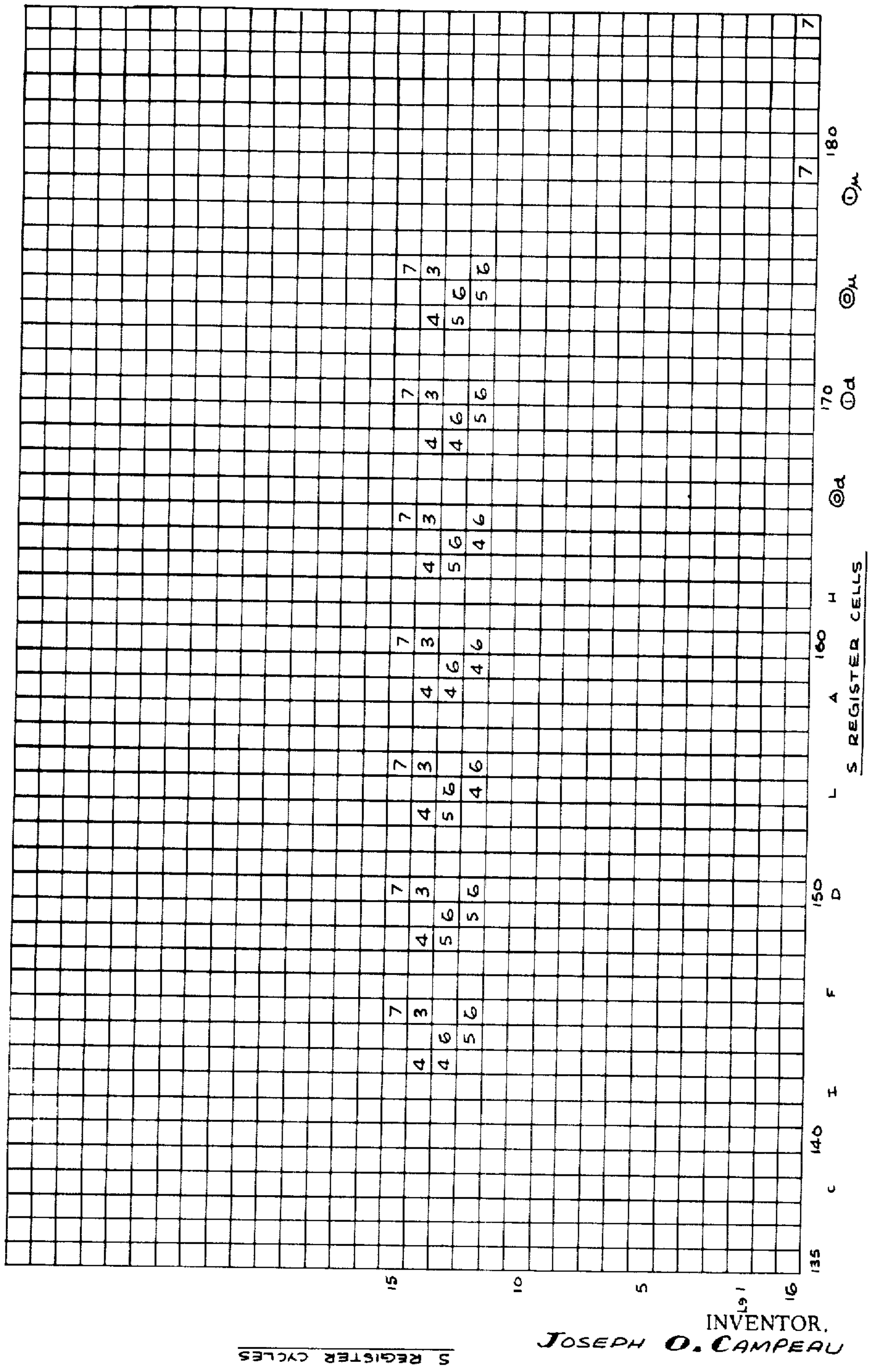
Figure 17A:
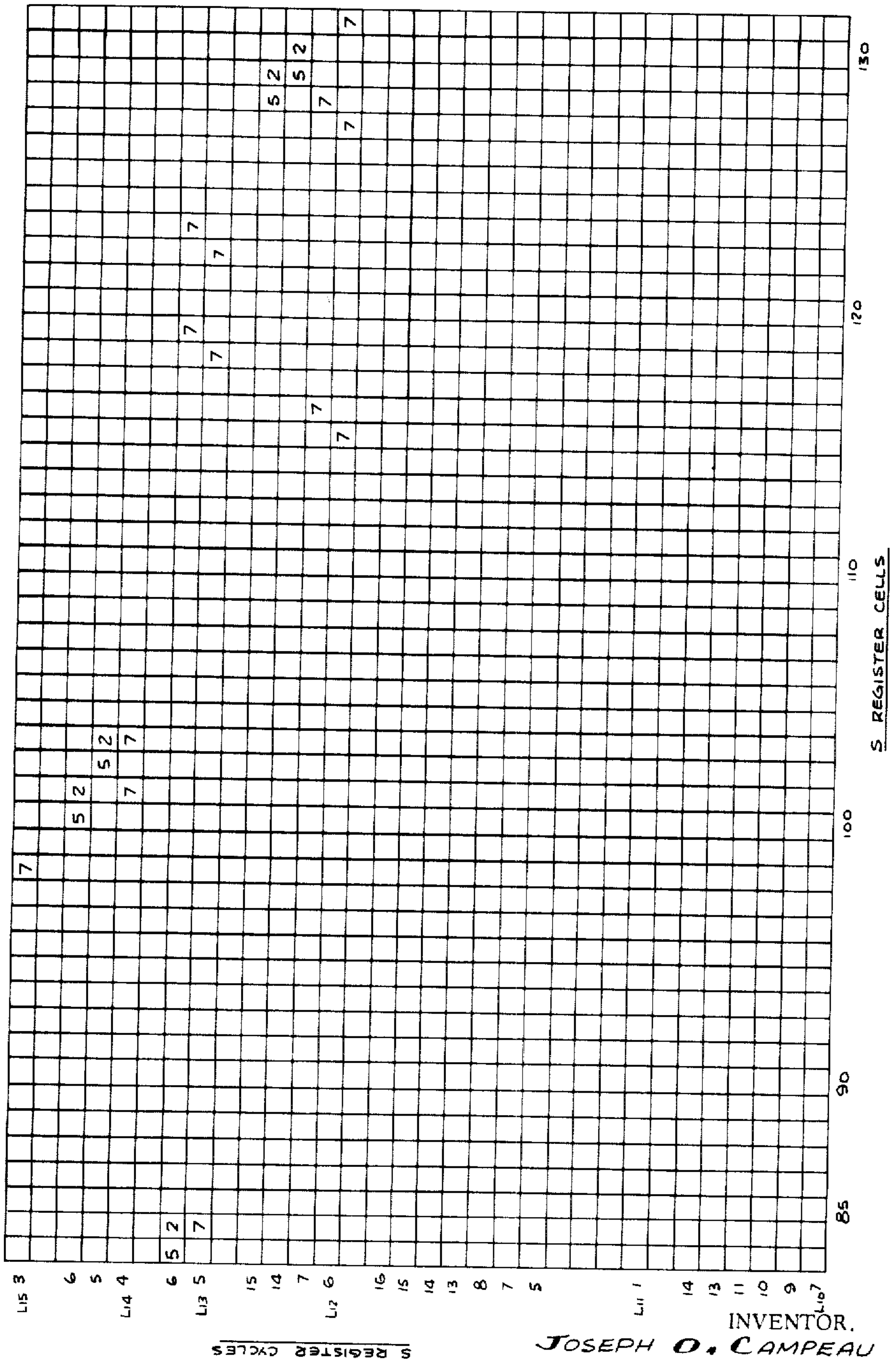
Figure 17B:
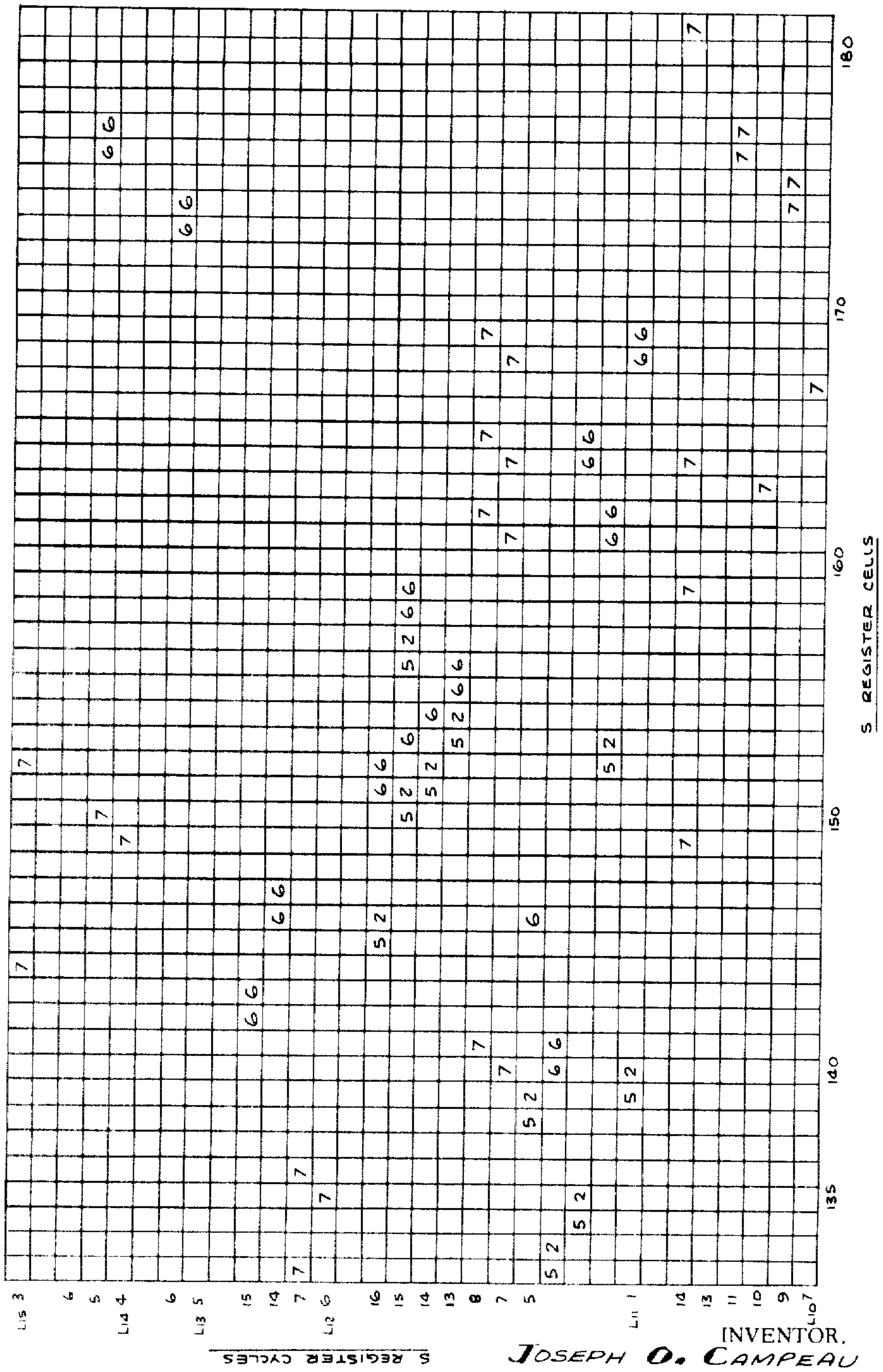
Figure 17C:
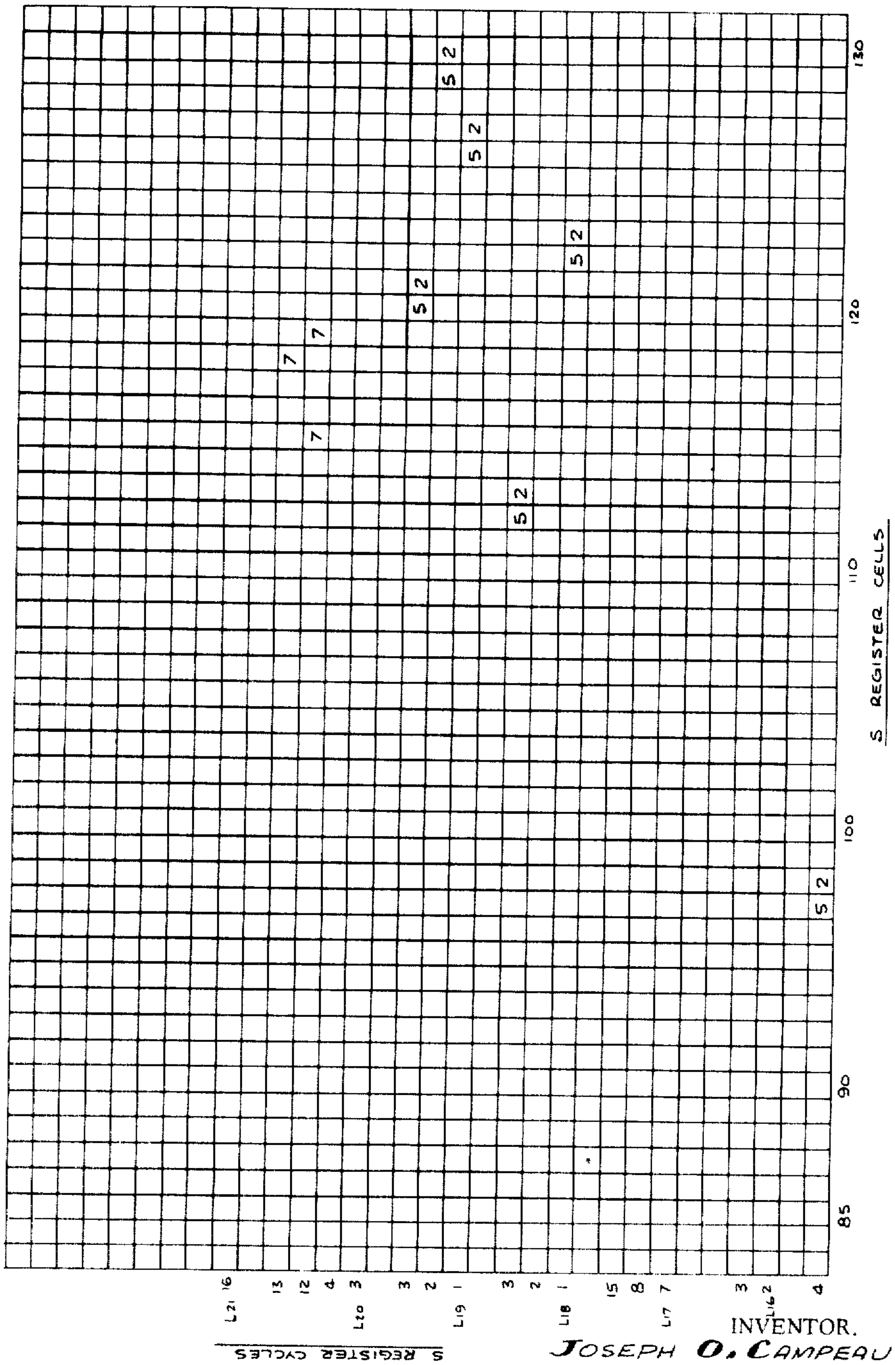
Figure 17D:
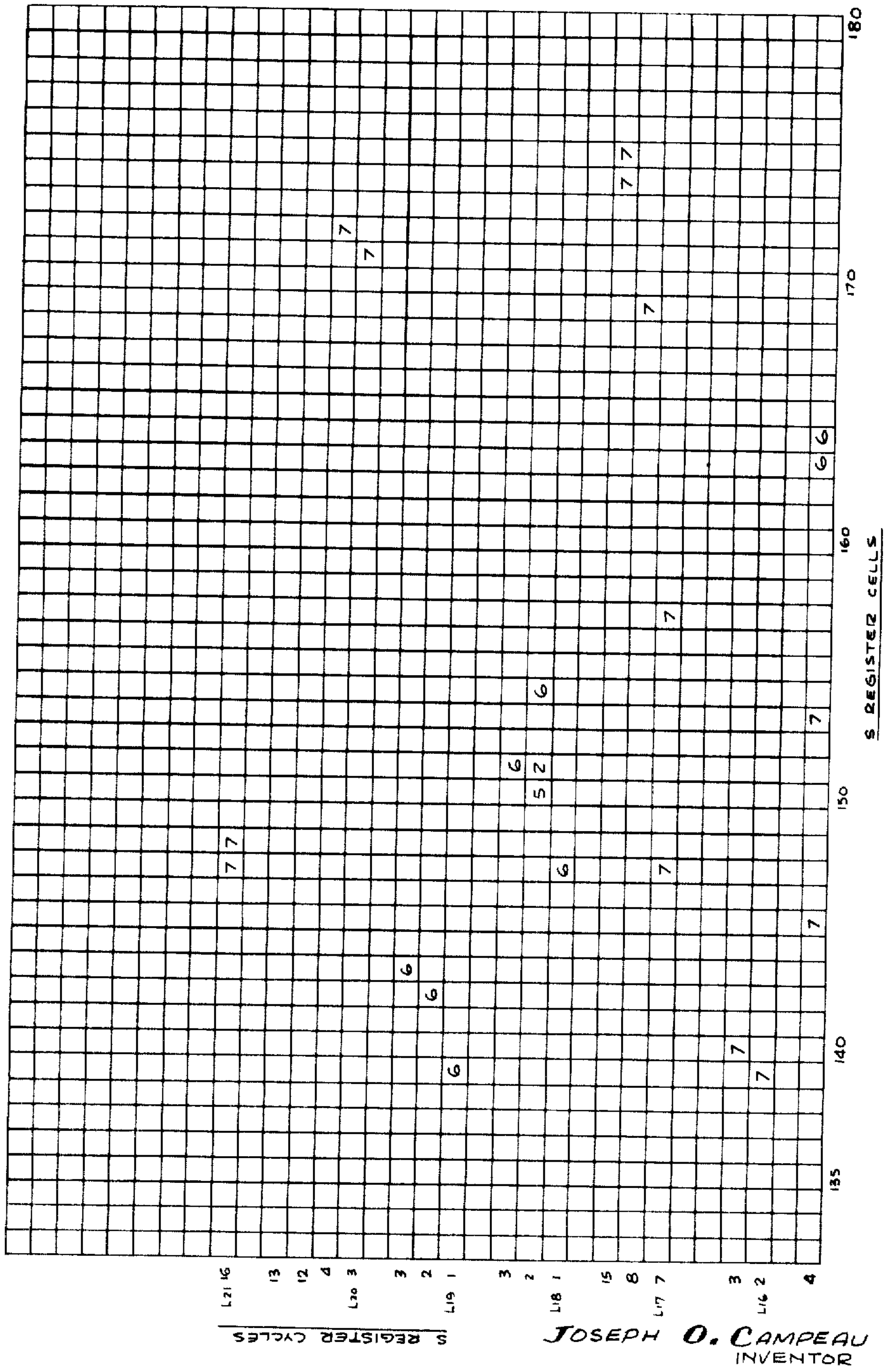
Figure 18A:
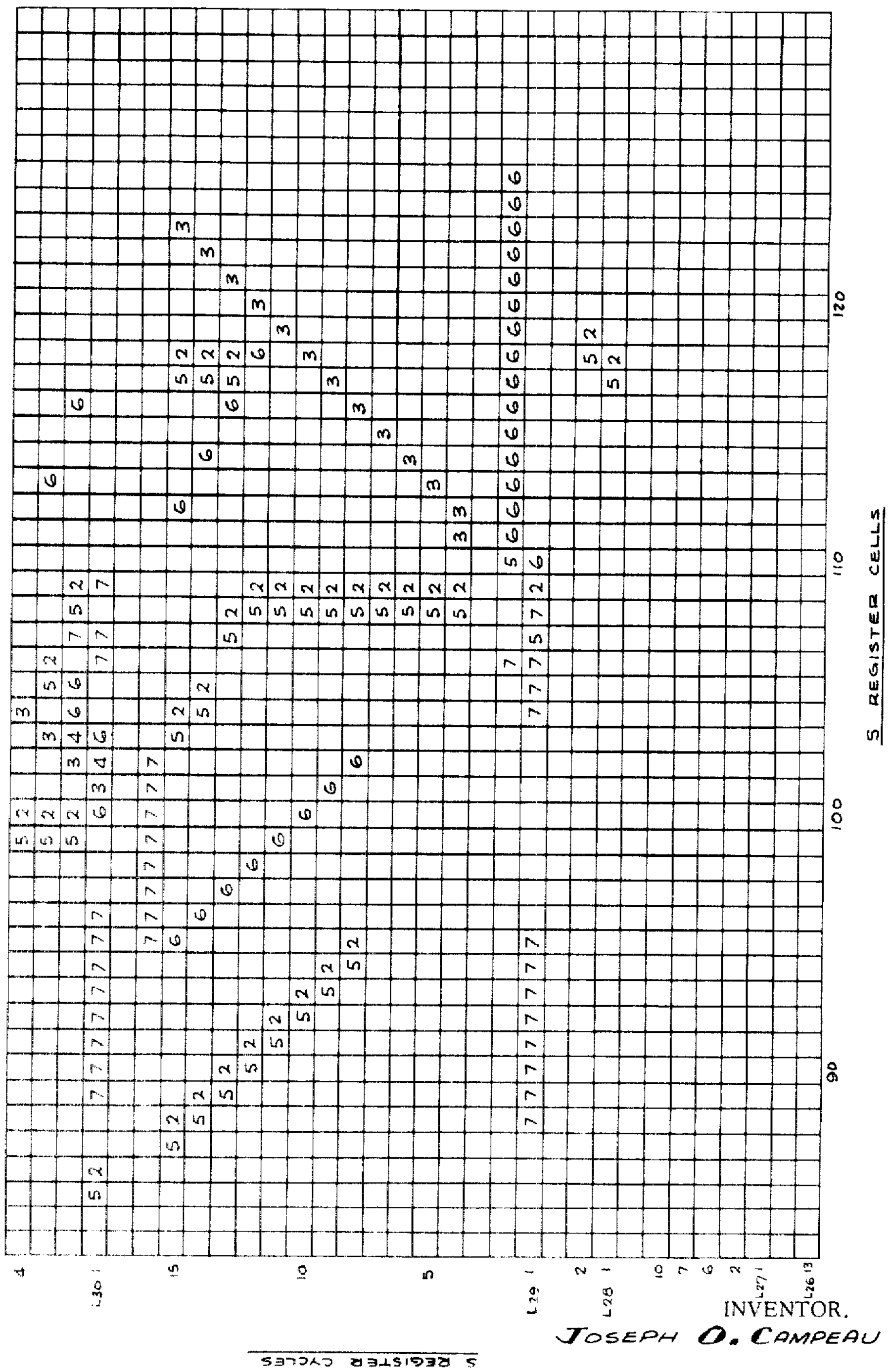
Figure 28B:
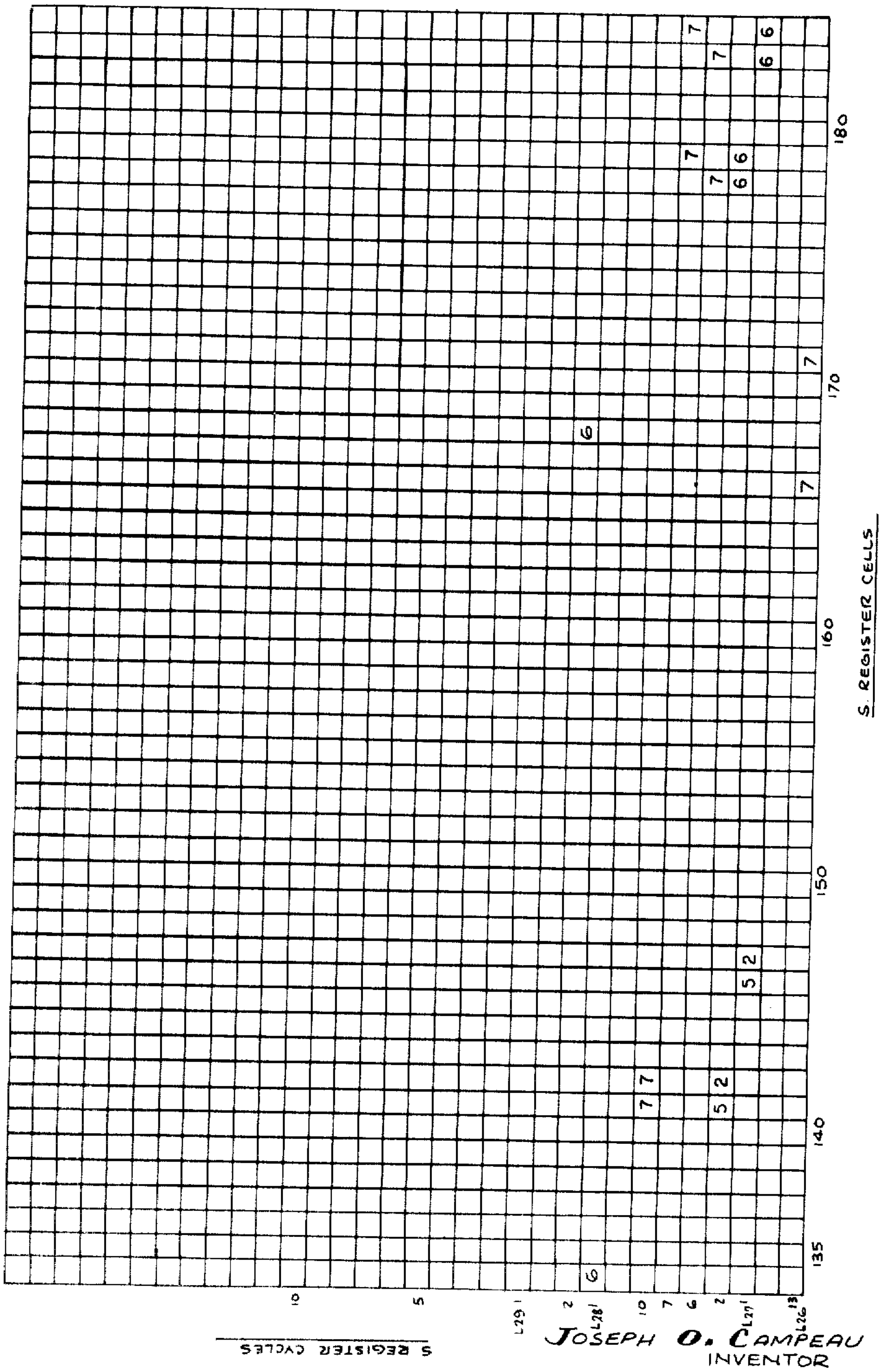
Figure 18C:
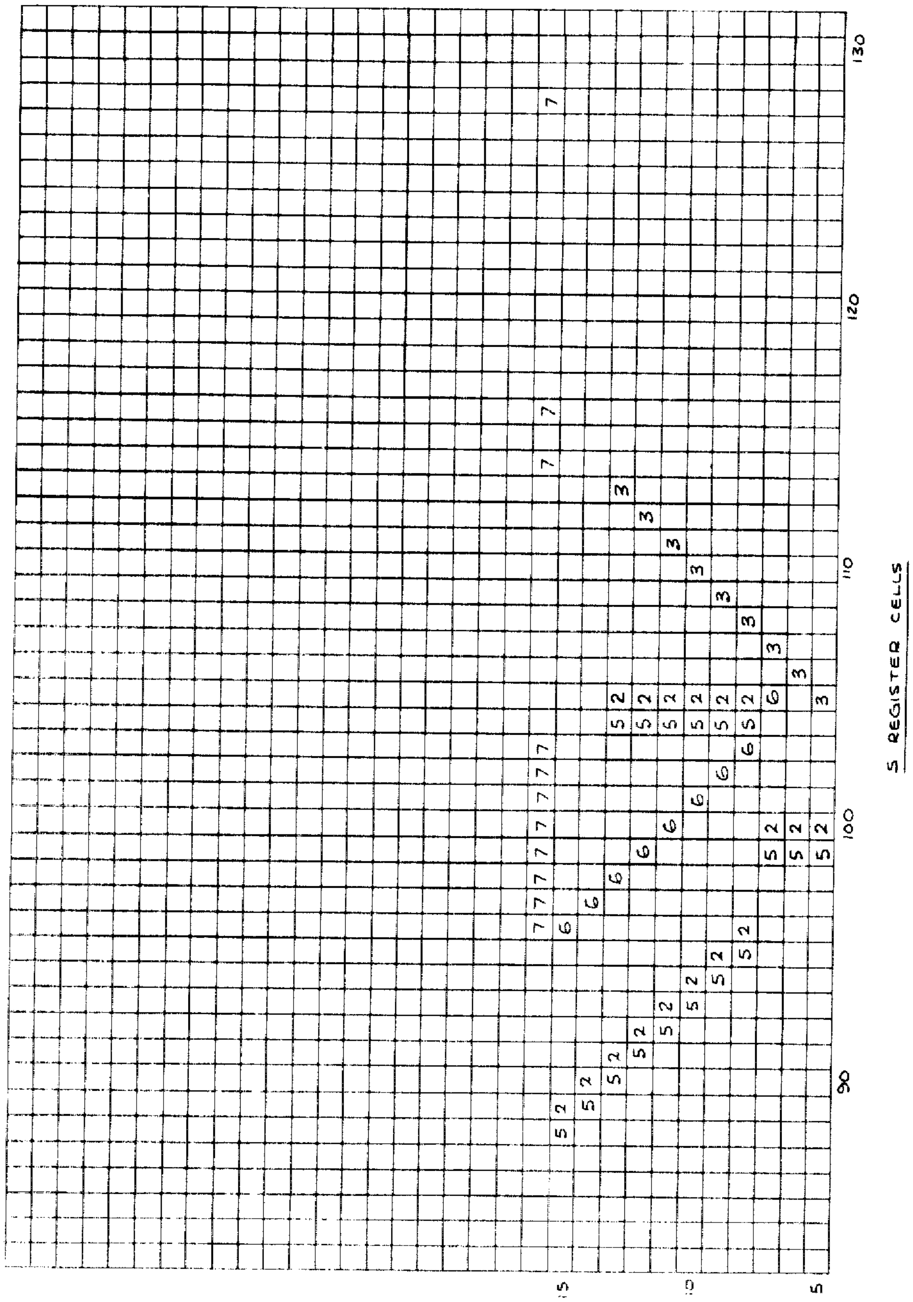
Figure 19:
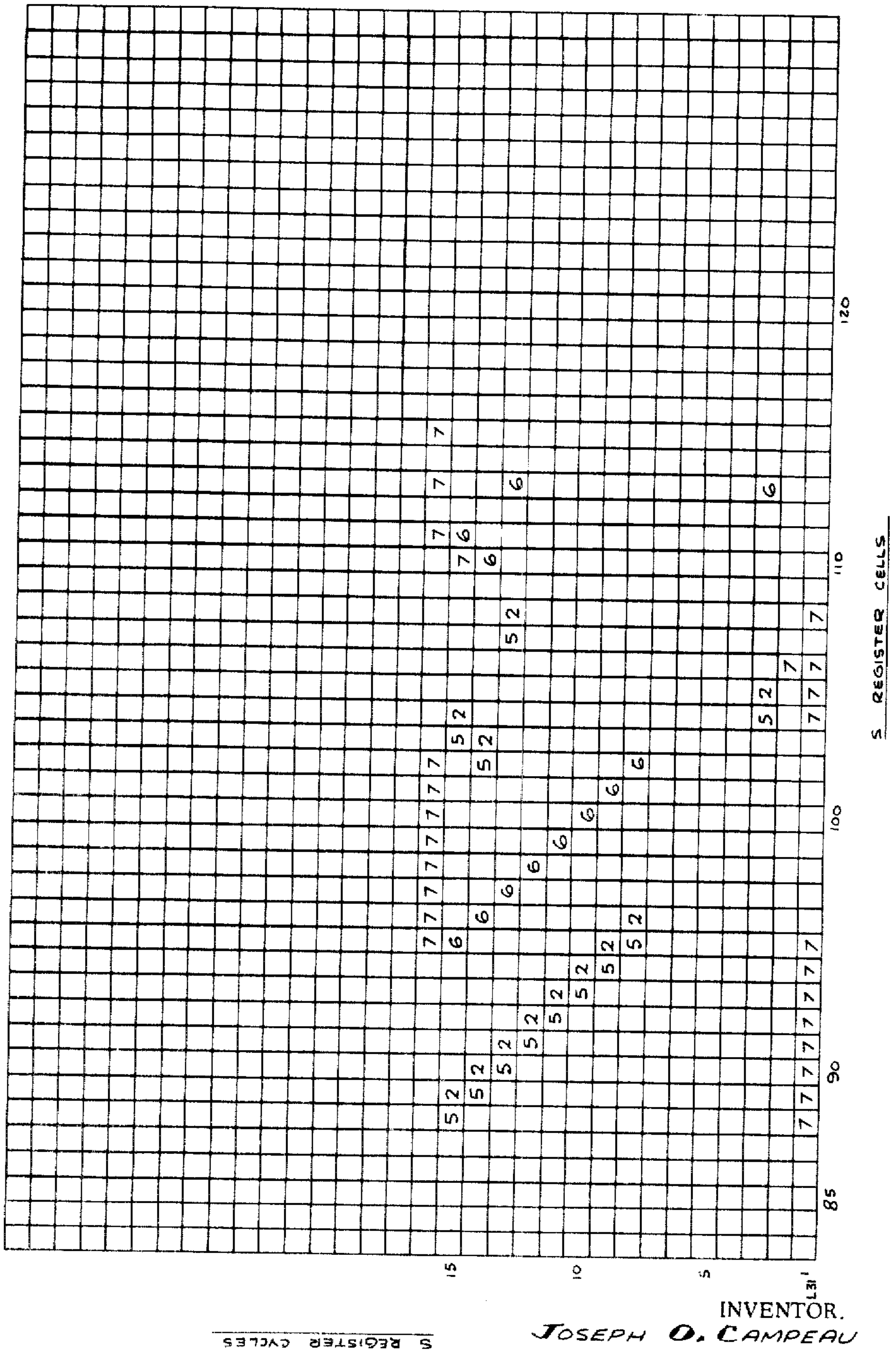

FIGURES 13*a, b* illustrate a complete program of the operation of the device of FIGURE 2 as a calculator;

FIGURE 14 illustrates the combination of FIGURES 14*a, b, c,* and *d*;

FIGURE 15 illustrates the combination of FIGURES 15*a, b, c,* and *d*;

FIGURE 16 illustrates the combination of FIGURES 16*a, b, c,* and *d*;

FIGURE 17 illustrates the combination of FIGURES 17*a, b, c,* and *d*;

FIGURE 18 illustrates the combination of FIGURES 18*a, b,* and *c*; and

FIGURES 14–19 illustrate another complete program of the operation of the present invention.

Figure 1:
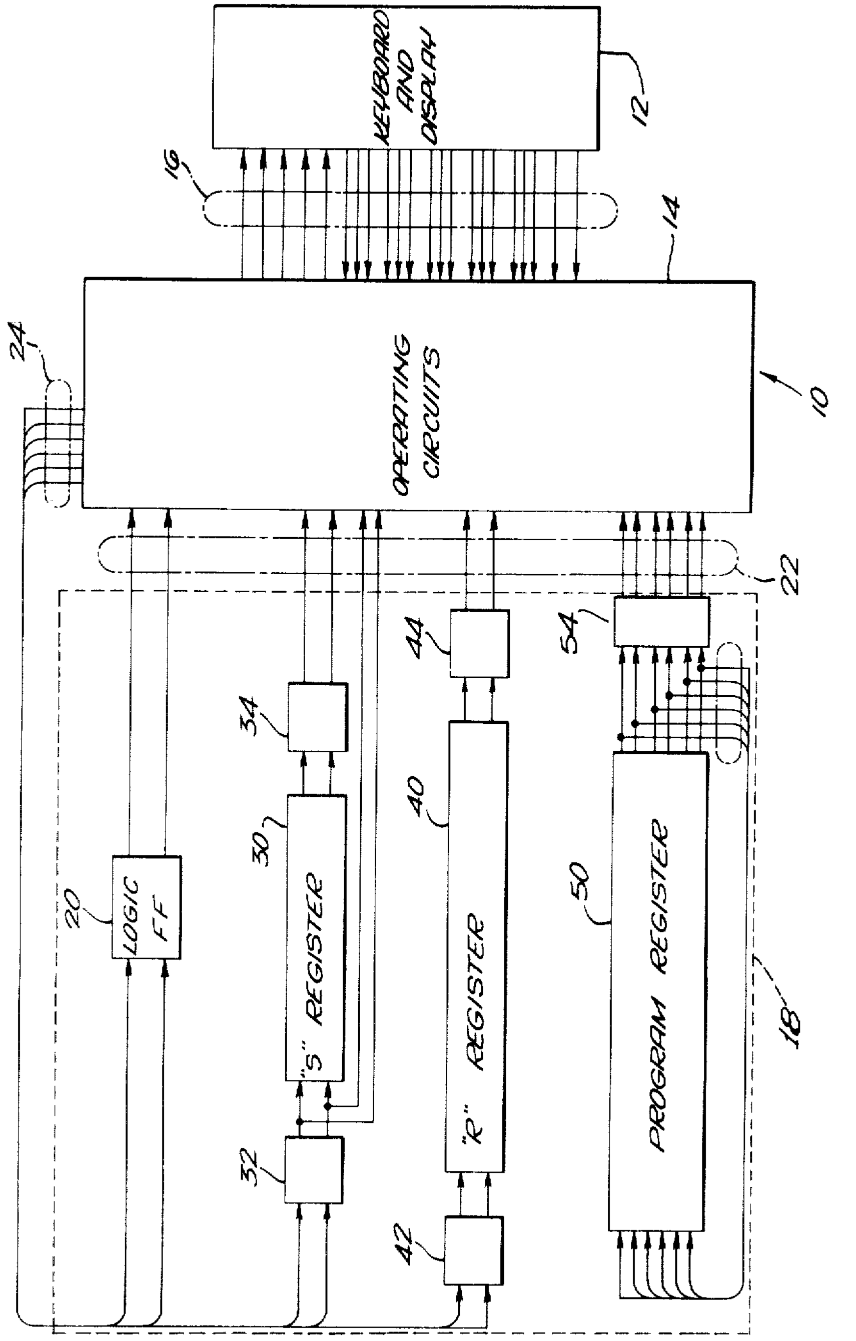
FIGURE 1 is a generalized block diagram of a general purpose digital computer according to the present invention.

With reference to FIGURE 1, a generalized diagram is provided of the necessary components for a general purpose digital computer 10 according to the present invention. A keyboard and display device 12 is used for input of instruction and information signals and provides a means whereby information stored in the computer may be displayed. The keyboard device 12 connects to an operating circuit 14 through a plurality of connecting lines 16. The operating circuit 14 contains "and" gates, "or" gates, inverters, and other logical circuit elements which perform logical operations upon signals.

A memory portion 18 of the computer 10 includes, in one embodiment of the invention, a binary storage element 20 and three circulating registers 30, 40, 50. The binary element 20 may be the well-known bistable multivibrator or flip-flop circuit having two inputs and two corresponding outputs. Input and output cables 22, 24 contain all the electrical conductors necessary to permit full communication between all elements of the memory 18 and the operating circuits 14.

A circulating short, or "S" register 30 is provided with an input, or "write" staticizer 32 and an output, or "read" staticizer 34 connected to the operating circuit output cable 24, and both are connected to the input cable 27. A binary digit, represented by a one of the levels of a bilevel signal, circulates in the register under control of a synchronizing timing pulse generator (not shown), and the signal is periodically applied to the read staticizer 34, from which it is transmitted to the operating circuits 14. At the same time, information signals, for instance from the read staticizer 34, are sent from the operating circuit 14 to the input, or write staticizer 32, for insertion into the circulating "S" register 30.

A second, longer, "R" register 40 is provided, which, in one embodiment, is approximately fifteen times the length of the "S" registed 30. A write, or input staticizer 42, and a read, or output statcizer 44 are respectively connected to logical output and input cables 24, 22 for communication with the operating circuits 14.

A third, or program circulating "P" register 50 is slightly longer than the combined length of the S and R information registers 20, 30. In one embodiment, the program register 50 has one cell more than the S and R registers 30, 40 combined. The P register 36 has only an output staticizer 54, inasmuch as program information merely circulates without alteration. To provide a plurality of different program signals, the P register 50 is made up of three synchronously operated registers of equal length, operating in parallel. The combined output is taken from three parallel staticizers as an eight-valued program signal combination to control operations within the operating circuit 14.

To provide adequate memory storage when functioning as a digital computer, so as not to disturb the relative length of the short and long information loops, the P register is expanded to approximately 31, 3,000-cell cycles and provides more than enough memory storage. Such a program register may, for the most part, repeat portions of the 3,000 bit program to maintain the first or calculator mode of operation, and to preserve certain signals in the calculator mode. The added capacity is necessary only in the general purpose digital computer mode.

A preferred mechanization of the computer 10 of FIGURE 1 is shown in FIGURE 2. As in the computer of the copending Steele application, it has been found desirable to utilize a magnetic drum for both signal storage and for circulating registers.

A computer 100 is shown which includes a keyboard 102, a display device 104, operating circuits 106, and a memory 108. The keyboard 102 may be any conventional assemblage of keys connected to a plurality of permutation bars or selector switches which provide a combination of signals on a plurality of output lines. Each key generates a unique combination of signals. Digital keys 110 generate signal combinations representing the decimal digits 0 through 9. Special digital keys ①, ⓪, 110′ are used in the computer operation. Control keys 112 apply special control signals to the elements of the operating circuit 106 and toggle switches 114, and three-position switch 115 supply additional special operating signals.

There are two modes of operation according to one embodiment of the computer, which are selected by one of the switches 114 on the keyboard 102. For one of the modes, a 10-key-keyboard, of the type well known in the art of calculating machines, is provided for the entry of decimal digits, additional individual keys 112 are provided to control display and reset operations, and further additional keys 110′, and a three-position switch 115 are provided governing operation as a general purpose computer.

Without going into the internal operation of the computer at this time, it is possible to describe the external response of the machine as it appears when functioning as a desk calculator. In order to add two decimal digits, say 5 and 7, an operator depresses the "5" key, 110 first, then the "7" key, 110, and finally the Display key 112. A display device 104, such as a stepping counter, presents visually, the decimal numerals 1 and 2, representing as the sum of the addition of 7 and 5, the quantity 12.

Insofar as the operator is concerned, the machine is similar to an electro-mechanical desk calculator. However, it is easily seen that the present invention is an entirely different machine, resembling the digital computer disclosed in the copending Steele application.

When functioning as a general purpose digital computer, the operator uses individual digital keys ① and ⓪ 110′. The main memory of the machine can be filled with individual binary signals, representing instructions and information. When the operator fully depresses the switch 115, the machine performs the necessary operations directed by the instruction signals and, when enabled by actuation of Display key 112, provides a succession of binary digital signals accompanied by a Trigger signal. The output signals can be recorded either by an output device or may be displayed on the face of a cathode ray tube 117.

The display device 104 has a plurality of interconnected stepping decimal counters (not shown) which provide a numerical display 116. The display portions of two such counters are shown here, by way of illustration. The display device 104 receives a "Count" signal and a "Reset" signal, from the operating circuits 106 for counting and resetting, respectively, when in the calculate operation. For use in the computing modes, the cathodes ray tube 117, having means to retain the information supplied, provides a visual display of the computer output either as a signal train of symbols or as a trace of pulses representing "1's" and "0's" in response to an applied Trigger signal and Read "1" and Read "0" signals.

A logic or "L" flip-flop 120 is shown outside of the memory 108 and the operating circuits 106. The "L" flip-flop 120 may be any bistable multi-vibrator having "Set" and "Zero" inputs, and providing complementary outputs, i.e., L and L′, respectively, representing the two stable states of the flip-flop which may be the binary "1" and binary "0." The operating circuits 106 apply a "Set L" signal and a "Zero L" signal to the L flip-flop 120 for placing the flip-flop into its stable states.

The circulating registers of FIGURE 1 are mechanized in this embodiment through the use of a magnetic drum 108′. A portion of a channel on the drum 108′ in combination with suitable reading and writing circuits may be considered a circulating register, and, if reading and writing circuits are provided with means for interconnection, the drum 108′ can provide a register of any desired length or capacity. Information taken from the drum 108′ is reinserted into the write circuits either unaltered or modified by logical operation or, it is replaced by new information from an external source.

In the computer of FIGURE 2, the "S" or short register may be represented by the segment of a first channel 130 between an "$S_w$" write head 131 and an "$S_r$" read head 133. The heads are arranged so that information recorded by the "$S_w$" write head 131 is carried to the "$S_r$" read head 133 where it is detected at a later time. An "$S_w$" write flip-flop and amplifier 132 is connected to provide writing signals to the $S_w$ write head 131, and an "$S_r$" read amplifier and flip-flop is connected to the $S_r$ read head 133 to staticize the signals detected. The operating circuits 106 apply "Set $S_w$" and "Zero $S_w$" signals to the $S_w$ flip-flop 132 which applies corresponding writing signals representative of binary 1 and binary 0, respectively, to be recorded in the first channel 130.

A section of a second channel 140 is used for the "R" long register. The R register channel 140 is provided with an "$R_w$" write head 141 and an "$R_r$" read head 143. Information recorded by the "$R_w$" write head 141 travels through almost a full revolution of the drum 108′ before being detected by the "$R_r$" read head 143. An "$R_w$" flip-flop and amplifier 142 is connected to the operating circuits and receives "Set $R_w$" and "Zero $R_w$" signals to place the flip-flop in the respective states. The outputs of the $R_w$ flip-flop amplifier 142 are applied to the $R_w$ write head 141 to record binary 1 and 0 signals in the R register 140. An "$R_r$" amplifier and flip-flop 144 is connected to the $R_r$ read head 143 and detects signals from the drum 108′ and is placed in either the $R_r$ and $R_r'$ state.

A third channel 146 has a timing track of equally spaced signals permanently recorded therein. Timing signals, detected by a clock pulse read head 147 are applied to a clock pulse read amplifier and shaper 148 which in turn supplies timing or clock pulses $C_p$ to synchronize the operating circuits 106.

A set of three channels 150 on the drum contains program information for a particular application. The program can be altered by special circuitry not here shown. A set of three "P" or program read heads 151, 152, and 153, respectively, apply program signals to each of three program read flip-flops and amplifiers. The $P_1$ amplifier and flip-flop 154 is connected to the first or $P_1$ read 151, a $P_2$ read amplifier and flip-flop 155 is connected to the $P_2$ read head 152 and a $P_3$ read amplifier and flip-flop 156 is connected to the output of the $P_3$ read head 153.

An input cable 160 carries signals from the various memory elements into operating circuits 106. The individual signals of the component input lines are labeled variously $P_1$, $P_1'$, $P_2$, $P_2'$, $P_3$, $P_3'$, $C_p$, $R_r$, $R_r'$, $S_r$, $S_r'$, $S_w$, and $S_w'$. An operating circuit output cable 162 applies signals to the $S_w$ and $R_w$ write flip-flops and amplifiers, 132, 142. These output signals are; Set $S_w$, Zero $S_w$, Set $R_w$, and Zero $R_w$.

In order to facilitate the description of the operation of the computer 100, the different signals of the system are summarized below in the following table:

*Table 1*

| Element | Receives Input Signals | Provides Output Signals |
|---|---|---|
| Logic flip-flop "L" | Set L, Zero L | L, L′ |
| Short Register, "S" | Set $S_w$, Zero $S_w$ | $S_r$, $S_r'$, $S_w$, $S_w'$ |
| Long Register, "R" | Set $R_w$, Zero $R_w$ | $R_r$, $R_r'$ $R_w$, $R_w'$ |
| Program Register, "P" | | $P_1$, $P_1'$, $P_2$, $P_2'$, $P_3$, $P_3'$ |
| Input Key "0" | | $B_1$, $B_2'$, $B_3'$, $B_4'$ |
| Input Key "1" | | $B_1$, $B_2'$, $B_3'$, $B_4'$ |
| Input Key "2" | | $B_1'$, $B_2$, $B_3'$, $B_4'$ |
| Input Key "3" | | $B_1$, $B_2$, $B_3'$, $B_4'$ |
| Input Key "4" | | $B_1'$, $B_2'$, $B_3$, $B_4'$ |
| Input Key "5" | | $B_1$, $B_2'$, $B_3$, $B_4'$ |
| Input Key "6" | | $B_1'$, $B_2$, $B_3$, $B_4'$ |
| Input Key "7" | | $B_1$, $B_2$, $B_3$, $B_4'$ |
| Input Key "8" | | $B_1'$, $B_2'$, $B_3'$, $B_4$ |
| Input Key "9" | | $B_1$, $B_2'$, $B_3'$, $B_4$ |
| Display Key— | | |
| Calculator Mode | | $B_1$, $B_2$, $B_3$, $B_4$ |
| Computer Mode | | DISPLAY |
| Display Device— | | |
| Calculator Mode | Count, Reset | Displays Decimal Digits or Digital Pulses. |
| Computer Mode | Trigger, Read "1", Read "0" | |
| ① | | ①u, ①d |
| Ⓞ | | Ⓞu, Ⓞd |
| Ⓜ | | Ⓜ |
| Ⓕ | | Ⓕ |
| Ⓒ | | Ⓒ |
| Calculator-Computer Switch | | Φ, Φ′ |

In operation, information is entered into the computer 100 either by depressing one of the digital entry keys 110 of the keyboard 102 for the calculator mode or, by depressing one of the keys 115, when operating as a computer. For example, the 7 key is depressed and the keyboard 102 provides signals to the operating circuits 106 on output lines $B_1$, $B_2$, $B_3$, and $B_4$. Signals having a value of binary "1" are identified by a designation of the source, i.e., $B_1$, and, if the signal has a value of binary "0," the designation is primed, $B_1'$. Combinations of program signals are applied to the operating circuits 106 on the various lines of the cable 160, the signals representing the binary combination, $B_1$ to the $S_w$ write flip-flop and amplifier 132. The S register 130, then contains signals representing respectively, $B_1$, $B_2$, $B_3$, $B_4'$ in four predetermined locations.

A second number for example, 5, may be set into the computer 100 by depressing the 5 key. Signals are provided, representative of the binary combination $B_1$, $B_2'$, $B_3$, $B_4'$ to the operating circuits 106 and, under the control of signals from the program channels 150, a second series of signals is entered into the S register 130. The two numbers are added, in a manner to be explained more fully below. If the result of the addition is desired, the Display key 112 is depressed and a special signal combination, $B_1$, $B_2$, $B_3$, $B_4$ is applied to the operating circuits 106.

Information signals are transferred to the S register 130, and, at the proper combination of program signals, certain selected signals from the $S_r$ read amplifier and flip-flop 134 and from the L flip-flop 120 are combined within the operating circuits 106 to apply a Reset pulse, and then twelve successive Count pulses to the counter 104. The display windows 116 then show the numerals 1 and 2, the decimal sum of 7 and 5. The total is held until the next time the Display key is energized when the Reset signal is again applied.

In operation as a digital computer, the proper toggle switch 114 is placed in the computer position and the three-position switch is set in the Mark or uppermost position. The registers are cleared and the machine is readied for operation. Next the switch is moved into the Fill position and individual binary digits can be entered with the 1 and 0 digital entry keys 110′. When all information has been entered, including numbers and instructions, the switch is then moved to the Compute position. Computations are performed in a manner to be described below. Actuation of the display key 112 gates a trigger signal into the Display device 104 after which a stream of Read "1" and Read "0" signals are applied to the screen of the display tube 117, representing the contents of an internal register that has been programmed to contain an answer.

The basic operations of the computer are dictated by program signals, stored in the Program register 150. Each of the eight possible program signal combinations may be represented by an octal number and a corresponding symbol, as well as by a name. In Table 2, one set of instructions is set forth and a brief description of the operation controlled is included. It should be understood that the number of instructions available in a set is solely dependent upon the number of program registers desired by the designer. The function of each instruction can be selected at will, limited only by the imagination and ingenuity of the individual preparing the program. The instructions in Table 2 are representative only and may be used in the generation of complex logical equations.

TABLE 2

| $P_1$ | $P_2$ | $P_3$ | Octal Number | Graph Symbol | Instruction | Does |
|---|---|---|---|---|---|---|
| 0 | 0 | 0 | 0 | | Do nothing | Circulate long and short registers, logic flip-flop unaffected. |
| 1 | 0 | 0 | 1 | . | "Or" | The exclusive "or" or logical difference of the number in S register and the number in the L flip-flop, place result in L flip-flop, circulate S and R registers |
| 0 | 1 | 0 | 2 | X | "And" | The logical product of the number in the L flip-flop and S register, result in L; circulate and S and R registers. |
| 1 | 1 | 0 | 3 | L | Load | (a) Calculator.—Enter E signal in L flip-flop, circulate R register: If L=0, read in information from $B_i$'s gated by $S_r$ and $R_r$ into $S_w$. L=1, Read out operation. |

TABLE 2—Continued

| $P_1$ | $P_2$ | $P_3$ | Octal Number | Graph Symbol | Instruction | Does |
|---|---|---|---|---|---|---|
| | | | | | | (see sub-tables below) |

| L | $S_r$ | $R_r$ | Select |
|---|---|---|---|
| 0 | 0 | 0 | $B_1$ |
| 0 | 0 | 1 | $B_2$ |
| 0 | 1 | 0 | $B_3$ |
| 0 | 1 | 1 | $B_4$ |
| 1 | 0 | | Count |
| 1 | 1 | | Reset |

(b) Computer.—If L=0, Input from keyboard written into $S_w$. If L=1, Output from $R_r$ Read flip-flop.

| L | $S_r$ | $R_r$ | $S_w$ | Select |
|---|---|---|---|---|
| 0 | 1 | 1 | 0 | $\textcircled{M}$ |
| 0 | 1 | 1 | 1 | $\textcircled{F}$ |
| 0 | 0 | 1 | 1 | $\textcircled{C}$ |
| 0 | 0 | 1 | 0 | $\textcircled{0}_d$ |
| 0 | 0 | 0 | 1 | $\textcircled{1}_d$ |
| 0 | 1 | 0 | 0 | $\textcircled{0}_u$ |
| 0 | 1 | 0 | 1 | $\textcircled{1}_u$ |
| 1 | 0 | | | Read—$R_r$ |
| 1 | 1 | | | Trigger |

| $P_1$ | $P_2$ | $P_3$ | Octal Number | Graph Symbol | Instruction | Does |
|---|---|---|---|---|---|---|
| 0 | 0 | 1 | 4 | 0 | Set 0 | Circulate S and R register, place 0 in L flip-flop. |
| 1 | 0 | 1 | 5 | 1 | Set 1 | Circulate S and R registers place 1 in L flip-flop. |
| 0 | 1 | 1 | 6 | ∠ | Transfer | Transfer contents of L flip-flop to S register, circulate R register. |
| 1 | 1 | 1 | 7 | VΛ | Interchange | Transfer contents of S register to R register, R register to S register. L flip-flop is unaffected. |

In order to carry out the above instructions, it is first necessary to derive a set of logical equations prescribing the behavior of the various components. For example, it may be seen that for all instructions except 7 or Interchange, the contents of the R register are circulated. Expressed in words: A "Set $R_w$" signal should be generated on the occurrence of octal signals 0 through 6 if a $R$="1" signal has been staticized by the $R_r$ read amplifier and flip-flop 144; a set $R_w$ signal is provided at octal 7 only if an $S=1$ signal has been staticized by the $S_r$ flip-flop and amplifier 134; and a "Zero $R_w$" signal is generated at all other times, which can be expressed as the complement of the "Set $R_w$" signal. The logical equations are:

$$\text{Set } R_w=(0+1+2+3+4+5+6)R_r+(7)S_r \quad (5)$$

$$\text{Zero } R_w=(\text{Set } R_w)' \quad (6)$$

From this equation, a simpler form may be derived by expressing the octal numbers as a combination of the individual program signals and simplifying the equations:

$$\text{Set } R_w=P_1P_2P_3S_r+(P_1P_2P_3)'R_r=P_1P_2P_3S_r+(P_1'+P_2'+P_3')R_r \quad (7)$$

$$\text{Zero } R_w=(\text{Set } R_w)' \quad (8)$$

In similar fashion, equations may be derived from Table 2 for recording in the S register 130.

$$\text{Set } S_w=(0+1+2+4+5)S_r+(6)L+(7)R_r+(3)[(B_1R_r'S_r'+B_2R_rS_r'+B_3R_r'S_r+B_4R_rS_r)\Phi'+(\textcircled{M}R_rS_rS_w'+\textcircled{F}R_rS_rS_w+\textcircled{C}R_rS_r'S_w+\textcircled{O}_dR_rS_r'S_w'+\textcircled{1}_dR_r'S_r'S_w+\textcircled{O}_uR_r'S_rS_w'+\textcircled{1}_uR_r'S_rS_w)\Phi] \quad (9)$$

$$\text{Zero } S_w=(\text{Set } S_w)' \quad (10)$$

Equations 9 and 10 can be changed to:

$$\text{Set } S_w=P_2'S_r+P_3'P_1'S_r+P_1'P_2P_3L+P_1P_2P_3R_r+P_1P_2P_3'[(B_1R_r'S_r'+B_2R_rS_r'+B_3R_r'S_r+B_4R_rS_r)\Phi+\textcircled{M}R_rS_rS_w'+\textcircled{F}R_rS_rS_w+\textcircled{C}R_rS_r'S_w+\textcircled{O}_dR_rS_r'S_w'+\textcircled{1}_dR_r'S_rS_w+\textcircled{O}_uR_r'S_rS_w'+\textcircled{1}_uR_r'S_rS_w)\Phi] \quad (11)$$

$$\text{Zero } S_w=(\text{Set } S_w)' \quad (12)$$

For the L flip-flop 120, the following equation may be derived:

$$\text{Set } L=(0+6+7)L+(1)(S_rL'+LS_r')+(2)LS_r+(5)+(3)E \quad (13)$$

$$\text{Zero } L=(0+6+7)L'+(1)(S_rL+L'S_r')+(2)(L'+S_r')+(3)E+(4) \quad (14)$$

With the flip-flop, however, if it is already in a given state, it is unnecessary to apply a signal to place it in the same state. Therefore, the L terms are redundant in Equation 13 and similarly the L' terms are redundant in Equation 14. The equations may then be reduced to:

$$\text{Set } L=(1)S_rL'+(5)+(3)E \quad (15)$$

$$\text{Zero } L=(1)LS_r+(2)S_r'+(3)E'+(4) \quad (16)$$

By substituting the program signals for the octal numbers;

$$\text{Set } L=P_1P_2'P_3'S_rL'+P_1P_2P_3'E+P_1P_2'P_3 \quad (15a)$$

However, inspection of the first and third terms of 15*a* reveals that the term $P_3'$ is redundant in the first term and may be omitted. The reduced equations are:

$$\text{Set } L=P_1P_2'S_rL'+P_1P_2P_3'E+P_1P_2'P_3 \quad (17)$$

$$\text{Zero } L=P_1P_2'P_3'LS_r+P_1P_2'P_3S_r'+P_1P_2P_3'E'+P_1'P_2'P_3 \quad (18)$$

In reducing the equations to their simplest form, it may be recalled that certain logical manipulations are possible. For example, in the derivation of the R register Equations 5–8, it might be noted that on all octal signals except 7, information is transferred from the R read head 130 to the R write head 131. Since octal 7 is represented by $P_1P_2P_3$, the complement of the signal ($P_1P_2P_3$), is expressible as $P_1'+P_2'+P_3'$ which, taken together with the output signals of the $R_r$ amplifier flip-flop 144, requires a simpler gating configuration.

Combinations of "and," "or" gates, and inverters, suitable for mechanizing the logical equations set forth above, has been shown in diagrammatic form in FIGURES 3–6. In these logical diagrams "and" gates are represented by semicircles with a dot in the center and "or" gates are represented by semicircles with a plus in the center. For purposes of system synchronization, a timing or clock pulse signal $C_p$ has been added as an input to all "and" gates to provide properly coordinated pulse outputs to the L flip-flop 120 and the Write flip-flops and amplifiers 132, 142.

Figure 3:
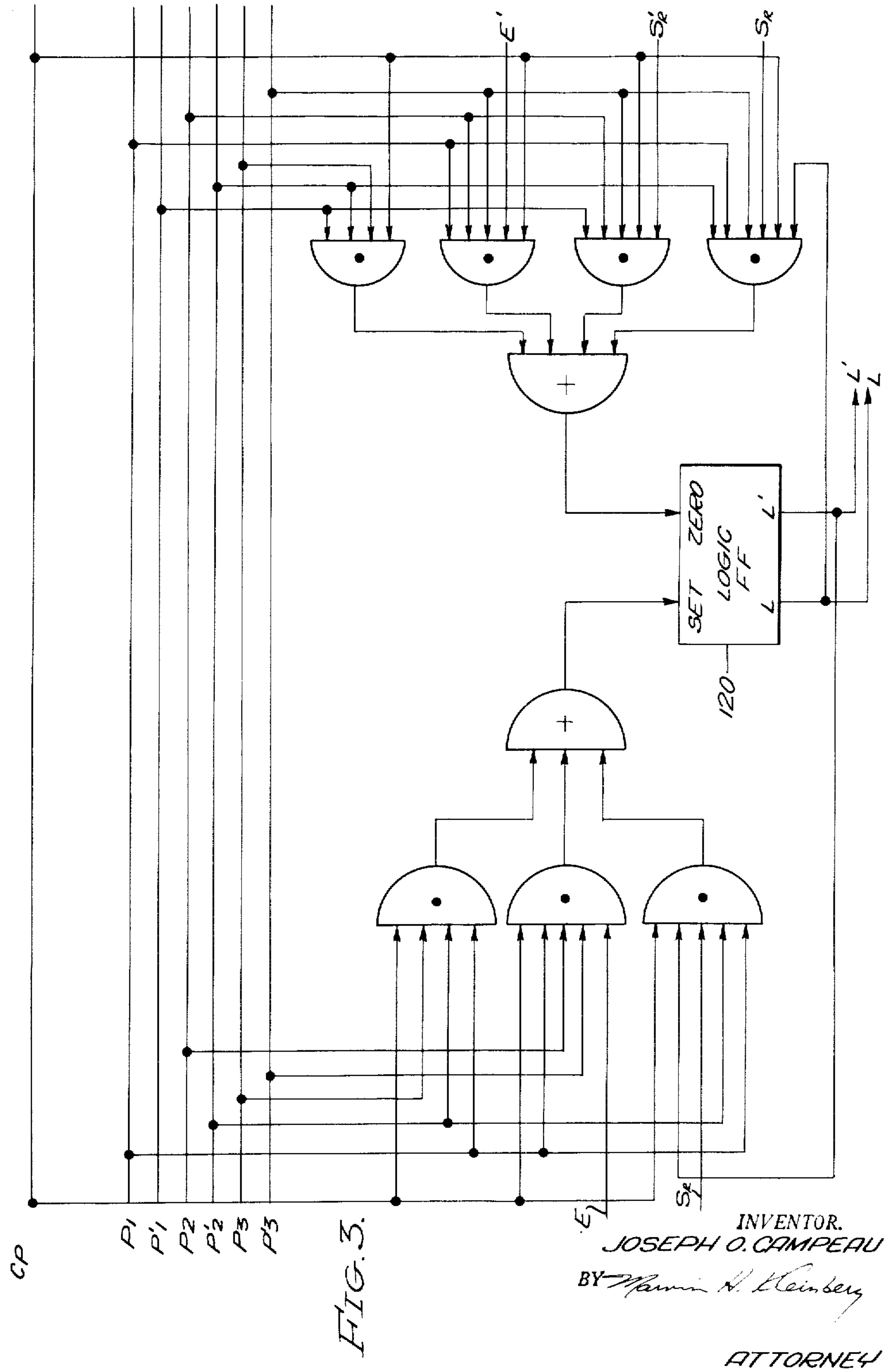
FIGURE 3 is a block diagram of logic circuits suitable for applying signals to the Logic flip-flop of the computer of FIGURE 2.

As may be seen, with reference to FIGURE 3, the input signals from the program registers $P_1$, $P_1'$, $P_2$, $P_2'$, $P_3$ and $P_3'$ are supplied on six signal lines. The proper combinations of these program signals are applied to the various "and" gates as directed by Equations 13 and 14. The resultant output, L and L′ is applied to the operating circuit 106 of FIGURE 2 for utilization in the other gates of the circuit.

Figure 4:
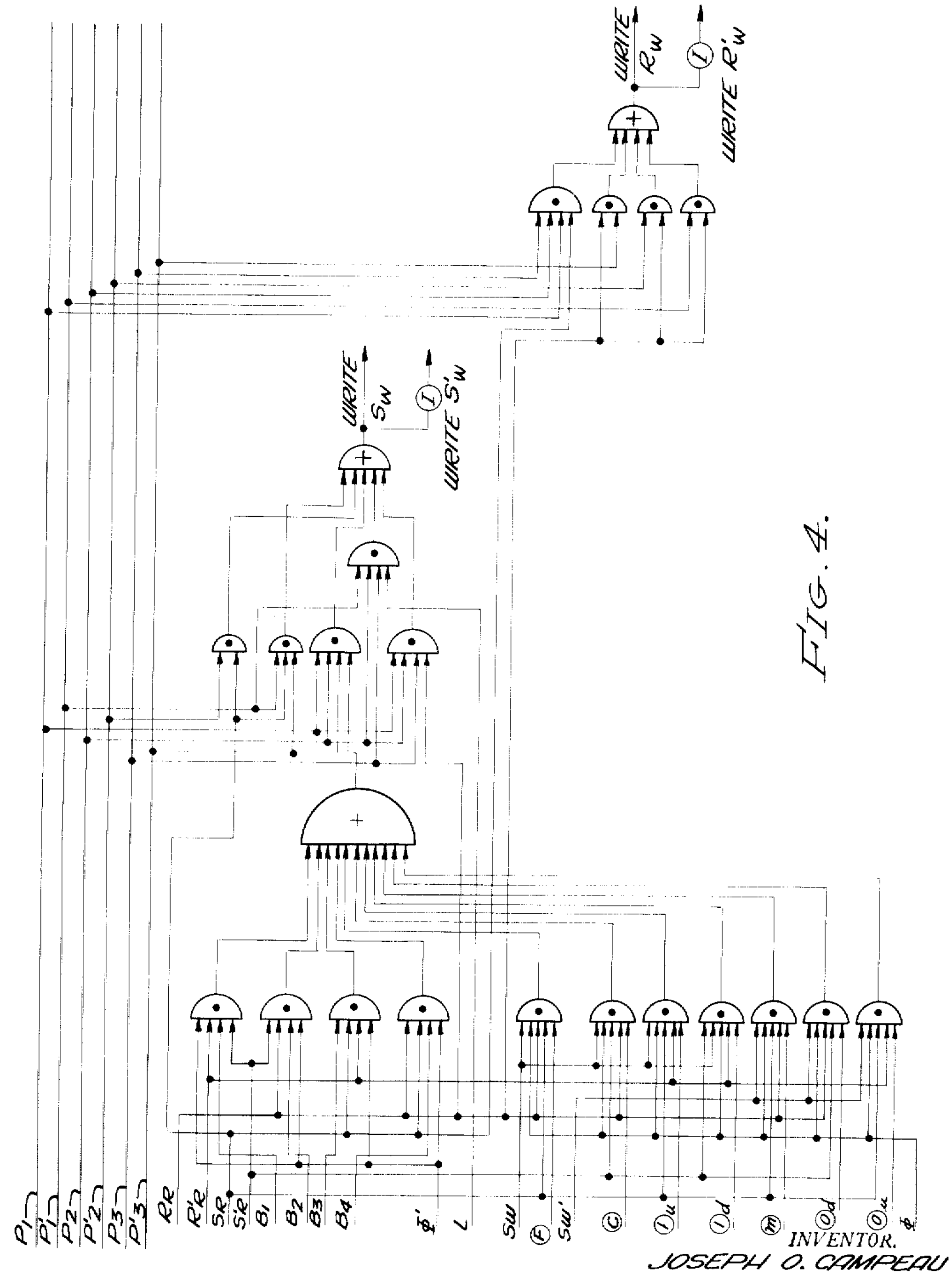
FIGURE 4 is a logic block diagram of gates suitable for inclusion in the operating circuits of the computer of FIGURE 2.

In FIGURE 4, all of the gates necessary to mechanize the write equations have been set forth and the signals enabling these gates have been indicated. Examining the Write Equations 9 and 5, it may be noted that the state of the Logic flip-flop, the $R_r$ read flip-flop and both the $S_r$ and $S_w$ flip-flops, are used as selection signals to gate in signals from the various input sources. The L, L′, $S_r$, $S_r'$, $S_w$, $S_w'$, $R_r$, $R_r'$ signals are provided on separate input lines and are selectively applied to individual ones of the input gates to provide signal input into the $S_w$ Write circuits.

Without going into unnecessary detail, it need only be said that all of the terms of the Write $S_w$ and Write $R_w$ Equations 9 and 5, respectively, have been included in FIGURE 4. Rather than duplicate many of these gates, an inverter amplifier, indicated by a circle with an I therein has been connected to the output of the gating networks to provide the Write $S_w'$ and Write $R_w'$ outputs respectively.

Figure 5:
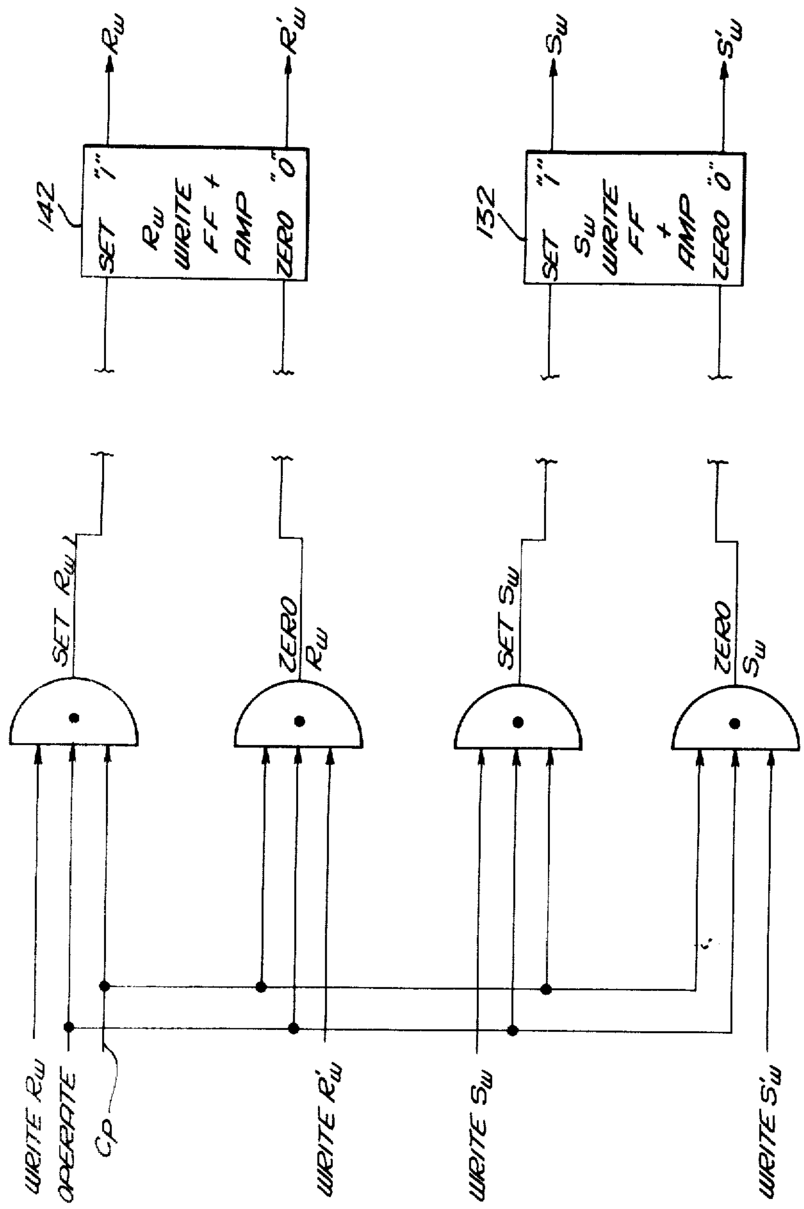
FIGURE 5 is a logic block diagram of a combination of gates for applying write signals to the write circuits of the computer of FIGURE 2.

In FIGURE 5, the outputs of the gates of FIGURE 4 have been applied to "and" gates that are enabled by the timing pulses $C_p$ and by the Operate toggle switch which provides a signal to permit writing of information only when the computer has been set into the operating condition. It may be noted that with the toggle switch in the Ready position, all the writing circuits are disabled.

Figure 6:
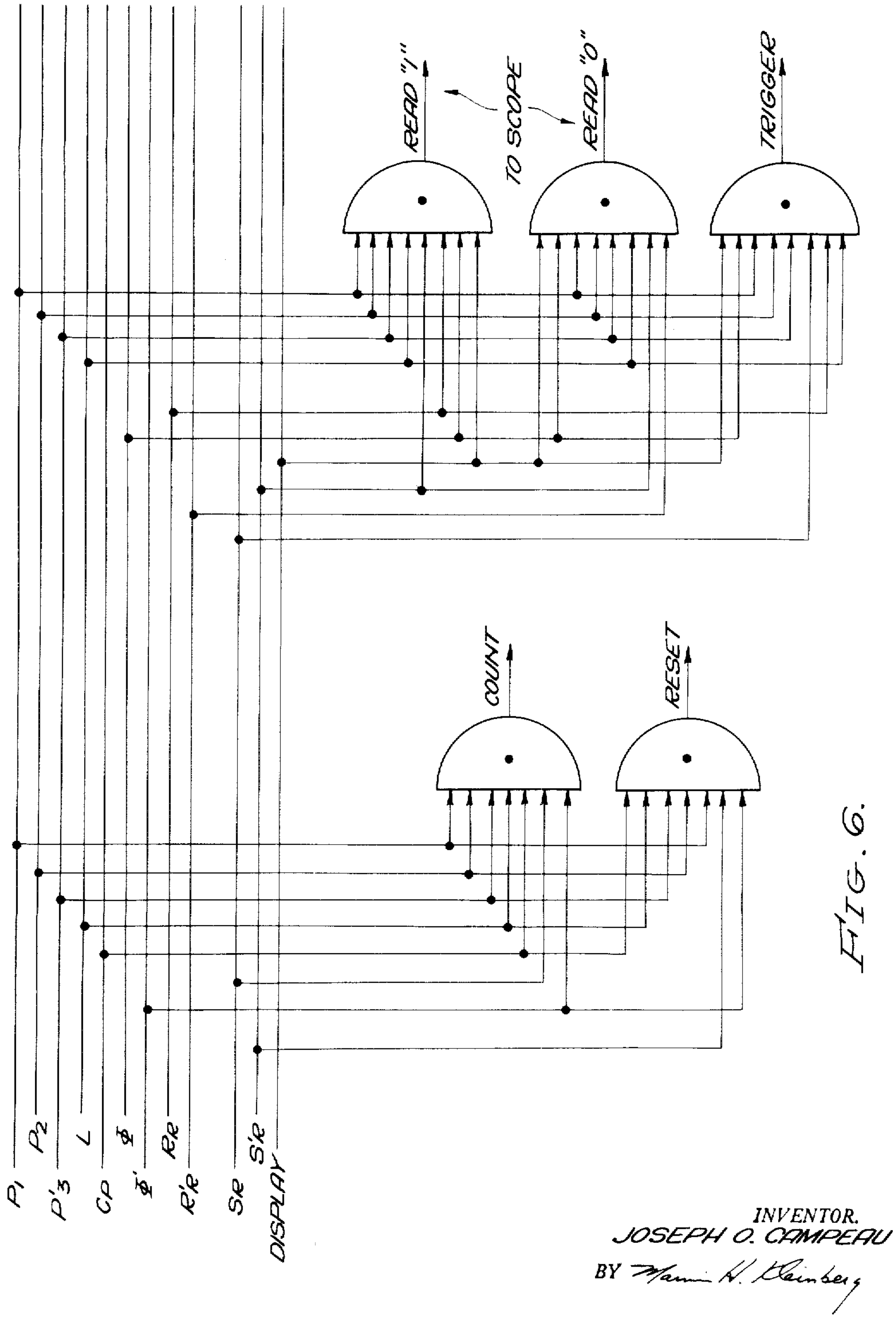
FIGURE 6 is a block diagram of gates suitable for providing output signals to the display device of the computer of FIGURE 2, for both the calculator and computer modes of operation.

In FIGURE 6, the gates which provide the signals to the display and output device 104 have been shown with the enabling inputs applied thereto. The $\Phi'$ signal is applied to enable the Count and Reset outputs when the toggle switch is in the calculator position, and the $\Phi$ signal enables the provision of Read "1," Read "0," and Trigger signals when the toggle switch is in the computer position.

The state of the Logic or L flip-flop, determines whether the Load instruction, octal 3, is an input or or an output instruction. Whenever a 1 is in the Logic flip-flop at the same of a Load instruction, the instruction is to be interpreted as an output operation. In the calculator operation, the signal in the S register identifies the output. A 1 in the S register at the time of a Load gates a Reset Pulse to the ouput device, while a 0 in the S register gates a Count pulse.

In the computer operation, the S register also identifies the output signal. When a 1 is present in the S register at the Load, a Trigger pulse is applied to the cathode ray tube output device. A 0 in the S register gates an output signal which is further determined by the state of the R register read staticizers. A 1 in the R register produces a Read "1" impulse, and a 0 in the R register produces a Read "0" impulse. It may be noted that a signal $\Phi$ is present during the computer operation and its complement $\Phi'$ is present when the machine is operating as a calculator.

The computer of one embodiment of the present invention, has been designed to have three thousand signal combinations representing program operations in each of the program channels 150. The S or short register 130 is long enough so that a pulse written in response to a set $S_w$ signal is detected at the $S_r$ amplifier flip-flop 134, after 186 timed periods have elapsed. The S register 130, therefore, has a capacity of 186 information bits or contains 186 storage cells, each corresponding to a synchronizing timing pulse $C_p$. Since 3,000 is not evenly divisible by 186, the S register 130 circulates its contents 16 times and reads 24 additonal cells during a single revolution of the drum and program channels 150. In Equation 3, $$\frac{p}{s}=t+\frac{\pi}{s}$$

$p=3{,}000$, $s=186$, $t=16$, and $\pi=24$.

Consequently, an information signal in the 25th S register cell will remain in the 25th cell position for 16 S register cycles and in the 17th cycle, will appear in the cell corresponding to the first cell of the program channels 150. A signal in the S register, if undisturbed, moves backwards in the S register by 24 cells with each new cycle of the program.

Through this "precession" of information in the S register, a circulating information loop can be formed by providing an instruction at the 211th program cell which Writes a signal "X" at random from an external source into the 25th cell of the S register, during the second cycle. If the "X" signal is permitted to remain in the S register through a complete drum revolution, the signal "X" then coincides with the first program cell of the new drum cycle. After suitable program instructions transfer the "X" signal from the S register to the L flip-flop, where the "X" is held during the passage of 24 cells of the S register, at the 25th cell, the "X" signal is transferred to the S register again. An information signal thereby circulates between the S register and the L flip-flop until a new "X" is placed in the S register from the external source. The "X" signal can be detected at the occurrence of the 25th cell of the S register at each of the third through sixteenth cycles of the S register, at the first cell of the S register in the first cycle, and in the L flip-flop during the passage of the first 24 S register cells of the first S register cycle.

Although this is a workable method for circulating and delaying information, it is costly in terms of the number of program instructions necessary and the time during which the L flip-flop and the S register cannot be disturbed. Although few instructions are needed to actually transfer the information between the S register and the L flip-flop, 24 program cells cannot use the logic flip-flop while the signal is being transferred from the 1st to the 25th S register cell. The 25th cell of the S register is unavailable for 16 S register cycles.

A long, R register 140, having a storage capacity of 2,813 bits of information is provided as a second, circulating register. The combined storage capacity of the S register and the longer, R register in this embodiment, is equal to one cell less than the program register 150. In each program cycle, a signal precesses by one bit and one S register cycle each program cycle. Recalling Equation 4, $$l+ys+x=p \qquad (4)$$

if $y=1$, $s=186$, $x=1$, and $p=3{,}000$, then $l$ must be 2,813. An information signal transferred from the second cell of the S register into the L register during a second S register cycle of a drum revolution, reappears in the $R_r$ Read amplifier flip-flop 142, in the next drum revolution, when the first S register cell appears during the first S register cycle and again in the sixteenth cycle at the 23rd S register cell.

It is then possible to have a closed information loop by transferring information among the S register, the L flip-flop, and the R register. For each cycle of the program register, information in the R register precesses with respect to the S register by one cycle and one bit, without any additional program signal. With the available program signals, and the precessing of the information in the registers, both with respect to each other and with respect to the program, it is possible to arrange circulating information paths that behave in a fashion similar to computer components.

In the following discussions of the operations of the computer, the logical difference or "exclusive or" operation will be referred to simply as an "or" operation and the "and" or logical product will be called the "and" operation. The symbol used for the exclusive "or" will be "⊕" and the "and" operation will be indicated either by "·" or by the side-by-side placement of terms without an intervening symbol. In those instances when the "inclusive or," or the logical sum, is intended, it will be indicated by a "+" sign and mention will be made of the fact.

Program instructions are available which transfer information between the S and R registers and from the L flip-flop to the S register. Although there is no specific instruction to transfer information from the S register to the L flip-flop, combinations of other program instructions may be used. It is inherent in the "or" and "and" operations that a quantity either "or'ed" with "0" or "anded" with "1" produces the quantity itself and, when "or'ed" with "1" produces the complement of the quantity, as stated in Equations 19, 20, and 21, below in Table 3.

*Table 3*

$$A \oplus 0 = A \quad (19)$$

$$A \oplus 1 = A' \quad (20)$$

$$A \cdot 1 = A \quad (21)$$

The truth table relationships of two quantities in the different operations are set forth in Table 4 below:

*Table 4*

| A | B | A⊕B | AB | A+B |
|---|---|---|---|---|
| 1 | 1 | 0 | 1 | 1 |
| 0 | 1 | 1 | 0 | 1 |
| 1 | 0 | 1 | 0 | 1 |
| 0 | 0 | 0 | 0 | 0 |

In order to transfer a quantity "A" from the S register, a (4) or "Set 0" program instruction places a 0 in the L flip-flop before the transfer is to take place. When the cell containing the quantity "A" is detected in the S register, an "or" operation (1) is programmed. The result is placed in the L flip-flop. Alternatively, a program sequence of (5) and (2) will also transfer a signal from S to the L flip-flop. Should the complement of A, A' be desired, the program instruction (5) or "Set 1" should be placed in the L flip-flop prior to the "or" operation.

The quantity A, when in the L flip-flop, may be combined with other signals according to a sequence of program instructions. All of the Boolean functions of two or more variables can be built up by combining information in the S register with information in the L flip-flop. In iterative operations, the same group of program signal combinations may be used over and over again, and the information signals to be operated upon may be coincided with the same program sequence, either by holding them in the R register for several drum revolutions, or by allowing them to remain in the S register, thereby precessing them by 24 cells for each drum revolution.

Information from external signal sources, such as signal lines $B_1$, $B_2$, $B_3$, and $B_4$ and the Ⓜ, Ⓕ, Ⓒ, Ⓘ, and Ⓞ controls may be gated into the computer circuits through the programming of the S and R registers. Referring to the logical equations and the gating networks, the Load signal (3) utilizes the state of the Read flip-flops and amplifiers of both the S and R registers and the $S_w$ Write flip-flop to determine which of the input lines is to be sampled. A binary counter, which can easily be represented in terms of a logical network, may be synthesized by suitable programming techniques, and reduced to a sequence of signal combinations in the program register. Alternatively, a separate sequence of signal combinations may be utilized to provide a gating input for each of the sources at different times in the programs. If the R register output is considered the least significant digit and the S register output is the most significant digit, the combined output can be interpreted as the output of a counter that counts to binary 4, and which, in four successive cycles, produces outputs 00, 01, 10, and 11 and then repeats. This enables different lines to be sampled in different cycles with the same Load instruction.

As may be seen with reference to FIGURE 4, the R, R', $S_r$, $S_r'$, $S_w$, and $S_w'$ outputs of the read and write flip-flops and amplifiers, provide gating signals to select which of the input lines is to be sampled. In other, further embodiments, the state of the Write flip-flops may also be used to add additional "stages" to the "counter" for a total of 4 bits or a 16-counter. It is then possible to use the state of such a "counter" to select one out of as many as 16 lines for either input or output purposes. If the L flip-flop is not used to distinguish between input and output, an additional 16 lines may be sampled selectively.

Other sequences of program signal combinations can arrange a multi-revolution delay of information. This is most easily accomplished by transferring information from the S register into the R register at a particular point in the program cycle and permitting the information to remain within the R register. With each drum revolution, the information in the R register coincides with an earlier cycle of the S register at an earlier bit time. When the information is again transferred to the S register, the information can be returned to the same point in the program cycle using the L flip-flop and the S register and reinserted into the R register. A particular information signal then appears in the S register and L flip-flop only after a predetermined number of drum revolutions. This information bit can be used as a marking pulse to signal the completion of a desired number of drum revolutions.

The same form of program sequence may be used to generate an information storage register. If different signals are placed into the R register each revolution, then these same signals will reappear, in order, at a different point in a succeeding program cycle after a desired number of drum revolutions. Using the S and R registers and the L flip-flop, large numbers of circulating information registers of virtually any desired length can be put on the drum.

Should it be desired to have a revolution counter for the drum, program sequences arranged to interconnect a number of counters combine the outputs to provide a signal only when all of the counts coincide. For example, the output of a 7-counter, signalling once each seven revolutions, if combined with the output of a 4-counter, which signals once each four revolutions, produces a coincidental output once every 28 revolutions.

A particular series of program sequences have been devised which direct the device of FIGURES 1 through 6, to accept a decimal keyboard input, store the signals representing decimal digits, add two successive decimal digits, and upon command, display the result of the addition. The program provides an interplexed series of sequences consisting of a separate signal in each cell of the program registers or, taken in groups of three, 3,000 3-bit signal combinations are provided. Each cell of the program register addresses and S register location. Two program instructions, separated by 186 program cells will affect the same S register cell, but in different S register cycles.

For purposes of description, an entire series of sequences have been set forth in tabular form, using a rectangular plot in which the individual cells of the S register are set out on the horizontal axis, and displacement along the vertical axis represents the same S register cell in later cycles of the S register. Rather than identifying program cells by sequential numbering from 1–3000, each program cell is identified by a co-ordinate, of the form "$Y-X$," where "Y" represents the S register cycle, and "X" represents the cell within the S register.

The program, to be explained below, has interplexed sequences which provide counters, two-bit circulating storage registers, four-bit circulating storage registers, and includes a 28-bit, accumulator register. Other program sequences generate specific command signals, designated K0 through K8, whose functions are explained in connection with the additional description below. Another program sequence is provided which generates a signal every 28 revolutions of the drum, marking a major drum cycle or "word." Other program sequences recognize the depression of a digital key and gate the decimal digit represented thereby into the system.

At a predetermined time in the major cycle, an entered digit is added into the accumulator register and is circulated. A second digit can be entered, and, at the proper time, is added to the accumulator. When a display is desired, the proper button is depressed and held. Signals are generated which reset the display counter and count down the accumulator in successive drum cycles by subtraction of "1" from the accumulator each cycle. A single "Count" pulse is produced each cycle during which a subtraction takes place. The series of output pulses are applied to the "Count" output lines which connect to the display counter. When the contents of the accumulator have been counted down to zero, this condition, too, is recognized and the output counts cease, after which the display key may be released. The display remains but the accumulator is cleared in preparation for the entry of a new digit.

The progress of information through the various registers in the machine can be indicated by the use of a special graphic technique. Vertical lines intersecting with the horizontal axis are considered signals in cells of the S register, and therefore, displacement in the vertical direction represents a signal in the same S register cell at different times of the program cycle. Similarly, each horizontal line may represent signals in the L flip-flop during the passage of successive cells of the program and S registers, corresponds in time, to different S register cycles. It is to be understood, that so far as the S register and the L flip-flop are concerned, the passage of time is represented by displacement in the positive quadrant away from the origin. Information in the R register may be represented by a diagonal line and the passage of time is represented by displacement towards the origin, representing a "backward" precession of information placed in the R register. It is also possible to interpret the indicia of the horizontal axis to represent points in time corresponding to the passage of individual cells of the S register and the program register under their respective reading heads and the vertical indicia to represent time intervals corresponding to complete cycles of the S register. On the graph, therefore, a time interval during which the fifth program instruction occurs for example, is identified by the designation 1–5, in which the first digit refers to both to the vertical coordinate of the graph and the S register cycle during which it occurs, and the second digit refers both to the horizontal coordinate of the graph and the cell of the S register which coincides in time with, in this example, the fifth program instruction. The 191st program instruction is represented on the graph by a particular symbol at the intersection 2–5, corresponding to the fifth S register cell of the second S register cycle. Each simultaneously occurring three-cell group of the program register, is considered, for convenience, as a single cell containing the octal program instruction, and is located on the graph at the coordinate location which corresponds to the S register cycle and cell with which it coincides in time, i.e. 1–5, 2–5, etc. "Do Nothing" instructions are represented by blanks on the graphs and blanks or "0's" in the tables.

Figure 7:
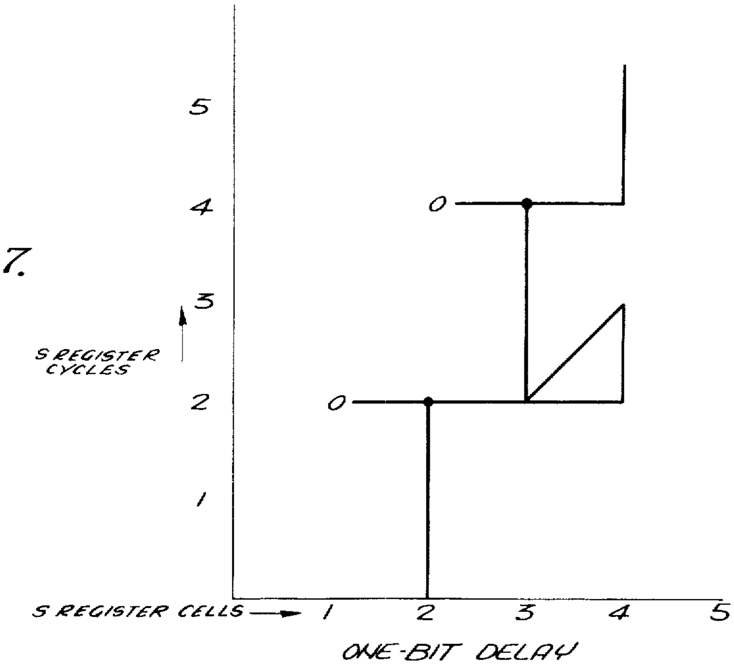
FIGURE 7 is an example of a graphite technique for representing the circulation of information in the computer of the present invention and represents a one-bit delay line.

A simple example of the use of the graphic technique has been shown in FIGURE 7. A diagram is set forth illustrating a one-revolution delay of an information bit. Table 5 below, lists each of the coordinate cell locations, and the instruction for each.

*Table 5*

| Program Cell | Instruction | |
|---|---|---|
| 2–1 | 4 | Set 0 |
| 2–2 | 1 | ⊕ |
| 2–3 | 7 | Interchange |
| 2–4 | 6 | Transfer |
| 3–4 | 7 | Interchange |
| 4–2 | 4 | Set 0 |
| 4–3 | 1 | ⊕ |
| 4–4 | 6 | Transfer |

In operation, a signal is inserted into the S register in cell 2 and circulates. At 2–1, or at the occurrence of the first S register cell of the second S register cycle, a Set 0 in the L flip-flop is combined in an exclusive "or" operation at 2–2 with the signal appearing in the S register. In this manner, the signal in the S register is picked up by the L flip-flop as designated by the relationship $S\oplus 0=S$ from Equation 19 in Table 3 above. At 2–4, the signal in the L flip-flop is transferred to the S register and at 3–4, an interchange sets the S register signal into the R register. One revolution of the program register later, at 2–3, the signal is interchanged back into the S register for two S register cycles and circulates in the S register until 4–3 where it is picked up by the L flip-flop. The signal is again transferred to the S register at 4–4. It may be seen that the signal in the S cell 4 at the 4th cycle of the S register is the same signal that was in the S register at 2–4, but from the prior program cycle.

Figure 8:
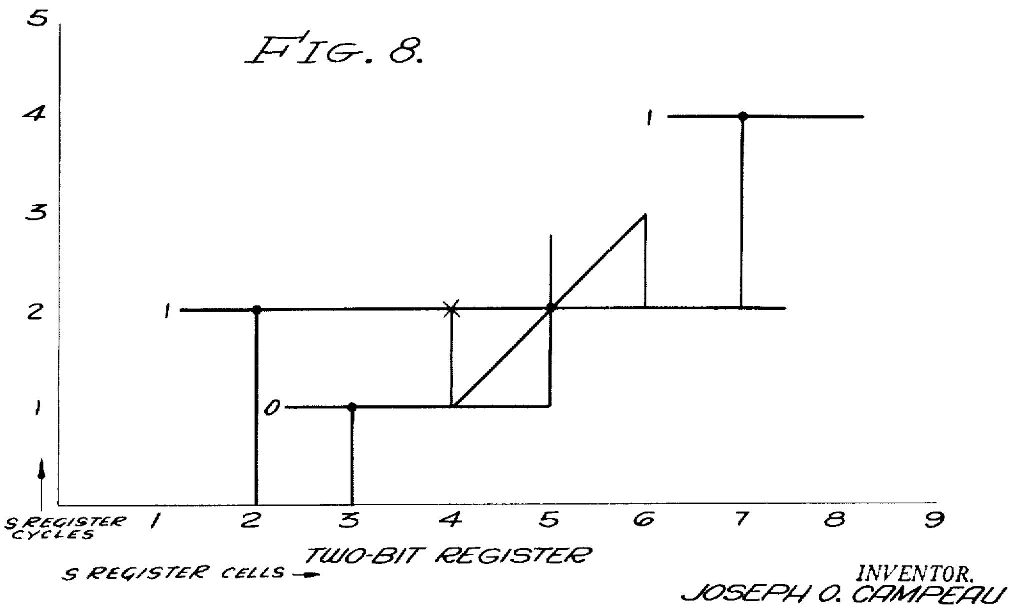
FIGURE 8 is a further example of a graphic technique for illustrating the circulation of information in the computer of the present invention and provides a representation of a two-bit circulating register.

In FIGURE 8, a graphic plot of a two-bit circulating register, which may hold either two ones or two zeroes has been set out.

It is assumed, for purposes of discussion, that the Set and Zero signals are available for two program cycles on separate input paths. This is easily accomplished by providing a one-revolution delay of the original signal as in FIGURE 7 above and transferring both the signal and the delayed signal into the same path.

The program sequence which creates the register of FIGURE 8 is listed in Table 6 below where the Program Cell coordinates refer to S register cycles and cells within a cycle, respectively:

*Table 6*

| Program Cell | Program Signal | Cell | Program | Cell | Program |
|---|---|---|---|---|---|
| 1–1 | (0) | 2–1 | (5) | 3–1 | (0) |
| 1–2 | (4) | 2–2 | (1) | 3–2 | (0) |
| 1–3 | (1) | 2–3 | (0) | 3–3 | (0) |
| 1–4 | (7) | 2–4 | (2) | 3–4 | (0) |
| 1–5 | (6) | 2–5 | (1) | 3–5 | (0) |
| 1–6 | (0) | 2–6 | (6) | 3–6 | (7) |
| 1–7 | (0) | 2–7 | (0) | 3–7 | (0) |

The register thus created uses the L flip-flop through the second, third, fourth and fifth program cells of the first S register cycle, the first, second, third, fourth, fifth, sixth, and seventh program cells of the second S register cycle, the second S register cell for the Set 0 input signal during the first cycle, the fourth S register cell and the fifth S register cell during the first S register cycle, and the sixth S register cell during the second S register cycle. The R register is used to process information from the sixth S cell in the third S cycle to the fourth S cell in the first S cycle.

The operation, described in terms of the logical operations and using the coordinate locations, proceeds as follows. A Set Zero signal, made up of a "1" in two successive program cycles, is placed in the second short register cell at the beginning of a program cycle by means not here described. The zeroing bits propagate along the vertical line 2 until the point 2–2. At the beginning of the second cycle of the S register, at 2–1, a "1" is set into the L flip-flop. At 2–2, the two 1's are "or'd" together and a zero in the L flip-flop results. At 2–4, the "0" is combined in an "and" operation with whatever signal might be in the S register. The result, a "0," remains in the L flip-flop and is "or'd" at 2–5 with the signal in the S register which, in the absence of a Set "1" signal is a 0. A 0 remains in the L flip-flop and, at 2–6, it is transferred into the S register.

The contents of the L flip-flop at 2–7 may be considered the output of the circulating register. The signal placed in the S register at 2–6 is held for one S register cycle and is interchanged with the R register at 3–6. The signal is held in the R register for two R register cycles and is "anded" with the contents of the L flip-flop at 2–4.

In order to circulate 1's in the register, a 0 is set in the L flip-flop at 1–2 and held there until 1–3. A setting signal, consisting of two consecutive 1's in the S register, is "or'd" at 1–3 with the 0 in the L flip-flop. The result, a 1, is held in the L flip-flop until 1–5, when it is transferred into the S register and held for one cycle of the S register. At 2–5, the signal in the S register is combined in an "or" operation with the signal in the L flip-flop. As described above, the L flip-flop holds a 0, and the 1 in the S register produces a "1" in the L flip-flop which, at 2–6, is placed in the S register, held for one cycle, and is interchanged into the R register. At the next revolution of program cycle, the second of the two 1's in the S register is or'd at 1–3 with the 0 in the L flip-flop. A 1 is placed in the L flip-flop and goes into the closed loop described above.

At the third drum revolution, the S register no longer contains a setting signal at 1–3, but rather, contains a 0. The S register also contains a 0 at 1–2 since the zeroing signal has not been applied. A "1," set into the L flip-flop at 2–1, is or'd with the 0 in the S register at 2–2. At 2–4, the resulting 1 is "and'ed" with the signal in the S register, thereby transferring the contents of the S register into the L flip-flop. In the third drum revolution, the S register contains a 1 at 2–4 which is transferred into the S register at 2–6 and which remains in the L flip-flop at 2–7. The output of this two-bit circulating register continues to be a 1 until a zeroing signal is applied in the short register at 2–2 which places two 0's in the circulating loop as described above.

The lines and symbols of the graphic plot of FIGURE 8 may be correlated to the drum of FIGURE 2 so that individual storage cells on the drum may be identified. Assume that the S register of the present embodiment contains 186 cells and undergoes 16 complete program cycles and an additional 24 cells of a 17th cycle of one revolution of the 3,000 cell program register. The R register, containing 2,813 cells, completes 187 cells more than 1 cycle in one revolution of the drum.

Looking at the drum for 5 successive revolutions, it may be assumed that in the first revolution the register contains 0's. In the first two revolutions, two 1's will be circulating, in the third revolution, the contents will be circulated and the register will be zeroed in the two succeeding revolutions.

The first program cell has a "Do Nothing" instruction or octal (0). The second program cell has a Set 0 or (4) which places a 0 into the L flip-flop. At program position 3, an "Or" instruction (1) combines the output of the S read circuits with the L flip-flop contents in an "or" operation. A 1 signal is in the S register, and when or'ed with the 0 in the L flip-flop, results in a 1 in the L flip-flop. At program position 4, a (7) signal interchanges a 0 signal from the R register into the fourth cell of the S register. At program position 5, the (6) signal transfers a 1 from the L flip-flop into the fifth cell of the S register.

At program position 187, which addresses the first S register cell in the second S cycle, a (5) signal sets a 1 in the L flip-flop. At position 188, a (1) instruction "or's" a 0 in the second S cell with the 1 in the L flip-flop, resulting in a 1 in the L flip-flop. Program position 189 contains a "Do Nothing" instruction (0). Position 190 contains an "and" instruction (2) and the 0 in cell 4 of the S register is "and'ed" with the 1 in the L flip-flop to set a 0 into the L flip-flop. At 191, a (1) "or's" the 0 in the L flip-flop with the 1 that was placed in fifth S register cell during the prior S register cycle, producing a 1 in the L flip-flop. At 192, the (6) instruction transfers a 1 from the L flip-flop to the sixth cell of the S register. Program positions 373 through 377 contain "Do Nothing" instructions (0). At program position 378, a (7) instruction interchanges the 1 in the sixth S register cell, into a cell of the R register.

In the next revolution of the drum, the operation is substantially identical so that at the end of the first two revolutions, the R register contains two 1's, separated by 186 cells which are represented in the graphic plot by adjacent points on a diagonal line. In succeeding revolutions, the S register may contain 0's in the second and third cells and in such a situation, the information within the programmed register is merely circulated. The 1's emerging from the S register at program position 190 are "and'ed" with the 1's set into the L flip-flop at 187 and a "1" stays in the L flip-flop. The 1 in the L flip-flop at program position 191 is "or'd" with the 0 in the S register and therefore, remains in the L flip-flop until program position 192 when it is placed in the S register. So long as signals are not provided in the S register at program positions 3 or 188, whatever happens to be in the S register at program position 190 will be set into the L flip-flop and circulated.

It may be noted that in succeeding revolutions of the drum, information that might have been in the short register on the second cycle will remain in the S register during succeeding S register cycles without being further utilized. It is a feature of the present invention, that, with proper recording techniques, there is no need to erase information. So long as new information signals representing 1 or 0's, can be written on the drum as required and as called for by the program, unknown contents of the drum are never used or relied upon. Every programmed operation uses only a signal which is either placed in the particular location by a program signal combination or is accepted from an external source by a program signal combination.

To Zero the register created by the above described program sequence, a 1 is placed in cell two of the S register at the beginning of two successive program cycles. In every drum cycle, the program signal combinations are the same, but the information in the register may be altered by different incoming input signals. In the fourth drum revolution, at the fourth program cell, the R register and S register are interchanged and a "1" circulating in the R register is placed in the S register in the fourth cell. At the 187th program cell, a 1 is set into the L flip-flop by a (5) instruction. At the 188th program position, a (1) instruction complements the 1 in the second S register cell and places a 0 in the L flip-flop. At the 190th program location, a (2) instruction "ands" the 0 in the L flip-flop with the contents of the fourth S register cell and places a 0 in the L flip-flop. At 192, instruction (6) transfers the 0 into the sixth S register cell, and the 378th program instruction (7) transfers the same 0 into the R register. The fifth revolution of the drum changes the second circulating 1 into a 0 as did the fourth, and at the end of the fifth revolution, two 0's are in the R register. It may be seen that 0's will circulate through the programmed register until a setting signal again provides two 1's in the S register at program location 191, which will then set two 1's into the L flip-flop and from there, through the S register, into the R register.

A true circulating storage register can be constructed by the judicious use of program signals without any physical interconnection of computer components. Such a programmed register may also be considered as the equivalent of a bi-stable device or flip-flop circuit.

After following the generation of a single bit delay and a two-bit register by reference to FIGURES 7 and 8 and Tables 5 and 6, it is now possible to go into a more detailed sequence of program signal combinations. Table 7, set forth in FIGURES 13*a*, *b*, is a complete program, involving the first 80 cells of the S register, of the operation of the device of FIGURE 2 as a calculator. The program of Table 7 enables the machine to accept a decimal input from the keyboard, accumulate the decimal digits in an internal memory and provide a visual display of the sum. It may be noted that less than the first 80 cells of the S register have been used for the calculator program.

Figure 9:
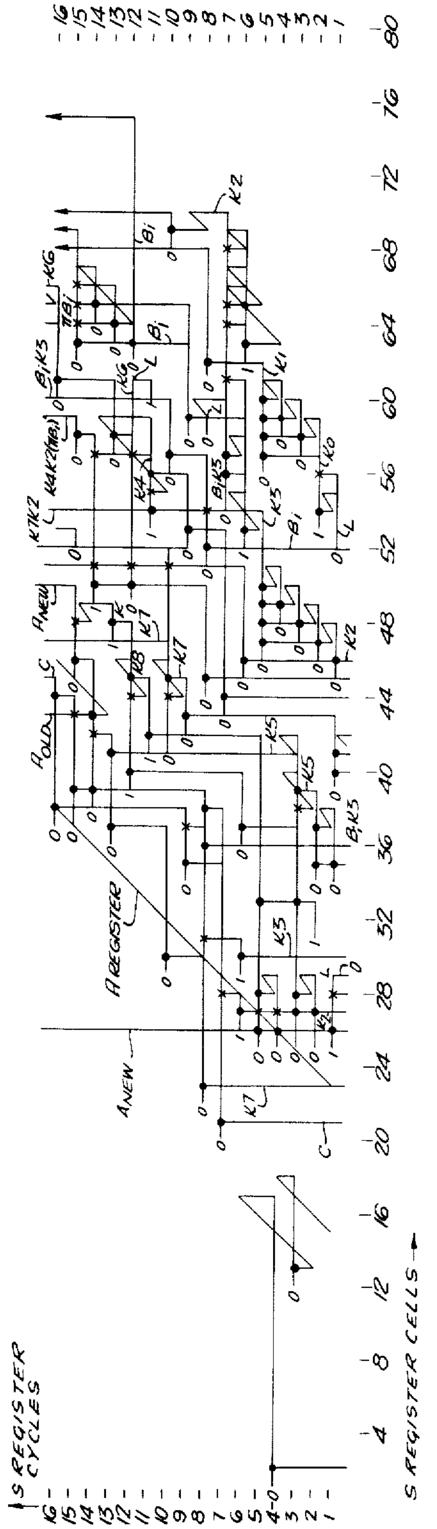
FIGURE 9 is a graph of a complete program sequence for the operation of device of FIGURE 2 as a calculator which adds two decimal digits and displays the result of the addition.

The same program has been set out in graphic form in FIGURE 9 using the same symbols and techniques demonstrated in FIGURES 7 and 8. Every entry in Table 7 has a corresponding operation symbolized at the same coordinate location in FIGURE 9 so that the figure and table are interchangeable. For purposes of explanation, however, the graphic technique is believed superior and the operation of the calculator is described in terms of the graph. Each square of Table 7 represents a program cell. An octal number is placed in each square representing the instructions stored therein. For ease of reader understanding, "do nothing" instructions, represented by the octal zero, are omitted and a blank is left in the table wherever a "do nothing" instruction exists.

By way of introduction to the plot of FIGURE 9, a brief description of the internally generated control or instruction signals is presented. These internally generated control signals have been named K0 through K8. Each of these control signals is utilized in the computer elements generated by the program sequences to synchronize the internal operation of the machine to the 28 revolutions major cycle and to the individual cycles of the program. The particular program sequences which generate these control signals are explained in greater detail below. The control signals themselves are summarized in Table 8 below:

*Table 8*

K0=Enter Signal, first occurrence of E after E'.
K1=Enter-extended for 4 revolutions.
K2=Word Marker—once every 28 revolutions.
K3=Extended Word Marker—extended by 4 revolutions to gate first 4 bits of word.
K4=Enter lock—Holds K1 until end of word.
K5=Add—Last bit of word in which K1 appeared.
K6=Display and Reset—Last bit of word in which Display key actuated.
K7=Subtract—Set by K6 and adds "1" until accumulator filled.
K8=Clear accumulator—Recognizes all 1's in accumulator at K2, turns off K7, and zeroes each accumulator bit until next K2 signal.

The first control signal K0 may be considered as an information entry signal. K0 represents the application of the E signal from the keyboard after a period during which the E signal was absent and is generated in the revolution during which the E signal is provided. The signal K1 is derived from the signal K0 and is generated to last for four revolutions. K1 gates the sampled signals derived from the successive sampling of the input lines $B_1$ through $B_4$ (designated generally as $B_i$) into the internal operations by means of a generated signal K4, to be described below.

The signal K2 is a word marker signal and occurs once during each 28 revolution major cycle, and is the resultant output of a four-cycle counter in series with the output of a seven-cycle counter. The signal K3 is derived from the signal K2 and lasts for four revolutions. The successive occurrences of the K3 signal are used to identify the first four bit times of each word or, the first four revolutions of each 28 revolution series.

The K4 signal, mentioned above, is a signal that is generated by the K1 signal, and remains until the end of the word during which the K0 signal occurred. The K4 signal marks the major cycle or word during which new information is entered into the keyboard, and, in combination with the K3 signal, admits the new information into an accumulator.

The signal K5 is generated by the word marker K2, combined with the K4 signal, and provides an output signal for the duration of one word or, 28 revolutions. The K5 signal, generated only if the new information entered with K0 was not the Display signal, directs the addition of the new information into the accumulator register, in a manner to be described below.

The signal K6 is also generated from the K4 signal, but only when the new information entered is the Display signal. The K6 signal controls the generation of the Reset pulse which is sent to the Display counter, and is used in the generation of a signal K7. The signal K7 generates a series of 1's which are added to the accumulator, resulting in the subtraction of a "1" from the quantity in the accumulator each word cycle. The accumulator is zeroed by a signal K8, which is generated by a circuit that detects, when the K7 signal, by successive subtractions, has not only emptied the accumulator, but has subtracted an additional 1, to set all 1's in the accumulator. The same signal that generates K8, also turns off K7. The signal K8 lasts for 28 revolutions or one word time, during which a succession of zeroes are entered in the accumulator, preparing it for the next operation.

In the program represented by the graph plot of FIGURE 9, all of the capacity of the S register has not been used and therefore, FIGURE 9 is a graph of only the program cells affecting S register cells 1 through 80. The passage of successive S register cells are indicated by the horizontal lines. Each of the horizontal lines represents a different S register cycle. Individual program signal combinations are represented by distinctive symbols on the chart, placed at the proper coordinate location, in which the ordinate is cycles of the S register and the abscissa represents succession of adjacent cells on the drum. Table 9 sets forth the Program operations, the corresponding octal number, and the symbol used in FIGURE 9 to represent the operations.

*Table 9*

| Operation | Number | Symbol |
|---|---|---|
| Do Nothing | 0 $P_1' P_2' P_3'$ | ---------- |
| "Or" | 1 $P_1 P_2' P_3'$ | · |
| "And" | 2 $P_1' P_2 P_3'$ | X |
| Load | 3 $P_1 P_2 P_3'$ | L |
| Set "0" | 4 $P_1' P_2' P_3$ | 0 |
| Set "1" | 5 $P_1 P_2' P_3$ | 1 |
| Transfer | 6 $P_1' P_2 P_3$ | ∠ |
| Interchange | 7 $P_1 P_2 P_3$ | ∨ ∧ |

It may be assumed, for the purposes of this example, that the very first revolution of the drum is being described, at a time, when there is no information on the drum, save that permanently recorded in the program channels and in the timing channel. Each portion of the program will not necessarily be discussed in terms of the cell-by-cell programming of the operation, but rather will be discussed with a view to the overall operation of each of the interplexed program sequences. A program sequence may start with a series of program signal combinations corresponding to the first cycle of the S register and may continue through the succeeding S register cycles that affect the same S register cells.

It is convenient to start the program, not at the first program cell 1–1, but at a point where the sequence to generate the K0 signal is commenced. To aid in explanation, revolutions prior to the energization of a digit key will be discussed.

At 1–52, of each revolution, a Set 0 instruction places "0" in the L flip-flop. At 1–53, a keyboard signal, designated E, is placed in the L flip-flop by a Load instruction. The E signal is 0 whenever a digital key has not yet been depressed. The "E" signal is held in the L flip-flop until 1–55 when it is transferred into the S register. The "E" remains in the L flip-flop also until 1–56 when it is again transferred into the S register. The "E" in the S register at 1–55, is interchanged into the R register at 2–55 and is placed back in the S register at 1–54 of the next drum revolution. At 2–53, a "1" is set into the L flip-flop and at 2–54 an "or" operation complements the contents of the S register, placing E′ into the L flip-flop. In the first drum revolution, a 0 is in the S register at 2–54 and, in the second revolution, the signal "E" is presented, having been entered in the prior revolution. The E′ in the L flip-flop is held until 2–56 when an "and" operation combines it with the "E" signal detected in the current revolution. The logical product $E_iE_{i-1}'$ is "0" at all times except in the one drum revolution in which "E" is "1" after having been "0." Then the value of $E_{i-1}'$ is "1" and the value of $E_i$ is also "1." The resultant "1" in the L flip-flop is designated K0.

At 2–57, the K0 signal transfers to the S register to initiate the generation of the signal K1. K0 is also transferred to the S register at 2–59. During a revolution, K0 is held in the S register until 5–57 when it is "or'ed" with a 0 that was set into the L flip-flop at 5–56. In this drum revolution, the S register contains 0's at 5–58, 5–59, and 5–60. However, in the next three revolutions, K0 will be picked up by the L flip-flop at 5–58, 5–59, and 5–60, in that order. This is accomplished by holding K0 in the S register at 2–59 for one S register cycle, interchanging it into the R register for one revolution and interchanging it back to the S register at 2–58.

The delayed K0 is held until 3–58 when it is placed in the L flip-flop and at 5–58, is "or'ed" with the contents of the L flip-flop. The K0 in the L flip-flop at 3–58 is held until 3–60, transferred to the S register until 4–60, and interchanged into the R register for one revolution delay. The K0 is interchanged into the S register at 3–59 and picked up by the L flip-flop at 4–59. K0 is also combined with the contents of the L flip-flop at 5–59. The K0 at 4–59 already delayed two revolutions is held in the L flip-flop until 4–61 when it is delayed for still another drum revolution through a pair of S–R interchanges and it is "or'ed" with the L flip-flop at 5–60.

The K0 is never a "1" for two successive drum revolutions, and the input system is such that the E or Enter signal always extends for a period of several drum revolutions. The K1 signal is generated from four repetitions of the K0 signal, each from a different S register cell on successive drum revolutions. To avoid confusion, a K signal is deemed to have a value of "1" when a "1" signal is found in either the L flip-flop or in S register coincidentally with a predetermined cell which corresponds to the output of the K signal generating sequence. Therefore, four successive K0 signals are found in the L flip-flop at 5–61, in four successive revolutions. A "1" in the L flip-flop at this point is designated K1. The K1 signal is transferred into the S register at 5–62 and is held until 8–62. At 8–61, the L flip-flop is Set 0 and at 8–62, the K1 signal is picked up from the S register by the L flip-flop and held until 8–68 when it is again transferred into the S register. K1 is held in the 68th S cell for the balance of the drum revolution.

The structure for generating signals for sampling the individual input lines, start at 6–52. A sequence of program signal combinations is arranged to generate alternate pairs of 0's and 1's which appear in the S register at 8–59, and to generate alternate 0's and 1's which appear in the R register at 8–59. In successive major cycles, a combination of R and S signals can be interpreted as a binary count which gates in the input of the $B_i$ signal lines, sequentially.

At 6–52, the counting sequence starts with a "1" set of the L flip-flop. At 6–53, whatever signal happens to be in the S register is complemented. For example, assume a signal C is in the S register and is picked up in the logic flip-flop as C′. C′ is transferred to the S register at 6–55, 6–56, 6–59, and 6–61. At 7–55, C′ is interchanged with the R register and is held for two revolutions and at 5–53 is interchanged into the S register. The signal C′, in the S register at 6–58 is interchanged into the R register at 7–58 for one revolution and interchanged into the S register at 6–57. If, in four successive revolutions, the signal in the S register at 6–53 is C, C, C′, C′, then the signal going into the S register at 6–56 in the same successive revolutions is C′, C′, C, C. Assume that the signal of a current revolution is called $C_n$, then the signal of a prior revolution may be called $C_{n-1}$ and the signal of a succeeding revolution is $C_{n+1}$.

At 7–54, a 0 set of the L flip-flop picks up a quantity $C_n$ in the S register at 7–56, and, at 7–57, the quantity $C_n$ is "or'ed" with $C_{n-1}$. Assuming a sequence such as 0 0 1 1 0 0 1 1 forming the values of successive C's, then if C is a 0 in the "$n$th" revolution, and the combination in the L flip-flop at 7–58 is 0 in the $n+1$ revolution, at 7–58 in the $n+2$ revolution, the L flip-flop will be 1, in the $n+3$ revolution, 0, in $n+4$ revolution, 1, providing an alternate output of 1's and 0's in successive drum revolutions. At 7–60, the signal in the L flip-flop is transferred into the S register. At 7–61, the L flip-flop, which contains the alternating 1, 0 sequence, is "anded" with the 0, 0, 1, 1 sequence from the S register to provide 1 in the L flip-flop at 7–62 every fourth revolution. The alternating 1's and 0's transferred into the S register at 7–60 are interchanged into the R register at 9–60, and at 8–59, a Load instruction, sequentially gates the output of the lines B1 through B4 into the S register corresponding to the "count" found in the S and R registers. The successive $B_i$ signals remain in the S register until 9–59, and are picked up by the L flip-flop after a 0 set at 9–58. A 0 set of the L flip-flop at 8–58 signals that the Load instruction at 8–59 is to be an input rather than an output.

On successive drum revolutions; at 9–62, the L flip-flop holds $B_1$, $B_2$, $B_3$, $B_4$. Each digital entry key is held for approximately one word time to assure that the $B_i$ signals are entered.

The "new" $B_i$ signals in the L flip-flop 9–62 are transferred to the S register at 9–63 and at 9–65. The L flip-flop picks up a $B_i$ at 12–63 and holds the signal until 12–76, transferring it into the S register.

In order to recognize and distinguish among the various $B_i$ signals, some form of identification is needed. The "and" operation at 7–61, which combines the contents of the S register with the L flip-flop, produces a 1 in the L flip-flop every fourth revolution of the drum. This 1 occurs during the revolution that the $B_3$ input line is sampled.

A second, seven-cycle "counter" is created with a program sequence that starts with a 1 set of the L flip-flop at 6–62. This "counter" is made up of three circulating lines having delays of three cycles, two cycles, and one cycle, respectively. The output of the three-cycle delay which appears in the S register at 6–63 is complemented into the L flip-flop and is transferred to the S register at 6–64 to produce a $D_3$ output signal. The input to the $D_3$ delay is the output of a $D_2$ delay, found in the S register at 6–65, "or'ed" with the output of the $D_3$ delay, then set into the L flip-flop. The result in the L flip-flop is then the input to the $D_3$ delay, and a $D_1$ delay. The contents of the L flip-flop are transferred to the S register at 6–66 as the input to the $D_3$ delay, at 6–67 as the input to the $D_2$ delay, and at 6–69 as the input to the $D_1$ delay.

In the seventh cycle of the S register, assume initially that the contents of all delays are 0's and the complemented output of the $D_3$ delay in the S register at 7–64 is a 1, at 7–65, the output of delay $D_2$ is a 0, and at 7–68, the output of delay $D_1$ is also a 0. Then one revolution later, the complement $D_3$ output remains a 1, the $D_2$ output is 0, and the $D_1$ output is 1. By the next revolution, the $D_3$ output is still 1, the $D_2$ output is now 1, and the $D_3$ output is a 1. If a 1 is in the L flip-flop at 7–64, as it will be every fourth revolution, the "and" operations at 7–64, 7–65, and at 7–68 result in a 1 in the L flip-flop which is transferred into the S register at 7–70.

On the next revolution of the drum, the output of the three delay elements $D_3$, $D_2$, $D_1$, will be respectively, 0, 1, 1, and it may be easily demonstrated, that on successive revolutions the outputs would include one or more 0's so that the three outputs are 1 only once in every seven revolutions. Therefore, the output signal at 7–70 can only be a 1 every twenty-eighth revolution, so that this signal is used to mark a major cycle, or word, of the computer.

Since the "1" signal in the S register at 7–70 coincides in time with the sampling of $B_3$ to represent the last bit of a machine word, the signal in the S register is delayed one revolution to coincide with $B_4$ by interchanging it into the R register at 9–70 for one revolution then interchanging it into the S register at 8–69, where it is then designated K2. K2 is picked up in the L flip-flop at 10–69 by a 0 set at 10–68 and is transferred to the S register at 10–70.

At 16–70, K2 is in the S register, and, the signal representing $B_4$ is in the S register at 16–76 of the same revolution. As has been explained earlier, a signal in the S register at the 16th cycle of the S register is precessed "backward" by 24 S register cells. Therefore, the K2 signal at 16–70 is at 1–46 in the next succeeding revolution. K2 is picked up in the L flip-flop at 1–46 by a 0 set at 1–45 and an "or" operation at 1–46. K2 in the L flip-flop is transferred to the S register at 1–48 and is interchanged into the R register at 2–48. After a one revolution delay, the K2 interchanges into the S register at 1–47 and is picked up by the flip-flop at 2–47. K2 remains in the S register until 5–47 when it is picked up by the L flip-flop after a 0 set at 5–46. As with the program sequence that generated the K1 signal from the K0 signal, a K3 signal is similarly derived from successive occurrences of the K2 signal, respectively, delayed by 1, 2, 3, and 4 revolutions, and is found in L flip-flop at 5–50.

K3 is carried in the L flip-flop to 5–54 where it is transferred into the S register. At 8–54, K3 is "anded" with the various $B_i$ outputs which are in the S register at 12–76, and reappear in the S register at 1–52. The $B_i$'s remain in the S register until 8–52, and are picked up by a 0 set of the L flip-flop at 8–51 and at 8–54, the $B_i$'s are "anded" with K3. Since the first K3 appears in the revolution following the K2 which generated it, and since K2 is synchronized with the gating signal for $B_4$, the four K3 signals in 8–55 coincide with $B_1$, $B_2$, $B_3$, and $B_4$, respectively, in the S register at 8–54. The $K3B_i$ signal is held in the L flip-flop until 8–57, transferred to the S register and held until 10–57, picked up by L flip-flop, until 10–59, and again transferred to the S register.

A four bit circulation path holds the K1 signal until the end of the "word" in which it was generated. The K1, in the S register at 16–68, reappears in the S register at 1–44 and is picked up by the L flip-flop at 7–44, held until 7–53, transferred to the S register until 9–53, and picked up by the L flip-flop. At 9–56, K1 transfers to the S register until 11–56 where it is "or'ed" with the contents of the L flip-flop. The "or" operation at 11–56 is the input to the circulation path. A 1 set of the L flip-flop at 11–53 complements K3 into the L flip-flop at 11–54 and K3′ is "anded" with the contents of the S register at 11–55. The L flip-flop at 11–55 contains a 0 each time the K3 signal occurs. Whenever $K3=1$ and $K3'=0$ or, when the S register is circulating a 0 without a K1 signal in the S register at 11–56, a series of 0's is placed in the L flip-flop, and circulates in the path that includes a transfer to the S register at 11–59, an interchange at 14–57, and another interchange at 10–55.

When a K1 signal is in the S register at 11–56, a series of four 1's is picked up in the L flip-flop in four successive drum revolutions and is circulated in the loop. The output of the four-bit loop is taken at 11–57 where the signal, designated K4, is transferred from the L flip-flop. The K4 signal circulates, and unless $K3=1$ and $K3'=0$, the 1 set at 11–53 "anded" with the S register at 11–55 picks up K4 again in the L flip-flop.

The K4 signal is combined with the K2 signal to generate both the K5 and K6 signals. A signal $\pi B_i$, the display recognition signal representing the energization of the Display key is combined with K4 and K2 to generate K6. The compliment of the display recognition signal $(\pi B_i)'$ is used to generate K5.

The entry of the Display signal is recognized by a programmed sequence which starts at 9–63 with the transfer of the $B_i$ signals into the S register, where they are held until 15–63 and are picked up in the L flip-flop.. At 9–65 also, the $B_i$ signals in the L flip-flop are transferred to the S register. At 13–65, the S and R registers are interchanged, and, one revolution later at 12–64, are interchanged again. The $B_i$ signal is picked up by the L flip-flop at 13–64 and is "anded" with the L flip-flop at 15–64. In two similar delay loops, the $B_i$ signal is placed into the S register at 13–65 one revolution later, and after still another revolution, in 14–66.

A $B_i$ of the $n$th revolution is "anded" successively with $B_{i(n-1)}$, $B_{i(n-2)}$, and $B_{i(n-3)}$ at 15–64, 15–65, and 15–66, respectively. When the Display key has been energized, $B_1=1$, $B_2=1$, $B_3=1$, and $B_4=1$ so that the logical product $B_1B_2B_3B_4=1$. It follows that if $B_{1n}=B_4$, the preceding $B_i$'s are $B_3$, $B_2$, and $B_1$, so that in the revolution that K2 in the S register at 16–70 is 1, $\pi B_i$ will represent the product of $B_4$, $B_3$, $B_2$, $B_1$.

The $\pi B_i$ signal is transferred into the S register at 15–69 and at 1–45 is carried to 8–45, picked up in the L flip-flop until 8–50, transferred to the S register, picked up in the L flip-flop at 12–50 and also is complemented into the L flip-flop at 14–50. The K2 signal transferred into the S register at 6–51 is carried to 12–51 and 14–51 is "anded" with the $\pi B_i$ and the $(\pi B_i)'$, respectively to provide synchronized gating signals.

The signal K5 is generated by the combination signal K2K4 $(\pi B_i)'$ which is built up from the $(\pi B_i)'$ in the L flip-flop at 14–51 "anded" with K2 and carried to 14–57 where the combination is "anded" with K4. The combination is transferred to the S register at 14–15 picked up in the L flip-flop at 15–58 reappears in the next revolution at 1–35 and is picked up in the L flip-flop at 1–35 and at 2–35. The signal in the L flip-flop is transferred to the S register at 1–38 and, at 2–38, is interchanged into the R register for one revolution. At 1–37, the signal is put back in the S register and is picked up by the L flip-flop at 2–37. The delay of the K2K4 $(\pi B_i)'$ signal for one revolution provides a 1 in the L flip-flop at 2–39 in two successive revolutions, which are transferred to the S register and "or'ed" with the contents of the L flip-flop at 3–39.

At 3–25, a 0 set in the L flip-flop picks up K2 at 3–27. At 3–28, a K2 signal, delayed by one drum revolution, is picked up in the L flip-flop. The delay is produced by the sequence at 2–27 which picks up a K2 in the L flip-flop, transfers to the S register at 2–29, interchanges K2 into the R register for one revolution at 3–29 and in the next drum revolution, interchanges K2 into the S register at 2–28 to be picked up in the L flip-flop at 3–28. At 3–29, the L flip-flop contains a signal $[K2_n \oplus K2_{n-1}]$ which is 0 except for the revolutions in which $K2=1$ and the following revolution.

At 2–31, a 1 is set into the L flip-flop which is transferred to the S register at 2–33 to complement the contents of the L flip-flop at 3–33. As a result, the signal in the L flip-flop at 3–34 is a "1" except in the revolution when K2 or the delayed K2 signal is in the L flip-flop. The L flip-flop is "anded" with the contents of the S register at 3–38, the K2K4 $(\pi B_1)'$ signal which is a "1" only during the word in which new information is entered.

The K5 generator is a 2-bit circulating loop that transfers the signal in the L flip-flop at 3–40 into the S register, interchanges with the R register at 4–40, holds the signal for two drum revolutions and replaces the signal in the S register at 2–38. So long as the L flip-flop contains a 1 at 3–38, the contents of the S register are picked up in the L flip-flop. At 3–38, the L flip-flop holds a signal $(K2_n \oplus K2_{-1})'$ which includes the complement of one of the terms of the signal in the S register at 3–39, K2K4 $(\pi B_1)'$. Therefore, the L flip-flop will always contain a 0 whenever a setting signal is applied to the K5 generation loop. The K5 signal continually circulates until the next K2 signal occurs. Two successive 0's in the L flip-flop at 3–38 are "anded" with the S register to leave two 0's to circulate in the register. On the third revolution, the occurrence of a 1 in the L flip-flop at 3–38 combined with the 0's in the S register, continues circulation of the 0's already in the K5 register.

The K5 signal is carried in the L flip-flop to 3–42, transferred to the S register and at 4–42 is interchanged into the R register for 1 revolution and returned to the S register at 3–41. K5 enables the addition logic of the computer in conjunction with the occurrence of the K3 signals. As explained above, the K3 signals occur during the four revolutions following the generation of the K2 signal.

The K6 signal, also generated from the K4 and K2 signals, is a "1," whenever the Display signal has been entered, therefore, the $B_1$ term is "1." The K6 signal is available in the L flip-flop after 12–51 and is kept in the L flip-flop until 12–61. At 12–58, the K6 signal is set into the S register and is picked up in the L flip-flop at 13–58, held until 13–51, placed in the S register, and again picked up in the L flip-flop at 16–61. At 16–64, and at 16–66, the K6 signal is set into the S register and is available in the next S register cycle at 1–40 and 1–42.

At 1–42, K6 is placed in the R register for one revolution and is picked up in the S register at 16–65. A "0" set of the L flip-flop at 1–39 picks up the K6 signal at 1–40 and, one drum revolution later, picks up the delayed K6 signal at 1–41. The L flip-flop transfers to the S register at 1–43, and the two successive K6 signals are held in the S register until picked up in the L flip-flop at 9–43 to be used in generating the K7 signal.

At 12–51, a Load instruction is given. A 1 set of the L flip-flop at 11–60, transferred to the S register at 11–61, identifies the K6 signal in the L flip-flop at 12–61 as a Reset signal to be applied to the counter of FIGURES 1 and 2.

The K7 signal, which controls a substraction in the accumulator register, is generated in a two-bit circulating register whose input is the contents of the S register at 10–45 which are picked up in the L flip-flop. When the two successive K6 signals are in the S register cell 43, they are picked up in the L flip-flop at 9–43 and transferred to the S register at 9–45. The K6 signals are again placed in the L flip-flop at 10–45 and are transferred to a circulating loop starting with the S register at 19–46, the R register at 11–46 and back to the S register at 9–44. The contents of the L flip-flop after 10–45 is considered the K7 signal which is then transferred to the S register at 10–47 and combined with the K2 signal at 10–51.

The combined K7K2 signal is transferred to the S register at 10–52, to serve as a single "Count" output signal to the display counter during each revolution that a "1" is subtracted from the accumulator register. The K7K2 signal in the S register at 10–52 remains in the S register until 1–28 where it is "anded" with the contents of the L flip-flop. K7K2 signal is picked up by the L flip-flop only if a "1" is contained therein. The K7K2, when in the L flip-flop, is held until 1–29 at which time a Load instruction sends the K7K2 signal into the counter circuit as a "Count" pulse. The presence of a "1" in the L flip-flop at the time of the Load instruction identifies it as an output signal. A "0" set into the L flip-flop at 15–52 is transferred to the S register at 15–53 and in the S register at 1–29 identifies the output signal as a "Count" rather than a "Reset" signal.

The signal which both clears the K7 generator and sets the K8 generator is derived from the 28th or sign bit of the word stored in the accumulator register. So long as the number in the accumulator register is a positive number, the sign bit is a "0." However, when the number in the register is a "0," and "1" is subtracted away, the sign bit changes to "1," representing a negative quantity. A description of the generation of the K8 signal is best deferred until after the accumulator register has been described.

The 28-bit accumulator register is a structure determined by a program sequence which starts with the transfer of a signal from the L flip-flop to the S register at 15–50. The signal in the S register at 15–50 in the *n*th drum revolution is identified as $A_n$ and is held in the S register until the next revolution where it appears in the S register at 1–26, and reappears at 1–2. At the fourth S register cycle, it is picked up in the L flip-flop, transferred to the S register at 4–17, and interchanged into the R register at 6–17. Four revolutions later, at 2–13, the signal is interchanged into the S register, and again placed in the S register for one cycle, interchanged into the R register at 4–18 and three revolutions later, the bit appears both at 1–15 and 16–38 of the same revolution. It remains in the R register for fifteen more revolutions and appears at 1–23 and, in the same cycle, at 16–46. Three revolutions later at 13–43, it is interchanged into the S register. At 14–43, the $A_n$ signal is combined with a bit to be added into the accumulator, picked up in the L flip-flop and transferred to the S register at 15–50 to circulate again in the accumulator register as a new $A_n$.

By counting the number of drum turns between the entry of the $A_n$ signal into the circulation path and its reappearance at the entry point, the total number of bits that may be circulating is seen to be twenty-eight, and one new bit can be inserted each drum revolution.

While the $A_n$ bit is circulating in cell 26 of the S register, the complement of $A_n$, $A_n'$ is placed in the L flip-flop at 1–26 and the signal itself, $A_n$, is placed in the L flip-flop both at 4–26 and at 5–26. In the revolution during which the K7K2 signal is presented in the S register at 1–28, if the $A_n$ is a 0, then $A_n'$ is a 1 and the K7K2 signal is picked up in the L flip-flop by the "and" operation at 1–28 and is sent out as a "Count" signal by the Load instruction at 1–29.

When the sign of the number in the accumulator register reverses, the $A_n$ in the S register at 1–26 will be a 1 in the revolution that the K7K2 signal is in the S register at 1–28. The $A_n'$ is then a 0, which zeroes the L flip-flop. The Load instruction at 1–29 is therefore interpreted as a Read-in signal and the counter no longer receives "Count" signals. The input signal sampled by this Load instruction is placed in the S register but is not retained when the L flip-flop transfers its contents to the S register at 2–29.

In the same drum revolution, a K2 signal is circulating in cell 27 of the S register. At 4–27 and at 5–27, the $A_n$ signal, previously entered in the L flip-flop, is held there by the K2 signal. The $A_n$ signal, combined with K2 at 4–27, is delayed one drum revolution by being placed in the S register at 4–29, interchanged to the R register at 5–29 and replaced in the S register at 4–28 to be placed in the L flip-flop at 5–28. The contents of the L flip-flop are complemented at 5–33 by the 1 in the S register, which was transferred from the L flip-flop at 2–33.

At 5–34, the L flip-flop contains a "0" during the two cycles following the cycle in which the sign of the number changed. At all other times, the L flip-flop contains a "1" which is held until 5–42 and is transferred into the S register. At 10–42, the "1" is picked up in the L flip-flop. The "1" circulates the contents of the K7 generator by an "and" operation at 10–44. The "1" still in the S register at 10–42 is complemented into the L flip-flop at 11–42 to insert a "0" in the K8 generator. When the sign bit changes however, the "0" which is the $A_n \cdot K2$ signal complemented, is transferred from the L flip-flop into the S register at 5–42, and zeroes the K7 register at 10–44. At 11–42, the "0" is complemented, setting a 1 into the K8 generator at 12–45. Since the signal is stretched and lasts for two cycles, the K8 generator receives two successive 1's and, in succeeding revolutions, is able to continue to circulate these 1's.

The output of the K8 generator is found in the L flip-flop until 12–48 when it is placed in the S register. At 13–48, the K8 signal is complemented, held in the L flip-flop until 13–49, placed in the S register until 15–49, and interchanged into the R register for 1 drum cycle, being returned to the S register at 14–48. The contents of the S register at 14–48 K8', therefore, is a succession of 0's so long as the K8 generator circulates "1's." The "and" instruction at 15–48 then zeroes the L flip-flop if 0's are present in the S register. A one-revolution delay in the K8 signal line permits the first K8' signal to coincide with the first bit of the number in the accumulator register which appears in the L flip-flop at 15–46. At 15–50 it is transferred to the S register and recycles through the 28-bit circulation path. If the K8 generator circulates 0's, the S register at 15–48 contains a succession of 1's which do not modify the contents of the L flip-flop so long as $K8=1$ and $K8'=0$, then the L flip-flop will be set to 0.

The next K2 signal in the S register at 1–27 is placed in the L flip-flop at 3–27 and is delayed one revolution by a circulation loop starting in the L flip-flop at 2–27, through the S register at 2–29, into the R register at 3–29, and back to the S register at 2–28, where it is held until 3–28 and picked up in the L flip-flop. The signal in the L flip-flop at 3–33 is complemented by the 1 transferred into the S register at cell 2–33 by the L flip-flop. As described above, this signal zeroes the K5 generator in the "and" instruction at 3–38. The same signal is transferred into the S register at 3–37 and is picked up in the L flip-flop at 6–37 where it is held until 6–40. It is next transferred to the S register and at 12–40 it is picked up in the L flip-flop. This signal, is a 1 at all times except during the two revolutions that a K2 signal is in the L flip-flop at 3–29, and clears the K8 generator when the K5 generator is cleared. The K8 generator however, has zeroed the twenty-eight bits of the accumulator register in the interim, thereby clearing the accumulator for the entry of a new number.

The logical formulas that are used in the present program to generate the sum of two digits, are based upon a bit-by-bit addition of the signals from the keyboard input lines to the contents of the accumulator. The logical formula for the sum and carry digits in such a binary addition process is for the *n*th digit;

$$\text{Sum}=S_n=A_n \oplus B_n \oplus C_{n-1} \quad (22)$$

$$\text{Carry}=C_n=A_nB_n \oplus C_{n-1}(A_n \oplus B_n) \quad (23)$$

$A_n$ being the digit in the accumulator, $B_n$ being the digit from the keyboard and $C_{n-1}$ being the carry digit from the previous addition.

During each revolution of the drum, a B digit from the keyboard is added to the corresponding A digit in the accumulator. To assure the correspondence of the digits, the K3 signals are used to gate the individual B digits.

In the accumulator register itself, when new digits are not being formed, the accumulator must recirculate its contents. Therefore, after the four B digits have been entered into the accumulator, the contents in the remaining digit positions must be recirculated. However, if a Display and Reset operation has been signalled, all of the B digits are 1's, and in subsequent bit times, a succession of 1's must be added to the accumulator. The addition of a succession of 1's to a number results in the subtraction of one from the number. In order to repeat the subtraction until the sign of the number changes, the display key remains energized until the display device ceases counting up.

Another requirement of the addition process is that a Carry not be propagated from one number to the next circulation of the number although it may be propagated beyond the first four digit positions. In the present program, it is possible that successive numbers may be added to the accumulator up to a maximum sum of $2^{27}$. However, in the present embodiment, such a number would have to be applied to a different type counter having the capability to record $2^{27}$ impulses.

The equations, which include the necessary control signals, governing the generation of a new digit in the accumulator are as follows:

$$\text{Accumulator digit}=A_{new}=K8'[(K7K3' \oplus B_iK3 \oplus CK2')(K5 \oplus K7) \oplus A_{old}] \quad (24)$$

$$\text{Carry digit}=C_{new}=A_{old}(K7K3' \oplus B_iK3) \oplus C_{old}K2' \cdot (K7K3' \oplus B_iK3) \quad (25)$$

These equations, when mechanized, satisfy the prerequisite conditions imposed for entry of digits into the accumulator as specified above. The program sequence for performing this operation can be started with the actuation of a digital key at the keyboard. As explained above, the depression of a digit entry key generates a K0 signal which in turn produces the K1 signal. The B output lines of the keyboard are successively sampled, and the signals representing the $B_i$'s are placed in the S register at 8–59, the L flip-flop at 9–59 and into the S register at 9–63. At 12–63, the $B_i$'s are picked up in the L flip-flop held until 12–76 and transferred into the S register. In the next cycle the $B_i$'s appear at 1–52 and are held until 8–52, and are picked up in the L flip-flop. At 8–54, the $B_i$'s are combined with the output of the K3 generator, and the resulting signal in the L flip-flop is designated $B_iK3$. As will be recalled, K3 is generated by the K2 signal and provides an enabling signal during the cycles which represent the first four bit times of a word. The $B_iK3$ signal is transferred into the S register at 8–57, picked up in the L flip-flop at 10–57, placed in the S register at 10–60 to reappear at 1–36 of the next cycle, where it is held until 8–36.

The output of the K7 generator, which enables subtraction in the case of Display, is placed in the S register at 10–47 and reappears at 1–23 and is held in the S register until it is picked up in the L flip-flop at 8–23. The K3 signal, which was placed in the S register at 5–54, remains in the S register and reappears in the next cycle at 1–30 and is held until 6–30 when it is complemented by a 1 set in the L flip-flop held until 6–31 and again transferred to the S register and "anded" with the K7 in the L flip-flop at 8–23. The significance of the K7K3' signal is, that the signal will be a 1 if a Display is to take place and the number in the keyboard has already been added to the accumulator. Therefore, the fifth and subsequent bit times of a word, the K7K3′ signal adds a succession of 1's to the accumulator. For the next word time, the $B_i$'s from the keyboard are again added into the first four bit positions and for this reason, the Display key must be held energized.

The K7K3′ signal in the L flip-flop is combined in an "or" operation with the B K3 signal at 8–36 and the resultant quantity in the L flip-flop may be considered the addend, or the quantity to be added to the accumulator. The K2 signal, in the S register at 6–27, is complemented into the L flip-flop, transferred into S register at 6–28, and "anded" with the contents of the L flip-flop at 7–28. At this point the L flip-flop contains the carry bit $C_{old}$ (whose generation is described below), in the S register at 1–21 until being picked up in the L flip-flop at 7–21.

The "and" operation at 7–28 zeroes the Carry bit at K2, but allows the Carry to continue in the L flip-flop during all other bit times. The carry bit $C_{old}$ is transferred to the S register at 7–35 and also at 7–38. At 9–35 $C_{old}$ is picked up in the L flip-flop where it is at 9–37 with the addend, transferred into the S register at 8–37. The $C_{old}$ bit is also picked up in an "or" operation with the addend at 8–38 and the result is held in the L flip-flop until 8–39, when it is transferred into the S register and picked up in the L flip-flop both at 14–39 and also at 15–39. The logical product of the addend and $C_{old}$ formed at 9–37, is held in the L flip-flop until 9–38 is transferred to the S register and is picked up at 16–38 in the L flip-flop.

The K7 bit in the L flip-flop at 8–30, is transferred to the S register and picked up again in the L flip-flop at 10–30, where it is held until 10–37 and placed in the S register to be reintroduced into the L flip-flop at 13–37. K7 is combined in an "or" operation with the K5 signal which was placed in the S register at 3–41 after a delay in the R register, following its generation. The signal $K5 \oplus K7$, in the L flip-flop at 13–41, is put into the S register at 13–42, and is "anded" with the contents of the L flip-flop at 14–42. If either addition or subtraction is to take place, either the carry digit, or the addend digit in the L flip-flop remains in the L flip-flop until 14–43 when it is "or'ed" with a bit already in the S register portion of the accumulator and the resultant signal is held until 14–46, transferred into the S register, picked up in the L flip-flop 15–46 to become the new bit of the accumulator register. The contents of the L flip-flop are unaffected so long as the K8 generator has been zeroed and K8′ in the S register at 13–48 is therefore a "1."

The new carry digit $C_{new}$ is generated from the prior Carry digit at 16–44, when the contents of the L flip-flop, $C_{old}$ and the addend are combined in an "or" operation with the quantity in the S register at 15–44, which is the logical product of the bit in the accumulator register and the quantity in the L flip-flop at 15–39, $C_{old} \oplus$Addend. The resultant signal in the L flip-flop at 16–45 is transferred to the S register and is held at 1–21 and picked up in the L flip-flop at 7–21.

In operation, and without considering a cell-by-cell operation of the computer, the addition of two numbers proceeds as follows. A first number, for example 5 or binary 1 0 1 0 (least significant digit first) is generated on lines $B_1$, $B_2$, $B_3$, $B_4$. The K0 and K1 signals are generated as is the K4 signal which lasts for one machine word before it is Reset. The K3 signal is generated from K2 or word marker and is combined with the individual $B_i$ signals to be added to the accumulator register. Assuming that the prior contents of the accumulator are 0, the $C_{old}$ or Carry digit is a 0 and in four successive cycles, the individual B digits are entered into the accumulator register.

On succeeding cycles of the drum, the contents of the accumulator are circulated. When the next digit is to be entered, for example, a 7, (binary $$B_1 = 1B_2 = 1B_3 = 1B_4 = 0)$$

as before, the proper $B_i$ lines are energized, and the K0, K1, and K4 signals are generated. As the first, or $B_1$ bit enters the adding circuits, $B_1$ is or'ed with the 1 already in the accumulator at the first or $A_1$ bit position, and the result, a "0," is entered into the accumulator register as $A_{new}$. The "1" in the addend, intersected with the "1" already in the accumulator, provides a "1" for the Carry digit, according to the addition formula set forth above. The $B_2$ bit, combined with the Carry bit, is a 0, with a Carry bit. The 0 in the addend permits recirculation of the 0 stored in the accumulator register at the second or $A_2$ bit position, and a 1 is held as the new carry. The $B_3$ bit, which is a 1, is combined with the 1, the old carry, and the resultant 0 is used to circulate the 1 in the third or $A_3$ bit position of the accumulator register. A carry bit is generated from the combination of the 1 in the carry with the $B_3$ digit which is a "1." The $B_4$ bit, a 0, is combined with the carry bit to become a 1 and this is combined with the 0 in the fourth or $A_4$ accumulator register position, to place a 1 in the accumulator register. A carry bit is not produced. On successive cycles of operation, the K5 signal causes the entry of a succession of O's into the remaining bit position of the accumulator register.

To provide a Display, the Display button is depressed and is held depressed until the Display is complete. The binary number 15 or 1 1 1 1 is available at the $B_1$, $B_2$, $B_3$, $B_4$ signal lines. The Display signal recognition circuit provides an output signal which recognizes the occurrence of the all ones in the $B_i$ lines, $\pi B_i$. The K4 signal is set by K0 and K1 and, when combined with the output of the Display recognition circuit $\pi B_i$ and synchronized with the generated K2K6 signal, sends out a Reset pulse to the output Display counter and sets the K7 generator. In the same cycle, a K7·K2 pulse provides a "Count" pulse to the Display counter. The K7 signal gates the four $B_i$'s into the accumulator and the K7 signal causes a series of 1's to be added into the accumulator during the remaining bit times, which counts down the counter by one, each word time. Therefore, each word, a "Count" signal will be provided by the K7·K2 signal until the 28th, or sign bit, changes from a 0 to a 1. At this time, no "Count" signal will be forthcoming. The K7 generator is then cleared, and the K8 generator is energized, clearing the accumulator. A total of 12 output "Count" pulses is applied to the counter, and the Display device produces a visual presentation of the numerals 1 and 2, representing the number 12. After the Display device ceases counting, the Display key may be released.

The versatility of this machine is such that it is not limited to the performance of the task of accumulating as a binary number, successively presented decimal digits. However, it is helpful in the understanding of the more complex programs of the machine that a thorough understanding be mastered of the simple calculator program.

In its second mode of operation, the computer of the present invention is a general purpose digital computer. Because of the many more complex logical equations involved in a general purpose digital computer, it has been found desirable to expand the program register of the present machine without disturbing the sizes of the short or long circulating loops. This expansion might be mechanized either by using a drum of the same size having several additional tracks in each of which a 3,000 bit program is stored, or expanding the diameter of the drum. Alternatively, a moving head drum, which traces out a helical channel, could be used to extend the program through 31 turns of the drum. It is to be understood the length of the program is determined only by the number of logical operations to be performed, and the skill and ingenuity of the individual writing the basic program. As will be evident, the choice of 31 of 3,000 bit programs for a basic machine cycle, is one of conveniene only, and it will be evident that the same results could have been achieved using a shorter program, more efficiently.

For ease of presentation, the computer will be described in terms of how it operates, deriving therefrom the logical equations which define its operation. After the logical equations are set forth, the sequences of program instructions and the series of these sequences which mechanize these logical equations can be described. It may be noted that the computer program is also entered into the machine in the same fashion as the digital signal information, and, is as readily changed.

Figure 10:
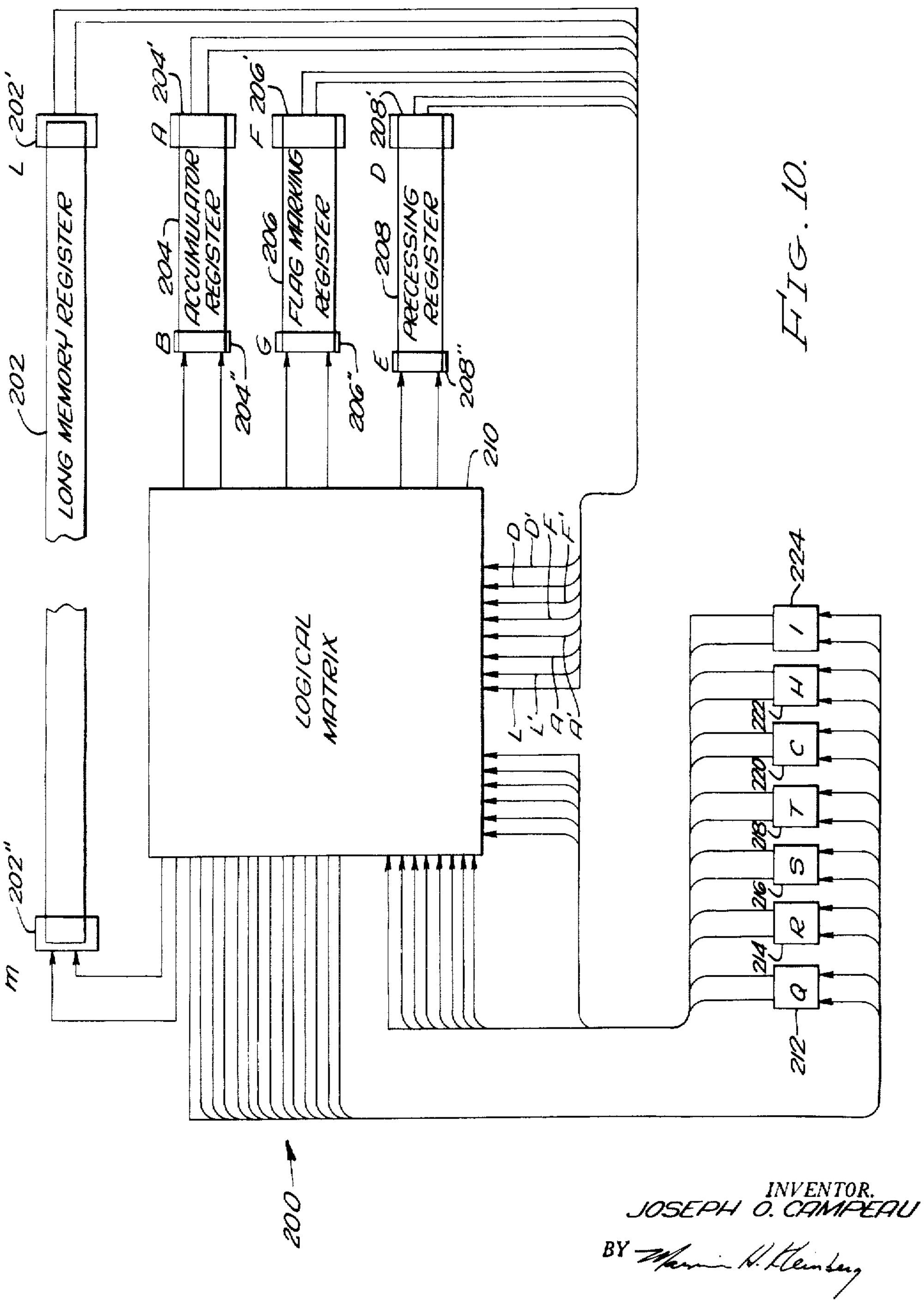
FIGURE 10 is a block diagram of a general purpose digital computer, the equations for which can be derived and generated in the circuits of the present invention.

In order to facilitate the discussion of the machine, initially consider a conventional general purpose digital computer. FIGURE 10 is a block diagram of such a computer 200. Computer 200 includes an LM or long memory register 202, and A·B or accumulator register 204, an FG or flag marking register 206, and a CD or precessing register 208. Each of these circulating registers has a respective read and write staticizer or flip-flop. The L output staticizer 202' provides an output of the contents of LM register and the M input staticizer 202'' is a means of reinserting information into the register. Similarly, the accumulator 204 has an A read staticizer 204' and a B write staticizer 204''. The staticizers of the flag marking register 206 are F and G 206' and 206'', respectively and the precessing register has D and E staticizers, 208' and 208'', respectively.

A logical gating matrix 210 is interconnected with the inputs and outputs of seven flip-flops, designated respectively ,the Q flip-flop 212, the R flip-flop 214, the S flip-flop 216, the T flip-flop 218, the C flip-flop 220, the H flip-flop 222, and the I flip-flop 24. The individual flip-flops and the write staticizers receive input signals from the matrix 210 and the output of the write staticizers is applied directly to the individaul circulating registers.

The LM register 202 contains 240 bits of information divided into eight words, each 30 bits in length. The accumulator is one word, or 30 bits in length, the flag marking register 206, is one word or 30 bits in length, and the precessing register 208, is 31 bits in length, or 1 bit longer than a word. Information placed in the CD register 208 is shifted with respect to the other registers during the passage of each word of the LM register 202.

Figure 11:
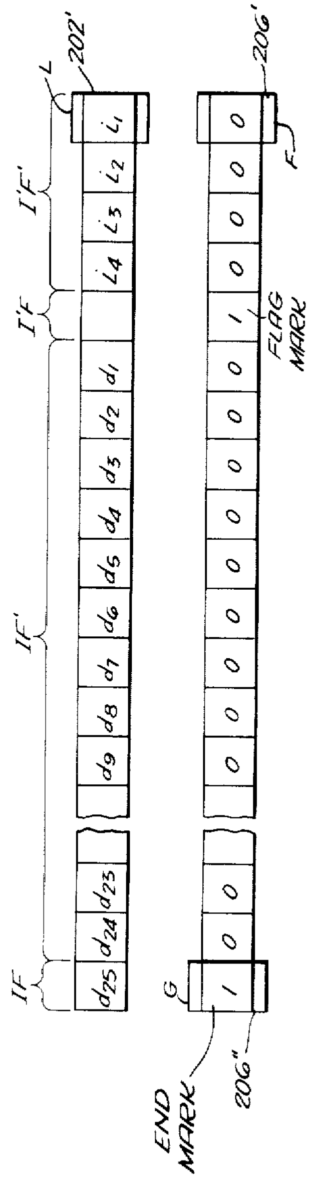
FIGURE 11 is a block diagram of a portion of the LM register and FG register of the computer of FIGURE 10 showing the structure of the words contained therein.

With reference to FIGURE 11, the structure of a single word is shown. In addition, the structure of the flag mark register is shown aligned with a typical word of the LM register. In each word, the first four bits, designated $i_1$, $i_2$ $i_3$, $i_4$, represent instruction bits which specify the operation to be performed on the succeeding bits of the number. If the instruction is one of certain special instructions, to be more clearly explained below, the digits following will not be a number, but rather an address location of a number to be sought in the memory.

The fifth bit of each word is a position into which a mark may be put in executing certain instructions to be more fully explained below, and the remaining 25 bits, $d_1$ through $d_{24}$, represent a number and the last bit, $d_{25}$, represents a sign.

In general operation, as the individual digits of a word appear in the L read staticizer 202', the instruction bits are stepped into four instruction flip-flops, Q, R, S, and T, 212, 214, 216, and 218, respectively. The instruction remains in these flip-flops during the rest of the word, and directs the operation which is to be carried out upon the number contained in the word. At the end of the word, the instruction flip-flops are cleared so that the instruction of the next word may be inserted.

The following nine instructions are used:

*Table 10*

(1) Add QRST'

The number in the LM register 202 is added to the number in the AB register 204 and the result is held in the AB register. During this instruction, the digits staticized in L are copied into M for reinsertion into the LM register.

(2) Subtract QR'ST'

The number in the LM register is subtracted from the number in the AB register and the result is held in the AB register. The contents of L are applied to M.

(3) Put P0 QR'ST'
P1 Q'R'ST
P2 QR'ST
P3 QR'S'T

The number in the AB register in "put" into the word in the LM register, identified by an address in the word carrying the Put instruction.

(4) Take T0 Q'RST'
T1 Q'RST
T2 QRST

A number is taken from the LM register and put into the AB register. The word having the Take instruction contains the address of the word to be "taken."

(5) Test QR'S'T'

The number in the LM register is subtracted from the number in the AB register. If the result is negative, the machine accepts the next word. If the result is positive or "0," the next word is skipped.

(6) Pass Q'R'S'T'

The machine passes to the instruction of the next word.

(7) Insert QRS'T'

Copy the number in the LM register into the AB register.

(8) Unconditional Transfer $T_r0$ Q'RS'T'
$T_r1$ Q'RS'T

The machine jumps to another word in the LM register identified by an address in the word carrying the transfer instruction.

(9) Stop $S_p1$ QRS'T
$S_p2$ Q'R'S'T

The machine is in an idle state in which no computation takes place and during which all of the memory registers are circulated.

The FG or flag marking register is one word in length and is a means for identifying information in the LM register. The flag marking word contains a "1" in the fifth cell position, and a "1" in the thirtieth or last cell position. All other digits are "0's". The "1" at the last cell is called the "end mark" and the "1" at the fifth cell is called the "flag mark." The use of these marks is explained more fully below.

An expanded description of the "Put," "Take," "Transfer," and "Stop" instructions is helpful and detailed consideration of the "Put" instruction will indicate how addressing is accomplished. The "Put" instruction consists of four sub-instructions, designated P0, P1, P2, and P3. P0 is carried in the word, itself.

The instruction P0 appears in the instruction flip-flops Q, R, S, and T, and the following operations occur. At the occurrence of the flag mark in the FG register, a "1" is inserted in the LM register. This "1" in the fifth LM cell is called a "flag" and is used to identify the word carrying the "Put" instruction. After the flag has been inserted, the number appearing in L is placed in the DE register. In the case of the Put, Take, and Transfer instructions, the number following these instructions will have a single digit, a 1, and all other digits are "0's." A number of this sort, is placed in the DE register and provides a precessing mark. The DE register, being one bit longer than the FG register, precesses the single 1 in the DE register, backwards by one cell toward the end mark of the FG register each word time. The precessing bit appears in the D staticizer when the end mark appears in the F flip-flop. This simultaneous double occurrence of bits identifies the next following word as the word addressed by the Put, Take, or Transfer instruction.

At the occurrence of the end mark during the word carrying the P0 instruction, the P0 stored in the instruction flip-flops is changed to P1 by the internal logic of the machine. During P1, recirculation takes place in all registers and P1 is maintained until the precessing mark appears in conjunction with the end mark at which time the internal logic modifies the instruction flip-flops to represent P2. During P2, the number part of the AB register is transferred to the number part of the LM register. At the next end mark, P2 the instruction flip-flops are changed to represent P3. During P3, recirculation takes place until the flag appears in L, identifying the word which contained the Put instruction. The flag is then removed and the instruction flip-flops are changed to represent Pass, so that the machine passes to the next word.

The Take instruction is similar to the Put instruction, T0, T1, and T2 corresponding respectively to P0, P1, and P2. During T1, the bits circulate and when the precessing mark appears in D in conjunction with an end mark in F, T1 is changed to T2, and the next number in the LM register is copied into the AB register. T2, at the end mark, is then changed to P3, which returns to the Flag, erases it and sets up a Pass instruction.

In the Transfer operations, no flag is inserted even though an addressing operation takes place, since there is no need to return to the word containing the Transfer instruction. There are two sub instructions, $T_r0$ and $T_r1$. During $T_r0$, the addressing bit in the LM channel is placed in the DE register where it is precessed. The $T_r0$ changes to $T_r1$ at the end mark. During $T_r1$, recirculation takes place until the precessing mark appears in conjunction with the end mark, and the instruction flip-flops are set to represent Pass so that the machine takes the next word.

The Stop instruction consists of two subinstructions, $S_p$1 and $S_p$2. $S_p$1 is carried as the instruction of a word. With $S_p$1 in the instruction flip-flops, a flag is inserted in the LM register and the instruction is changed to $S_p$2. During $S_p$2, no computation is carried out and all of the registers recirculate their contents. The machine remains in $S_p$2 until the Start button, which is the 0 button during computation, is actuated. $S_p$2 is then changed to P3 which returns to the flag, erases it and sends the machine to the next word.

Table 11 sets forth the values of Q, R, S, and T corresponding to the various instructions.

*Table 11*

| | Q | R | S | T |
|---|---|---|---|---|
| Pass | 0 | 0 | 0 | 0 |
| Add | 1 | 1 | 1 | 0 |
| Subtract | 1 | 0 | 1 | 0 |
| Test | 1 | 0 | 0 | 0 |
| Insert | 1 | 1 | 0 | 0 |
| Put P0 | 0 | 0 | 1 | 0 |
| P1 | 0 | 0 | 1 | 1 |
| P2 | 1 | 0 | 1 | 1 |
| P3 | 1 | 0 | 0 | 1 |
| Take T0 | 0 | 1 | 1 | 0 |
| T1 | 0 | 1 | 1 | 1 |
| T2 | 1 | 1 | 1 | 1 |
| Transfer 0 | 0 | 1 | 0 | 0 |
| Transfer 1 | 0 | 1 | 0 | 1 |
| Stop 1 | 1 | 1 | 0 | 1 |
| Stop 2 | 0 | 0 | 0 | 1 |

There are three modes of operation of the computer of the present invention, each mode corresponding to one of the positions of the three-position switch 114 of FIGURE 2. From a discussion of the operation of the computer in each of these modes, logical equations can be derived for the various flip-flops and staticizers.

When the machine is started, it is usually desirable that the contents of the memories be cleared and the machine be prepared for a new operation. Therefore, during the Mark operation, which is initiated by placing the three-position switch in its uppermost position (referring to FIGURE 2), all of the registers and flip-flops are set to 0 which completely clears the machine. The marking phase of the operation is started by depressing the ① key. With all flip-flops and registers in the 0 state, during the mark operation Ⓜ, the C and Q flip-flops are used as a two-bit counter to monitor the marking process.

Table 12, set forth below, lists the states of the C and Q flip-flops and indicates the operation controlled by each of the states.

*Table 12*

| C | Q | State | Operation |
|---|---|---|---|
| 0 | 0 | Idle | $②_d$ changes the operation from idle to OP1. |
| 0 | 1 | OP1 | Shift to OP2, enter a "1" in the G staticizer. |
| 1 | 1 | OP2 | Count to 5 using R, S, and T flip-flops. At R S' T, change to Dawdle, enter a "1" in the G and M staticizers. |
| 1 | 0 | Dawdle | At $①_u$ change to Idle. |

At the actuation of the ① key, the Q flip-flop is set to "1" and the operation changes to the OP1 state. The OP1 state causes entry of a single 1 into the G staticizer and also changes the state of the C flip-flop to a 1 to enter the OP2 state. During OP2, the R, S, and T flip-flops function as a counter.

During each timing pulse, the state of the flip-flops determine the next state. Table 13, set forth below, lists the various states of the R, S, and T flip-flops during the successive counts while in the OP2 state of the Mark operation.

*Table 13*

| Number | R | S | T |
|---|---|---|---|
| (1) | 0 | 0 | 0 |
| (2) | 0 | 1 | 0 |
| (3) | 1 | 1 | 0 |
| (4) | 1 | 1 | 1 |
| (5) | 1 | 0 | 1 |
| (6) | 0 | 0 | 1 |

At the count of 5, the flip-flops provide an output R, S', T. At this time, a second 1 is entered into the G staticizer, to be used as the flag mark and a 1 is entered into the M staticizer to represent a reference or fiducial mark. The Q flip-flop is then set to 0 to enter the Dawdle state.

When the flip-flops have reached their sixth state, and C and Q are in the Dawdle condition, the flip-flops Q, R, S, and T are in a configuration which would be assumed if the Stop 2 instruction had been given while in the Compute mode. When in the Mark mode, therefore, the machine will interpret the Q'R'S'T state as an instruction to recirculate the contents of all registers.

From the foregoing description of the Mark mode of operation, the logical equations for the various registers and staticizers may now be derived. For simplicity in explanation, only the equations which set the staticizers and flip-flops to their "1" state will be set forth below. It should be understood that the zeroing equations are the complements of the setting equations. A system may be assumed which, unless a signal is given to set a 1 into the flip-flops or staticizers, enters a 0 automatically.

$$\text{Set } Q=C'①_d \quad (26)$$

$$\text{Set } R=CQS \quad (27)$$

$$\text{Set } S=CQT' \quad (28)$$

$$\text{Set } T=CQR \quad (29)$$

$$\text{Set } C=C'Q \quad (30)$$

$$\text{Set } I=CQRS'T+I'F \quad (31)$$

$$\text{Set } H=H \quad (32)$$
$$\text{Set } E=D \quad (33)$$
$$\text{Set } B=A \quad (34)$$
$$\text{Set } G=A'F+C'Q+CQRS'T \quad (35)$$
$$\text{Set } M=Q'L+CQRS'T \quad (36)$$

At the completion of the Mark operation, the LM register contains a single "1," the fiducial mark, and the FG or marking register contains an end mark and five cells later, the flag mark which is concurrent with the fiducial mark. After the three marks have been written in the registers, the machine idles and is ready to be placed in its next mode of operation, the Fill mode.

The Fill mode Ⓕ is entered by setting the three-position switch 115 into the second or middle position. In the Fill operation also, the C and O flip-flops act as a counting register to determine the phase of the operation. Table 14 sets forth the stages of the C, Q flip-flops, and the operations controlled thereby.

*Table 14*

| C | Q | State | Operation |
|---|---|---|---|
| 0 | 0 | Idle | Change to Fill at flag and $①_d H$ or flag and $⓪_d H'$. |
| 0 | 1 | Fill | Copy flag into M, then transfer contents of L through H to M, skipping all subsequent flag position. On reoccurrence of fiducial mark, Q, I's, F, L, change to Dawdle. |
| 1 | 0 | Dawdle | Circulate contents of registers when both the ① and ⓪ keys are up, change to Idle. |

During the Idle stage of the Fill mode, a 1 or 0 is entered from the ① or ⓪ keys into the H flip-flop which then holds a signal representing the key depressed. At the occurrence of the fiducial mark, the mark is copied into the M staticizer and the operational state is changed to Fill by setting the Q flip-flop. During the Fill state, the H flip-flop is connected to the L staticizer and the output of the H flip-flop is applied to the M staticizer. Each bit is entered next to the fiducial mark and the older bits follow. The most recent bit is always adjacent to the fiducial mark.

To prevent filling spurious bits into the flag position of successive words during the entry of information, a 0 is always written in the flag mark position of all succeeding words. At the completion of the register cycle, and at the reappearance of the fiducial mark, the CQ flip-flops are changed into the Dawdle state. The Dawdle state is maintained until both the ① key and the ⓪ key are in their uppermost positions, at which time the CQ flip-flops are changed into the Idle state. The ① and ⓪ keys each produce two signals representing, respectively, the up and down. During Idle and Dawdle, the H flip-flop is set to correspond to the actuated key. The LM register and FG register merely circulate their contents during both the Idle and Dawdle states.

The following equations, when mechanized, provide the Fill operation described above.

$$\text{Set } R=R \quad (37)$$
$$\text{Set } S=S \quad (38)$$
$$\text{Set } T=T \quad (39)$$
$$\text{Set } E=D \quad (40)$$
$$\text{Set } B=A \quad (41)$$
$$\text{Set } G=F \quad (42)$$
$$\text{Set } Q=C'Q'(①_d H+⓪_d H')I'FL+C'Q(I'FL)' \quad (43)$$
$$\text{Set } C=C'QI'FL+CQ'[①_u'+⓪_u'] \quad (44)$$
$$\text{Set } H=Q'①_d+Q[(I'F)'L+I'FH] \quad (45)$$
$$\text{Set } M=Q'L+Q[I'FL+(I'F)'H] \quad (46)$$

During the Fill operation, the long memory or LM register is filled one bit at a time. It therefore requires some 239 key actuations before the memory is entirely filled. The first entered bits are the instruction bits of the eighth or "last" word. When the memory has been filled, the fiducial mark remains in the flag position of the word whose number portion was filled last. The machine is then in a state corresponding to the Stop 2 instruction carrying a flag in the "last" word of the memory. The machine is now ready for the third or Compute © mode of operation.

The three-position switch 115, placed in its third or downmost position, sets the machine into the Compute mode of operation, in which the ⓪ key serves as a Start button. In order to synchronize the starting of the Compute operation, the H flip-flop is used to prevent the Start signal from being entered more than once. The H flip-flop is set to a 1 at the downmost position of the ⓪ key, $⓪_d$ when the fiducial mark appears. The H flip-flop then remains in the 1 state until the ⓪ key returns to the uppermost position $⓪_u$. When the Start signal is produced, the state of the instruction flip-flops changes from Stop 2 to P3 which, after erasing the fiducial mark, enables computation to start with the next word.

The first bits of the next word, which is the "first" word in the memory, are identified by the state of the I flip-flop and F read staticizer, as are all portions of each of the word as set forth in Table 15.

*Table 15*

| IF state: | Portion of word |
|---|---|
| I'F' | Instruction bits. |
| I'F | Flag position. |
| IF' | Number portion. |
| IF | Sign bit. |

The instruction bits are stepped, through the instruction flip-flops in order, so that each bit of the instruction goes first to the Q flip-flop, then to the R flip-flop, the S flip-flop, and finally the T flip-flop in four successive bit times. Once the instruction has been entered, the number portion of the word, that is, the remaining 25 bits of the word, are operated upon according to the instruction stored in the flip-flops.

Certain instructions require more than one word for the instruction to be fully executed. It is therefore necessary, to prevent entry of new instruction while any of these special instructions are being followed.

Referring to Tables 10 and 11, it may be noted that certain instructions have the T flip-flop in the "1" state. It is these instructions that are to be "protected" and the state of the T flip-flop can be used as a control signal in the logical equations for setting the instruction flip-flops. If, at the beginning of a word, the T flip-flop is in the 1 state, then the instruction flip-flops will remain unchanged throughout the instruction portion of that word.

During the execution of the Test instruction, the number in the LM register is subtracted from the number in the AB register. If the result is a positive one, the sign digit of the answer is a 1 which is stored in the C flip-flop. At the end mark, the instruction is changed to Pass so that the next word may be skipped. It is therefore necessary to protect the Pass instruction which is set up at the end of a Test instruction. The Pass instruction consists of 0's in all of the instructions in the flip-flops. Therefore, if the T flip-flop is 0 and the other flip-flops are also 0, and if the C flip-flop is a 1, the next instruction will not be entered into the instruction flip-flops.

The machine carries out its computational instructions in the following manner. For addition, the digits of the LM register that appear in the L staticizer are combined in binary addition with the digits appearing in the A staticizer of the AB or accumulator register. The C flip-flop is used as the carry flip-flop and the result is placed in the B staticizer for insertion into the AB register. The digit appearing in the L staticizer is automatically copied into the M staticizer during the addition operation.

In the Insert instruction, the number in the LM register is copied into the AB register without alteration or modification.

The Subtract instruction combines the number in the LM register with a number in the AB register in a binary subtraction operation placing the result in the AB register. The C flip-flop is used as a carry and during subtraction is preset to 1 at the occurrence of the flag mark. The output of the L staticizer is copied into the M staticizer to circulate the number in the LM register.

In the Test instruction, a subtraction process is carried out, presetting the carry flip-flop to a 1. If at the end of the Test, the number in the LM register is equal to or less than the number in the AB register, the C flip flop is a 1, and the Test instruction is changed to Pass. As in the Subtract instruction, the LM number is recopied into the M staticizer and the result of the subtraction is held in the AB register.

The input to the B staticizer normally is taken from the A staticizer except in the Add, Subtract, Test, Take, and Insert instructions. During the Take 2 portion of the Take instruction and in the Insert operation, the output of L is applied to B, copying the LM word into the AB register.

In Add, the binary sum of the A digit and the L digit is applied to B, and the carry must be included. With reference to Equations 1 and 2 above—

$$S_i=A_i'B_i'C_{i-1}+A_i'B_iC_{i-1}'+A_iB_i'C_{i-1}'+A_iB_iC_{i-1} \quad (1)$$

Alternatively, this equation might be rewritten:

$$S_i=A_i\oplus B_i\oplus C_{i-1} \quad (1a)$$

Substituting L for B, $$S_i=A_i\oplus L_i\oplus C_{i-1} \quad (1b)$$

and similarly for the Carry digit:

$$C_i=A_iB_i+B_iC_{i-1}+A_iC_{i-1} \quad (2)$$

or alternatively:

$$C_i=A_iB_i\oplus C_{i-1}(A_i\oplus B_i) \quad (2a)$$

and with the substitution of L for B, $$C_i=A_iL_i\oplus C_{i-1}(A_i\oplus L_i) \quad (2b)$$

During the Test and Subtract operation, the input to B is the binary subtraction or difference of the digit in L and the digit in A.

The equations for subtraction are:

$$\text{Difference}=D_i=A_i\oplus L_i\oplus C_{i-1} \quad (1c)$$

Which is the same as the equation for the Sum, $S_i$ (1*b*). In a Subtraction, the Carry would be:

$$C_i=A_i'B_i+C_{i-1}(A_i\oplus B_i)' \quad (2c)$$

However, by presetting the carry to be a 1 at the beginning of an operation, and by complementing the number corresponding to $B_i$, subtraction is accomplished by merely adding. Therefore, and with the substitution of L for B:

$$C_i=L_i'A_i+C_{i-1}(L_i'\oplus A_i) \quad (2d)$$

The Equations 2*b* and 2*d* can be combined into one composite equation if it is recalled that the Add, and Subtract, and Test signals combinations differ only slightly and that:

Add, $$C_i=R[A_iL_i+C_{i-1}(A_i\oplus L_i)] \quad (2e)$$

Subtract, $$C_i=R'[A_iL_i'+C_{i-1}(A_i\oplus L_i')] \quad (2f)$$

combining the two:

$$C_i=C_{i-1}A_i+(C_{i-1}+A_i)(R\oplus L_i)' \quad (2g)$$

If the instruction is a Put, a Take, or a Transfer, the number portion of the remainder of the word is not considered a number but rather is an address. A single "1" is placed in the number portion of the word, in one of the last eight-bit positions, each of which corresponds to a different word in the LM register. In order to find a word so addressed, the number portion of a Put, Take, or Transfer word, is copied into the E staticizer of the DE or precessing register.

As has been pointed out above in conjunction with the explanation of the Put, Take, and Transfer instructions, the single bit in the precessing register when appearing simultaneously with an end mark in the FG register serves to identify the word being addressed.

The FG or flag marking register, once it has received its two marks, the flag mark and end mark, continually recirculates its contents and the output of the F staticizer is always applied to the G staticizer. The output of the D staticizer of the precessing register is normally applied to the E staticizer, except during the Put, Take, and Transfer instructions, when the number in the LM register is copied into the DE register in order to proceed with the addressing part of the operation. Once the addressed word has been found, the E staticizer is only permitted to accept the output of the D staticizer during the number portion of the word or, with reference to Table 15, above, when the I flip-flop is a 1. This serves to prevent recirculation of the precessing bit.

It is now possible to write the logical equations for the flip-flops and staticizers during the compute mode of operation, and these are set forth below:

$$\text{Set } Q=F'LI'T'C'+F'Q(I'T')'+IFST(Q+D)+I'FQ[S'T(R+L)]'+IFQR'S'T+\textcircled{O}_dI'FQ'R'S'TH'L \quad (47)$$

$$\text{Set } R=I'F'QT'+F'R(I'T')'+I'FR(QS'T)'+IFQ'R(S'TD)' \quad (48)$$

$$\text{Set } S=I'F'T'R+F'S(I'T')'+FS(IQ)' \quad (49)$$

$$\text{Set } T=I'F'T'S+F'T+I'FT(QR'S'L)'+IFT(Q'R'S'D)' \quad (50)$$

$$\text{Set } E=I[Q'T'(R+S)]'D+IQ'T'(R+S)L \quad (51)$$

$$\text{Set } B=I[QT'(R'+S)+QR(S\oplus T)']'A+QR(S\oplus T)'L+IQT'(R'+S)(F\oplus A\oplus L\oplus C) \quad (52)$$

$$\text{Set } G=F \quad (53)$$

$$\text{Set } I=(I\oplus F) \quad (54)$$

$$\text{Set } C=I'F'C+I'FQR'T'+IF'QT'[CA+(C\oplus A)(R\oplus L)']+IFQR'S'T'(C\oplus A\oplus L) \quad (55)$$

$$\text{Set } H=\textcircled{O}_dI'FLH'+\textcircled{O}_u'H \quad (56)$$

$$\text{Set } M=I'F(Q'ST'+QRS'T)+IQR'STA+[I'F(Q'ST'+QRS'T)+IQR'ST]'L \quad (57)$$

Having derived logical equations for each of the modes of operation of the computer, by the use of well known logical methods, composite equations may be set forth for each of the flip-flops and staticizers. It may be understood, that many of the equations are not in their simplest, logical form, and persons skilled in the art may reexamine these equations for the purposes of reducing them to their logical, simplest form. However, for the purposes of the present example, the equations are in a form which allows for mechanization in the device of the present invention, and are adequate for the purposes of description.

$$\text{Set } Q=\textcircled{M}\{C'(Q+\textcircled{1}_d)+CQ(RS'T)'\}+\textcircled{O}_dH'I'FLQ'(\textcircled{F}C'+\textcircled{C}R'S'T)+\textcircled{F}\{\textcircled{1}_dHC'Q'I'FL+C'Q(I'FL)'\}+\textcircled{C}\{F'L(I'T'C')+F'Q(I'T')'+IFST(Q+D)+I'FQ[S'T(R+L)]'+IFQR'S'T\} \quad (58)$$

$$\text{Set } R=\textcircled{M}CQS+\textcircled{C}\{I'F'QT'+F'R(I'T')'+I'FR(QS'T)'+IFQ'R(STD)'\} \quad (59)$$

$$\text{Set } S=\textcircled{M}CQT'+\textcircled{C}\{I'F'T'R+F'S(I'T')'+FS(IQ')\} \quad (60)$$

$$\text{Set } T=\textcircled{M}[CQR+Q'R'S'T]+\textcircled{F}+\textcircled{C}\{I'F'T'S+F'T+I'FT(QR'S'L)'+IFT(Q'RS'D)'\} \tag{61}$$

$$\text{Set } C=\textcircled{M}(Q+C\textcircled{1}_u')+\textcircled{F}\{C'QI'FL+CQ'\textcircled{1}_u'+\textcircled{0}_u')\}=\textcircled{C}\{I'F'C+I'FQR'T'+IF'QT'[CA+(C\oplus A)(R\oplus L)']+IFQR'S'T'(C\oplus A\oplus L)\} \tag{62}$$

$$\text{Set } I=\textcircled{M}CQTRS'+I\oplus F) \tag{63}$$

$$\text{Set } H=\textcircled{F}\{Q'\textcircled{1}_d+Q[(I'F)'L+I'FH]\}+\textcircled{C}[\textcircled{0}_dI'FLH'+H\textcircled{0}_u'] \tag{64}$$

$$\text{Set } B=\textcircled{C}\{I[QT'(R'+S)+QR(S\oplus T)']'A+QR(S\oplus T)'L+IQT'(R'+S)(F\oplus A\oplus L\oplus C) \tag{65}$$

$$\text{Set } G=(\textcircled{M}Q)'F+\textcircled{M}Q(C'+RS'T) \tag{66}$$

$$\text{Set } E=C\{DI[Q'T'(R+S)]'+Q'T'(R+S)LI\} \tag{67}$$

$$\text{Set } M=X'L+\textcircled{M}CQRS'T+\textcircled{F}\{Q'L+Q[I'FL+(I'F)'H]\}+\textcircled{C}\{I'F(Q'ST'+QRS'T)+IQR'STA\} \tag{68}$$

where $$X=\textcircled{M}CQRS'T+(\textcircled{F}Q(I'F)'+\textcircled{C}\{I'F(Q'ST'+QRS'T)+IQR'ST\} \tag{69}$$

Given the above logical equations, a computer can be built including the necessary gates, staticizers, and registers, which mechanize the foregoing equations, and the completed assemblage will behave as a general purpose computer in accordance with the description of operation set forth above. However, rather than building an actual computer, according to the principles of the present invention set forth above, these same logical equations can be mechanized in a suitable series of program sequences, each of which generates a different portion of the logical equations.

Figure 12:
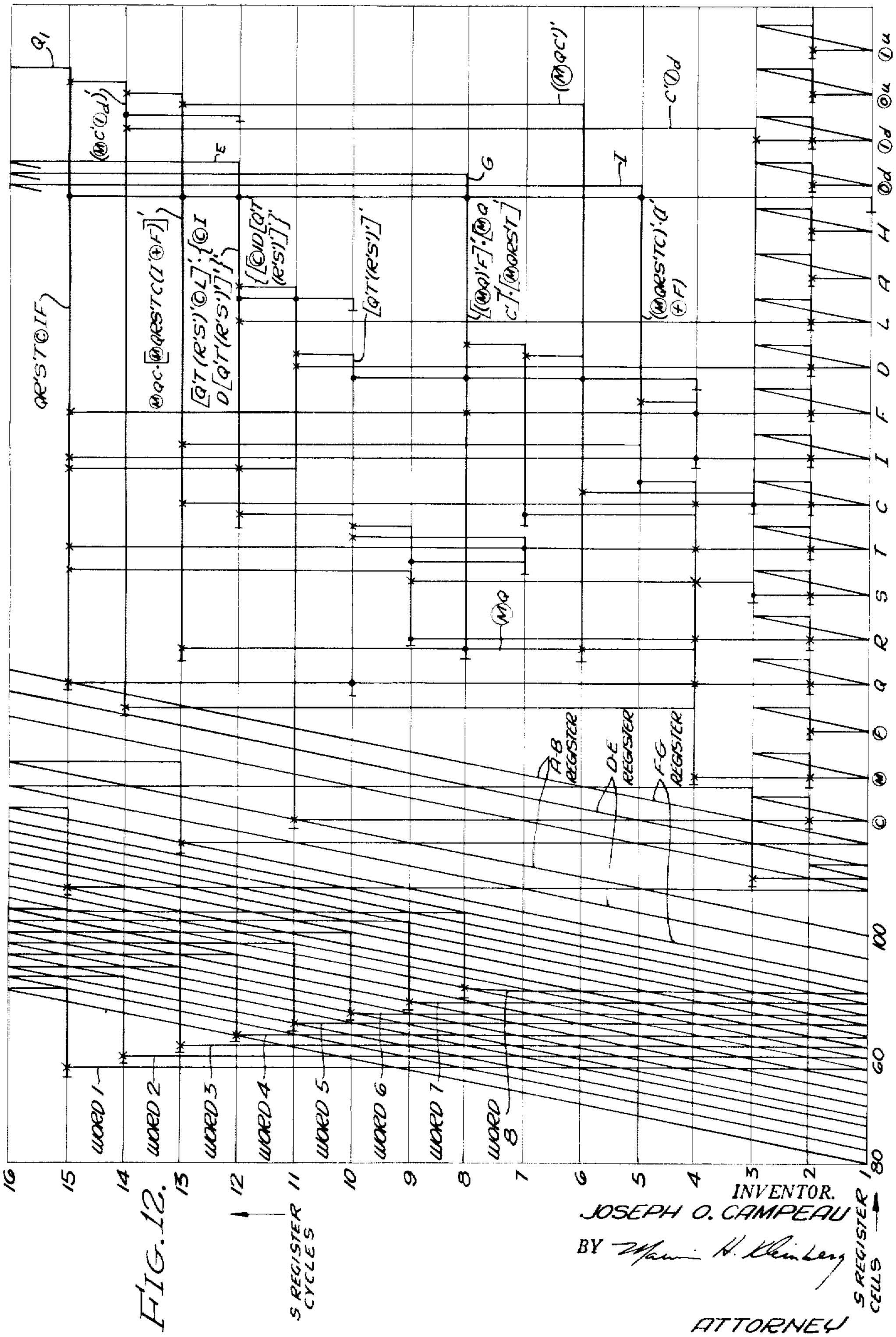
FIGURE 12 is a graph of a portion of the program of the device of the present invention which generates some of the logical equations of the general purpose digital computer of FIGURE 10.
Figure 13:
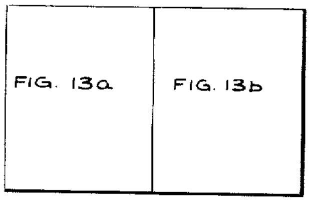

With reference now to FIGURE 12, a graphic plot is shown therein which, when set into the program channels of the computer of the present invention will enable the machine to generate solutions of the logical equations for given input variables. Such a program extends over some 93,000 program cells.

Because of the length of the program, a detailed explanation of the complete program sequence will not be attempted herein, however, it should be understood, that the same graphic techniques shown in FIGURE 9 are here utilized in the operation of the computer and that the entire program is set forth both graphically and in tabular form in Table 16, shown in FIGURES 14 through 19. It may be noted however, in connection with the operation of the expanded program register, bits placed in the R loop precess backwards in each of the successive 3,000 bit sequences.

It a bit is in the R storage loop at the first 3,000 bit cycle, after 15 of such 3,000 bit cycles, the bit will be in a position corresponding to the first S register cycle some 15 cells earlier. If the bit is now left in the R loop for the remainder of that 3,000 bit cycle, the bit reappears in the R register at the sixteenth turn of the S register, advanced by 23 cells, the bit therefore being available twice in one cycle of the 3,000 bit program. The net effect of leaving a bit in the R register for a complete program of 31, 3,000 bit cycles, is to precess the bit as though only one 3,000 bit cycle had occurred. It may be noted, that the number of 3,000 bit cycles in a program was selected to correspond to the chosen 30 bits.

In order to facilitate explanation of both the graphic plot and the Table 16, each 3,000 bit program cycle has been designated by a script letter L with a subscript identifying the cycle.

To illustrate the manner of generating signals representing the states of flip-flops, a portion of the program sequences of the $\mathcal{L}_1$ or first 3,000 bit program is to be described. With reference to FIGURE 12, Table 16, the first three S register cycles are used primarily for the circulation of information representing the states of the various keyboard inputs, flip-flops, and Read staticizers. During $\mathcal{L}_1$, signals, representing the state of the I flip-flop and the G and E write staticizers in the next bit time, are generated by means of a series of program steps.

Recalling, for example, the equation to Set I, $$\text{Set } I=\textcircled{M}CQRS'T+(I\oplus F) \tag{63}$$

Referring to the FIGURE 12, at 4–113, a set 1 of the L flip-flop combined with an "and" instruction at 4–114 picks up a signal representing Ⓜ in the L flip-flop. Successive "and" operations at 4–122, 4–126, 4–131, 4–134 and 4–138 produce at 4–139 in the L flip-flop, a signal which represents the logical product ⓂCQRS'T. Each of these signals is a "1" or "0" depending upon the contents of the circulating registers and if "1's" are circulating in all registers, the composite term is a "1." The resulting signal is transferred to the S register at 4–140.

At 5–139, a 1 is set into the L flip-flop and at 5–140, an "or" operation complements the contents of the S register into the L flip-flop. At 5–140, therefore, the L flip-flop holds a signal representing the complement of one of the terms of the Set I equation. At 4–141, a 1 set of the L flip-flop picks up the complement of the I signal at 4–142 from the I register and "or's" this with the F signal at 4–146. At 4–147, the signal $(I'\oplus F)$ is transferred to the S register and is "anded" into the L flip-flop at 5–147. The term $(I'\oplus F)$ is the logical equivalent of the term $(I\oplus F)'$ so that at 5–150, the L flip-flop carries the composite term $(\textcircled{M}QRS'TC)'(I\oplus F)'$. At 5–165, this quantity is complemented by an "or" operation with a 1 previously placed in the S register. The result, the quantity $\textcircled{M}CQRS'T+(I\oplus F)$, is transferred to the S register at 5–166 and is the Set I equation (63). This signal is held in the S register until 16–166 when it is interchanged into the R register for a subsequent insertion into the circulating register that applies the quantity I to cell 142 of the S register during the $\mathcal{L}_1$ program cycle. Similarly, the equations for the G and E staticizers can be followed in FIGURE 12, and in subsequent $\mathcal{L}$ cycles, all of the logical equations that describe the operation of the computer of FIGURE 10 can be identified and their resultant signals followed.

At 16–167 of $\mathcal{L}_1$ a signal representing the input to the G staticizer is interchanged into the R register, and at 16–168, a signal, representing an input to the E staticizer is interchanged into the R register. Also during the $\mathcal{L}_1$ cycle, a quantity is generated which represents some of the terms of the Set Q equation. This signal, designated Q1, is left in the S register at 16–176 and is picked up 24 bits earlier, at 1–152 in the $\mathcal{L}_2$ cycle.

The program sequences which produce the circulating registers LM, DE, AB, and FG are repeated throughout each of the 31 cycles of the program. In some of the cycles, additional program signals are inserted to gain access to the contents of these circulating loops. In $\mathcal{L}_{29}$, $\mathcal{L}_{30}$, and $\mathcal{L}_{31}$, the structure is modified to permit readout of information from the AB register and circulation of the LM register.

To enable the readout of information from the AB register, a Read command is generated to aid in the formation of a Trigger output signal. The Read command is created during the Compute mode and when the flag mark is read, the instruction flip-flops contain a signal combination corresponding to $S_p2$. Then, whenever the computer is circulating its registers, the accumulator can display its contents. The provision of the Read command which enables the readout is described below.

In the first eight cycles of the 3,000 bit program cycles, $\mathcal{L}_1$ through $\mathcal{L}_8$, program sequences representing 18, two-bit storage loops are repeated in order to provide a source of staticizer signals, flip-flop signals, and signals representing the setting of the three-position switch, and the (1) and (0) entry keys. In the cycles subsequent to $\mathcal{L}_8$, that is $\mathcal{L}_9$ through $\mathcal{L}_{31}$, the storage loops are not repeated and new values are generated for subsequent insertion into the storage registers of the next cycling of the entire program.

In the $\mathcal{L}_2$ cycle, additional terms of the Q equation are generated and a composite signal is placed in the S register at 16–181. In the $\mathcal{L}_3$ cycle, a quantity made up of the terms of the Q equation previously generated and representing the Q flip-flop is generated and interchanged into the R register at 16–182. A quantity representing the state of the R flip-flop is generated and is interchanged into the R register at 16–183.

During $\mathcal{L}_4$, a quantity representing the S flip-flop is derived and is interchanged into the R register at 16–169. Signals representing the H and T flip-flops are derived during $\mathcal{L}_5$ and are interchanged into the R register at 16–182 and 16–183 respectively. The quantity C is produced during $\mathcal{L}_6$ and is interchanged into the R register at 16–184. A quantity, representing the signal to be entered into the M staticizer, is derived during $\mathcal{L}_7$ and is interchanged to the R register at 16–184. A signal, representing input to the B staticizer is developed during $\mathcal{L}_8$ and is interchanged into the R register at 16–178. A command "Read," is also generated and interchanged into the R register at 16–185. Also, during $\mathcal{L}_8$, four 1's are interchanged into the R register at 15–146, 15–151, 15–156, and 15–161. Zeroes are placed in the R register at 15–166, 15–171, and 15–176. These 1's and 0's in the R register are used during $\mathcal{L}_9$ to gate in the various new signals from the three-position switch and the digital entry keys (1) and (0). On successive L's, the various signals are taken from their sources and are placed into the circulating registers as a source of new signals in the succeeding cycle of the complete program.

Information is read out of the AB channel by a special Load instruction during $\mathcal{L}_{29}$ and $\mathcal{L}_{30}$. The input and output instructions in the computer portion of the program are similar to those of the calculator portion. With reference to Table 2, it may be seen that the Load instruction is carried out using the L flip-flop, both the S and R read staticizers as well as the S write staticizer.

The state of the Write staticizer can be affected by entering a bit which is read in the immediately preceding S register cell. Then the same bit will be written in the following cell position, at which time the Load instruction is given.

As set out in the table, a 0 in the L flip-flop identifies an input instruction and the various switches and keys are sampled according to the states of the staticizers. When the L flip-flop contains a 1, the instruction in interpreted as an output instruction and the read staticizer of the S register determines what the signal will be. If the S register reads a 1, the output signal is a Trigger signal which may be used for starting the sweep of a CRT for read out. Then on successive Load instructions, a 0 in the S register gates the contents of the R read staticizer into the CRT circuits to produce either positive or negative pulses, or if so arranged, 1's and 0's on the screen corresponding to the contents of the R register.

In $\mathcal{L}_{31}$, the LM register is interconnected so that the new value of the M staticizer is applied to the last bit position of the LM register at 8–96. As may be noted from an observation, each 30-bit word of the LM register is in an independent circulating loop. At $\mathcal{L}_{31}$, the bit emerging at 1–95 from the R register in the eighth word loop is applied to the R register in the seventh word loop, the bit from the seventh word is applied to the sixth word, and so forth, until the second word bit is applied to the first word. The bit of the first word is replaced by the new bit inserted into the M staticizer.

In operation, each 31-revolution cycle of the complete program represents one "bit time" of the computer whose equations have been mechanized. The calculator program repeated without change in the first 86 program cells of each cycle of the S register, undergoes 31 complete cycles during each major program computer cycle. During the computational cycles, information in the R and S register is operated upon in accordance with instructions carried in the R and S registers. It may be seen that an entirely different program of operations may be performed by entering different instructions into the S and R registers with the computer keyboard.

In order to illustrate the operation of the general purpose machine whose logical equations are set up by the program of the present device, two simple examples are given of operations which can be performed. For example, several numbers may be added together, other numbers subtracted from the sum and resulting number may be displayed.

In setting forth the illustrative programs, it is preferable to consider the general purpose computer as separate entity which may be best understood with reference to FIGURES 10 and 11. In Table 17 below, the quantities which are filled into the computer, are set forth in tabular form:

*Table 17*

| Bit | Word 4 | Word 5 | Word 6 | Word 7 | Word 8 | Word 1 |
|---|---|---|---|---|---|---|
| $i_1$ | 1 | 1 | 1 | 1 | 1 | 0 |
| $i_2$ | 1 | 1 | 0 | 0 | 1 | 0 |
| $i_3$ | 1 | 1 | 1 | 1 | 0 | 0 |
| $i_4$ | 0 | 0 | 0 | 0 | 1 | 0 |
| | 0 | 0 | 0 | 0 | 0 | 0 |
| $d_1$ | 1 | 1 | 1 | 1 | 0 | 0 |
| $d_2$ | 0 | 1 | 1 | 0 | 0 | 0 |
| $d_3$ | 0 | 1 | 1 | 1 | 0 | 0 |
| $d_4$ | 1 | 0 | 0 | 0 | 0 | 0 |
| $d_5$ | 1 | 1 | 0 | 1 | 0 | 0 |
| $d_6$ | 1 | 1 | 0 | 0 | 0 | 0 |
| $d_7$ | 0 | 0 | 0 | 0 | 0 | 0 |
| $d_{24}$ | 0 | 0 | 0 | 0 | 0 | 0 |
| $d_{25}$ | 0 | 0 | 0 | 0 | 0 | 0 |

It may be noted that Words 4, 5, 6, 7 and 8 have instructions and numbers stored therein and are used in this option, and that Words 1, 2 and 3 contain all zeroes, to simplify the explanation of the filling operation.

To start the problem, the computer must first be cleared, which places a fiducial mark into the LM register. In Fill, the information is entered, bit by bit into the computer, starting with the $i_4$ bit of Word 8 which, in this example, is a 1 and which is followed by the $i_3$, $i_2$ and $i_1$ bits of Word 8. The bits of the remaining words are entered in reverse order, starting with the $d_{25}$ bit of Word 7 until the machine is filled.

The 4th word contains the number 57, expressed in binary form, and the instruction to add the number into the accumulator register. In the 5th word, the number 55 is also added into the accumulator. Subtract instructions in the 6th and 7th words, cause the quantities 7 and 21, respectively, to be subtracted from the accumulated total. The 8th word contains a Stop 1 instruction which terminates the computation. After the machine is in the Stop 2 state, the Display button may be depressed and the contents of the accumulator will be displayed on the face of the display CRT of FIGURE 2. In connection with this problem, it must be remembered that during the operation, individual bits of the word are processed at a rate of 1 bit per major cycle of the 31-cycle program.

As a further illustrative example, two numbers can be multiplied in the general purpose computer of the present machine. To facilitate this operation, the individual 30-bit words are divided into two portions. A first portion, including bits $d_1$ through $d_{15}$, are assigned to represent the multiplicand and the bits $d_{18}$ through $d_{24}$ are assigned to represent the multiplier. The program for the multiplication operation is set forth in Table 18 below:

*Table 18*

Word 1—Enter multiplier into accumulator bits corresponding to $d_{18}$–$d_{24}$
Word 2—Test, Subtract 1 in $d_{18}$ from accumulator
Word 3—Stop 1
Word 4—Add multiplicand to accumulator in bits corresponding to $d_1$–$d_{15}$
Word 5—Transfer 1 to Word 2

In operation, Word 1 adds the multiplier into the accumulator register in those digital positions assigned to the multiplier number. A Test instruction in the next word causes a 1 to be subtracted from the multiplier. The next instruction is Stop 1, which is skipped whenever the sign digit is unchanged as a result of the Test operation. In the 4th word, the multiplicand is added into the accumulator, in the assigned location. The instruction of the fifth word transfers the operation back to the second word. The sixth, seventh, and eighth words can be entirely composed of zeroes.

It may be seen, that during each cycle of the LM register, the multiplicand will be added to itself as long as diminishing the multiplier by one does not result in a sign change. When the number in the multiplier portion of the accumulator does change sign, the proper number of additions has taken place and the Stop 1 instruction is accepted. The Display button may then be actuated to display the product stored in the accumulator.

Within the same electro mechanical framework, virtually any computational task can be performed if the task is expressible in logical equations. One merely has to develop the series of program sequences necessary to express the logical equations and write these into the program channels.

When the new program is written the machine will perform to solve the logical equations generated by the new sequences. Such other programs may define a Digital Differential Analyzer, other general purpose digital computers, calculators, or even special purpose control computers.

What is claimed as new is:

1. A digital computer comprising: a first cyclically operable memory device including a relatively short information storage loop for storing digital information signals to be operated upon and a first read station for serially presenting the signals stored in said loop; a second cyclically operable memory device operable in synchronism with said first device, said second device including a relatively long information storage loop for storing digital information signals and instruction signals to be operated upon and a second read station for serially presenting the signals stored in said long loop; a third cyclically operable memory device operable in synchronism with said first and second devices, said third device including a relatively long program loop for storing program signal combinations, each combination representing logical operations upon at least two concurrent digital signals, and a third read station for serially presenting the signals stored in said program loop; and an operating circuit connected to said first, second and third read stations and responsive to each program signal combination presented at said third read station to operate on the signals simultaneously presented at said first and second read stations for producing corresponding result signals in accordance with the logical operations represented by the program signal combination, and including means for applying said result signals to said first and second memory devices for storage in said short and long information storage loops respectively.

2. The computer defined in claim 1 further comprising: a storage element for storing a first bivalued output signal, said operating circuit including apparatus operable in accordance with each instruction represented by said program signal combinations, for storing in said storage element a new digital output signal representing the result of the corresponding logical operation upon said first output signal and the signal simultaneously presented at said first read station.

3. In a digital computer, the combination comprising: a first information storage device, including a plurality of storage cells and having information and instruction signals stored therein, said first storage device including a first read station for reading the signal stored in each cell presented thereto; a second storage device including a plurality of storage cells having information and instruction signals stored therein and including a second read station for reading the signal in each second device cell presented thereto; means for serially presenting the pluralities of storage cells to said first and second read stations for a plurality of successive cycles; a program storage device having program signal combinations stored therein, said program storage device being operable in synchronism with said first and second storage devices for presenting, during successive cycles of said first information storage device, a different sequence of program signal combinations for each cell presented at said first read station, different ones of said program signal combinations representing different logical operations; and an operating circuit connected to all of said storage devices and responsive to signals stored therein for performing the logical operation represented by each program signal combination upon the corresponding information and instruction signals simultaneously presented at said first and second read stations to generate output signals representing predetermined logical functions of the information and instruction signals.

4. A general purpose digital computer comprising: a first cyclical storage device having a plurality of cells storing bivalued signals representing program signal combinations therein and including a first read station for serially presenting said stored signals; a second cyclical storage device having a plurality of cells storing bivalued signals representing information therein, said second device including a second read station for serially presenting said stored information signals and a write station for entering bivalued signals into said second cyclical storage device; a plurality of signal lines; and switching means connected to said first and second storage devices and to said plurality of signal lines, said switching means being operable in response to predetermined program signal combinations and to the signals presented to said second read station and to said write station for selectively enabling individual ones of said signal lines in accordance with the values of the signals present in said second read station and said write station.

5. A general purpose digital computer comprising: first means including a first cyclically operable memory for storing and serially presenting a series of sequences of signal combinations representing an interconnected logical network, each individual signal combination representing, respectively, a logical operation to be performed, each individual sequence representing, respectively, a logical element, and said series of sequences representing a combination of said logical elements in an interconnected logical network; second means for providing signals representing information and instructions including a first, relatively long and a second relatively short storage loop for storing and serially presenting said signals, said loops being cyclically operable in synchronism with said first memory; and an operating circuit connected to said first means and said second means for selectively combining signals presented thereto from said second means in logical operations corresponding to signal combinations being simultaneously presented from said first means.

6. The digital computer of claim 5 where said operating circuit provides output signals representing the response of said logical network to said applied information signals in accordance with said instruction signals and including third means connecting said operating circuit to said second means for storing said output signals.

7. A general purpose digital computer comprising: a first cyclically operable memory device having a relatively short loop for storing interplexed signals representing input information and instructions; a second memory device cyclically operable in synchronism with said first device and having a relatively long storage loop for storing interplexed signals representing input information and instructions; a third memory device cyclically operable in synchronism with said first and second devices having a relatively longer storage loop, substantially equal in length to the combined length of said short and long loops, for storing a series of sequences of program signal combinations, said program signal combinations representing predetermined Boolean functions of applied input variables, said sequences corresponding to computational elements, and said series defining a predetermined complete logical network; an operating circuit connected to said memory devices and responsive to said program signal combinations to generate resultant signals representing the corresponding Boolean functions of simultaneously applied information and instruction signals, said circuit being responsive to said series of sequences for producing a corresponding sequence of resultant signals representing the result of operation of the predetermined logical networks on the applied information signals under control of and in accordance with said applied instruction signals.

8. A general purpose digital computer comprising: a first cyclically operable memory for storing and serially presenting a series of sequences of signal combinations representing an interconnected logical network, each individual signal combination representing, respectively a logical operation to be performed, each individual sequence representing, respectively, a logical element, and said series of sequences representing a combination of said logical elements in an interconnected logical network; a second memory device having a relatively long storage loop for storing and serially presenting signals representing information and instructions, said relatively long storage loop being cyclically operable in synchronism with said first memory; a third memory device including a relatively short storage loop for storing and serially presenting signals representing information and instructions, said third device being cyclically operable in synchronism with said first memory; and an operating circuit connected to said first, second, and third memories for selectively combining serially presented information and instruction signals in logical operations corresponding to signal combinations being simultaneously presented from said first memory to produce corresponding output signals; and third means connecting said operating circuit to said second and third memories for storing said output signals, whereby the stored output signals represent the response of said logical network to said applied information signals in accordance with said instruction signals.

9. A general purpose digital computer for serially combining a first number group of bivalued information signals representing a first number, a second number group of bivalued signals representing a second number, and an instruction group of bivalued information signals representing a predetermined arithmetic operation to be performed on said first and second numbers to form a third number group of output information signals, representing the numerical result of the predetermined arithmetic operation upon said first and second numbers, each of said output information signals representing a corresponding predetermined Boolean function of the values of the information signals of the instruction group and the first and second number groups, said computer comprising: a first cyclically operable memory device having a plurality of program signal combinations stored in a predetermined sequence in said first memory device, each of said program signal combinations comprising a plurality of bivalued signals representing a logical operation to be performed, said first memory device including a reading means for sequentially presenting said combinations during each cycle of said first memory device; a second cyclically operable memory device having the instruction group and the first and second number groups of bivalued information signals stored therein, said second device including a first read station for serially presenting each bivalued information signal in timed correspondence with a program signal combination presented by said reading means; a third cyclically operable memory device for storing bivalued information signals, said third device including a second read station for serially presenting each bivalued information signal in timed correspondence with a program signal combination presented by said reading means; and operating means connected to said reading means and said first and second read stations and responsive to each of said program signal combinations and the simultaneously presented information signals for operating upon the information signals in accordance with the logical operation represented by the program signal combination to form two corresponding resultant signals, said operating means including output means responsive to predetermined program signal combinations for selectively storing one of said resultant signals in one of said second and third memory devices, said operating means being further responsive to said predetermined sequence of program signal combinations to sequentially combine the signals of said instruction group and the signals of said first and second number groups in accordance with the predetermined Boolean functions to form each of the corresponding output signals of said third number group.

10. The digital computer of claim 9 further including a bistable storage device for storing a single bivalued information signal, said operating means being connected to said storage device and being further responsive to applied signals from said storage device to form said output signals, said output means including means for applying one of said resultant output signals to said storage device.

11. A general purpose digital computer comprising: a first cyclically operable memory device having a plurality of program signal combinations stored in a predetermined sequence in said first memory device, each of said program signal combinations comprising a plurality of bivalued signals representing Boolean functions of two variables, said first memory device including first reading means for sequentially presenting each of said combinations during each cycle of said first memory device; a second cyclically operable memory device having a plurality of groups of bivalued information signals stored therein, said plurality of groups including a plurality of first groups of signals representing numbers and a plurality of second groups of signals representing instructions, said second groups of signals being arranged in a predetermined sequence representing a predetermined sequence of operations to be performed upon the numbers represented by said first groups of signals, said second device including second reading means for serially presenting each bivalued information signal in timed correspondence with a program signal combination presented by said first reading means; a bistable storage device for storing a single information signal; and operating means connected to said first and second reading means and said storage device, said operating means being responsive to each of said program signal combinations for combining the information signals simultaneously presented by said second reading means and said storage device in the Boolean function of two variables represented by the program signal combination to produce a corresponding resultant output signal, said operating means being responsive to said predetermined sequence of program signal combinations to sequentially combine all of said information signals in accordance with the correspondingly presented program signal combination, to form a new first group of signals representing the results of said predetermined sequence of operations upon said first groups of signals in accordance with the operations represented by said predetermined sequence of second groups of signals.

12. A general purpose digital computer comprising: a first cyclically operable memory device having a plurality of program signal combinations stored in a predetermined sequence in said first memory device, each of said program signal combinations comprising a plurality of bivalued signals representing a logical operation to be performed, said first memory device including first reading means for sequentially presenting said combinations during each cycle of said first memory device; a second cyclically operable memory device including means for storing a plurality of groups of bivalued information signals, said plurality of groups including a plurality of first groups of signals representing numbers and a respectively corresponding plurality of second groups of signals representing instructions, each second group of signals representing a predetermined operation to be performed upon the number represented by the corresponding first group of signals, said second device further including second reading means for serially presenting each bivalued information signal in timed correspondence with a program signal combination presented by said first reading means; a bistable storage device for storing a single bivalued information signal; and operating means connected to said first and second reading means and said storage device and responsive to each of said program signal combinations and the information signals simultaneously presented by said second reading means and said storage device for operating upon the information signals in accordance with the logical operation represented by the program signal combination to form a corresponding resultant output signal representing a predetermined Boolean function of said information signal, said operating means being responsive to said predetermined sequence of program signal combinations to sequentially combine the information signals of at least one of said first groups of signals with the information signals corresponding second group of signals to form a new first group of information signals, said new first group of signals representing a predetermined Boolean function of the applied information signals of said one of said first group of signals representing numbers and the applied information signals of the corresponding second group of signals representing instructions.

13. The computer of claim 12, wherein said second reading means includes a third cyclically operable memory device for storing bivalued information signals and a read station for serially presenting said information signals to said operating means.

14. A general purpose digital computer comprising a first cyclically operable memory device having a plurality of program signal combinations stored in a predetermined sequence in said first memory device, each of said program signal combinations comprising a plurality of bivalued signals representing a logical operation to be performed, said first memory device including reading means for sequentially presenting each of said combinations during each cycle of said first memory device; a second cyclically operable memory device having a plurality of groups of bivalued information signals stored therein, said plurality of groups including a plurality of first groups of signals representing numbers and a plurality of second groups of signals representing instructions, said second groups of signals being arranged in a predetermined sequence representing a predetermined sequence of operations to be performed upon the numbers represented by said first groups of signals, said second device including a read station for serially presenting each bivalued information signal in timed correspondence with a program signal combination presented by said reading means; and operating means connected to said reading means and said read station and responsive to each of said program signal combinations and the simultaneously presented information signal for operating upon the information signal in accordance with the logical operation represented by the program signal combination to produce a corresponding resultant output signal, said operating means being responsive to said predetermined sequence of program signal combinations to sequentially combine all of said information signals in accordance with the correspondingly presented program signal combinations to form a new first group of signals representing the results of said predetermined sequence of operations upon said first groups of signals in accordance with the operations represented by said predetermined sequence of second groups of signals.

15. A general purpose digital computer comprising: a first cyclically operable memory device having a plurality of program signal combinations stored in a predetermined sequence in said first memory device, each of said program signal combination comprising a plurality of bivalued signals representing a logical operation to be performed, said first memory device including reading means for sequentially presenting said combinations during each cycle of said first memory device; a second cyclically operable memory device having a plurality of groups of bivalued information signals stored therein, said plurality of groups including a plurality of first groups of signals representing numbers and a plurality of second groups of signals representing instructions, one of said second groups of signals representing a predetermined operation to be performed upon two numbers represented by two corresponding first groups of signals, said second device including a read station for serially presenting each bivalued information signal in time correspondence with a program signal combination presented by said reading means; and operating means connected to said reading means and said read station and responsive to each of said program signal combinations and the simultaneously presented information signal for operating upon the information signal in accordance with the logical operation represented by the program signal combination to produce a corresponding resultant output signal, said operating means being responsive to said predetermined sequence of program signal combinations to sequentially combine the information signals of said one of said second groups of signals with the information signals of the corresponding two of said first groups of signals to form a new first group of information signals representing the result of operation upon the numbers represented by said two first groups of signals in accordance with the operation represented by said second group of signals.

16. A general purpose digital computer comprising: a first cyclically operable memory device having a plurality of program signal combinations stored in a predetermined sequence in said first memory device, each of said program signal combinations comprising a plurality of bivalued signals representing a logical operation to be performed, said first memory device including reading means for sequentially presenting each of said combinations during each cycle of said first memory device; a second cyclically operable memory device synchronized with said first device, said second device having a plurality of groups of bivalued information signals stored therein and including a first read station and means for serially presenting said information signals at said first read station in timed synchronism with the program signal combinations presented by said reading means, said plurality of groups including a plurality of first groups of signals representing numbers and a respectively corresponding plurality of second groups of signals representing instructions, each second group of signals representing a predetermined operation to be performed upon the number represented by the corresponding first group of signals; and operating means connected to said reading means and said read station, said operating means including a third cyclical memory device operable in response to predetermined program signal combinations for storing signals representing corresponding logical functions of information signals simultaneously presented at said first read station and including a second read station for serially presenting said stored signals in timed synchronism with the program signal combinations presented by said reading means, said operating means being responsive to each of said program signal combinations for operating upon the information signals simultaneously presented at said first and second read stations in accordance with the logical operation represented by the program signal combination to produce a corresponding resultant output signal, said operating means being responsive to said predetermined sequence of program signal combinations to sequentially combine the information signals of at least one of said first groups of signals with the information signals of the corresponding second group of signals to form a new first group of information signals representing operation upon the first group of signals in accordance with the operation represented by said second group of signals.

17. A digital computer comprising: a first cyclically operable memory device including a relatively short information loop for storing digital information signals to be operated upon, a first read station for serially presenting the signals stored in said loop, and a first write station for writing signals into said loop; a second cyclically operable memory device operable in synchronism with said first device, said second device including a relatively long information loop for storing additional information signals and for storing instruction signals to control operations upon said digital information signals, a second read station for serially presenting said second device signals, and a second write station for writing signals into said long loop; a third cyclically operable memory device operable in synchronism with said first and second devices said third device including a relatively long program loop for storing a plurality of program signal combinations each signal combination representing corresponding logical operations to be performed and a third read station for serially presenting each of the program signal combinations stored in said program loop; a storage element operable for storing a single bivalued output signal; first means responsive to each program signal combination, for storing in said storage element a new digital output signal representing the result of the corresponding logical operation upon the old output signal stored therein and the signal presented at said first read station; second means, responsive to each program signal combination, for applying to said first write station a signal representing the result of another corresponding logical operation upon said old output signal and said signal presented at said first read station; and third means simultaneously operable in accordance with each program signal combination for applying to said second write station a signal representing the result of another corresponding operation upon the signal simultaneously presented at said first read station and the signal simultaneously presented at said second read station.

References Cited by the Examiner

UNITED STATES PATENTS

| | | | |
|---|---|---|---|
| 2,739,299 | 3/1956 | Burkhart | 235—167 X |
| 2,850,232 | 9/1958 | Hagen et al. | 235—152 |
| 2,974,867 | 3/1961 | Steele | 235—167 |

FOREIGN PATENTS

| | | |
|---|---|---|
| 167,102 | 2/1956 | Australia. |

ROBERT C. BAILEY, *Primary Examiner.*

LEO SMILOW, CORNELIUS D. ANGEL, WALTER W. BURNS, JR., MALCOLM A. MORRISON, *Examiners.*